hed under 35

United States Patent
Chang et al.

(10) Patent No.: US 10,243,660 B2
(45) Date of Patent: Mar. 26, 2019

(54) ULTRAFAST ALL-OPTICAL MODULATION OF THE VISIBLE AND INFRARED SPECTRUM WITH NANOROD ARRAYS

(71) Applicants: Northwestern University, Evanston, IL (US); UChicago Argonne, LLC, Chicago, IL (US)

(72) Inventors: Robert P. H. Chang, Glenview, IL (US); Richard D. Schaller, Clarendon Hills, IL (US); John B. Ketterson, Evanston, IL (US); Peijun Guo, Evanston, IL (US)

(73) Assignees: Northwester University, Evanston, IL (US); UChicago Argonne, LLC, Chicago, IL (US)

( * ) Notice: Subject to any disclaimer, the term of this patent is extended or adjusted under 35 U.S.C. 154(b) by 0 days.

(21) Appl. No.: 15/424,029

(22) Filed: Feb. 3, 2017

(65) Prior Publication Data

US 2017/0222724 A1     Aug. 3, 2017

Related U.S. Application Data

(60) Provisional application No. 62/290,908, filed on Feb. 3, 2016.

(51) Int. Cl.
| | |
|---|---|
| *H04B 10/50* | (2013.01) |
| *H04B 10/11* | (2013.01) |
| *B82Y 20/00* | (2011.01) |
| *B82Y 30/00* | (2011.01) |

(52) U.S. Cl.
CPC .............. *H04B 10/50* (2013.01); *H04B 10/11* (2013.01); *B82Y 20/00* (2013.01); *B82Y 30/00* (2013.01)

(58) Field of Classification Search
CPC ....... H04Q 11/0005; H04Q 2011/0039; H04Q 11/0062; H04Q 2011/0052; H04Q 2011/0015; H04B 10/11; B82Y 20/00; B82Y 30/00
See application file for complete search history.

(56) References Cited

U.S. PATENT DOCUMENTS

| | | | |
|---|---|---|---|
| 5,037,169 | A | 8/1991 | Cornell et al. |
| 6,782,154 | B2 | 8/2004 | Zhao et al. |

(Continued)

OTHER PUBLICATIONS

Abb, M. et al. All-Optical Control of a Single Plasmonic Nanoantenna—ITO Hybrid. Nano Letters 11, 2457-2463 (2011).

(Continued)

*Primary Examiner* — Ted M Wang
(74) *Attorney, Agent, or Firm* — Andrus Intellectual Property Law, LLP

(57) ABSTRACT

Disclosed herein is a method of optical modulation, the method comprising irradiating an optical switch with a control beam at a first control time and irradiating the optical switch with a signal beam at a signal time. The transmitted intensity of the signal beam in a direction depends on the delay time between the first control time and the signal time and the transmitted intensity of the signal beam in the direction is detectably different than a static signal. The optical switch comprises a nanorod array, the nanorod array comprising a plurality of nanorods extending outwardly from a substrate.

22 Claims, 57 Drawing Sheets

(56) References Cited

U.S. PATENT DOCUMENTS

| | | | | |
|---|---|---|---|---|
| 2007/0104417 | A1* | 5/2007 | Tanaka | G02F 1/293 |
| | | | | 385/16 |
| 2013/0240348 | A1* | 9/2013 | Mi | H01L 31/03044 |
| | | | | 204/157.5 |

OTHER PUBLICATIONS

Abb, M. et al. Hotspot-mediated ultrafast nonlinear control of multifrequency plasmonic nanoantennas. Nat Commun 5 (2014).
Anker, J.N. et al. Biosensing with plasmonic nanosensors. Nat Mater 7, 442-453 (2008).
Aouani, H. et al. Third-harmonic-upconversion enhancement from a single semiconductor nanoparticle coupled to a plasmonic antenna. Nat Nano 9, 290-294 (2014).
Atwater, H.A. & Polman, A. Plasmonics for improved photovoltaic devices. Nat Mater 9, 205-213 (2010).
Bahl, G. et al. Brillouin cavity optomechanics with microfluidic devices. Nat Commun 4 (2013).
Betz, U. et al. Thin films engineering of indium tin oxide: Large area flat panel displays application. Surface and Coatings Technology 200, 5751-5759 (2006).
Bohren C.F. & Huffman, D.R. Absorption and Scattering of Light by Small Particles. (Wiley, 2007).
Boltasseva, A. & Awater, H.A. Low-Loss Plasmonic Metamaterials. Science 331, 290-291 (2011).
Brar, V.W. et al. Highly Confined Tunable Mid-Infrared Plasmonics in Graphene Nanoresonators. Nano Letters 13, 2541-2547 (2013).
Carpene, E. Ultrafast laser irradiation of metals: Beyond the two-temperature model. Physical Review B 74, 024301 (2006).
Chambers, S.A. Epitaxial growth and properties of thin film oxides. Surface Science Reports 39, 105-180 (2000).
Chang, W.-S. et al. Tuning the acoustic frequency of a gold nanodisk through its adhesion layer. Nat Commun 6 (2015).
Wu, C. et al. Metamaterial-based integrated plasmonic absorber/emitter for solar thermo-photovoltaic systems. Journal of Optics 14, 024005 (2012).
Chou, L.-W. et al. Optically Abrupt Localized Surface Plasmon Resonances in Si Nanowires by Mitigation of Carrier Density Gradients. ACS Nano 9, 1250-1256 (2015).
Cohen, M.H. Energy Bands in the Bismuth Structure. I. A Nonellipsoidal Model for Electrons in Bi. Physical Review 121, 387-395 (1961).
Cui, A. et al. Thermally Induced Shape Modification of Free-standing Nanostructures for Advanced Functionalities. Scientific Reports 3, 2338.
Del Fatti, N. et al. Nonequilibrium electron dynamics in noble metals. Physical Review B 61, 16956-16966 (2000).
Del Fatti, N. et al. Electron dynamics and surface plasmon resonance nonlinearities in metal nanoparticles. Chemical Physics 251, 215-226 (2000).
Ding, L. et al. High Frequency GaAs Nano-Optomechanical Disk Resonator. Physical Review Letters 105, 263903 (2010).
Favero, I. & Karrai, K. Optomechanics of deformable optical cavities. Nat Photon 3, 201-205 (2009).
Garcia, G. et al. Dynamically Modulating the Surface Plasmon Resonance of Doped Semiconductor Nanocrystals. Nano Letters 11, 4415-4420 (2011).
Gil Santos, E. et al. High-frequency nano-optomechanical disk resonators in liquids. Nat Nano 10, 810-816 (2015).
Gordel, M. et al. Post-synthesis reshaping of gold nanorods using a femtosecond laser. Physical Chemistry Chemical Physics 16, 71-78 (2014).
Granqvist, C.G. & Hultaker, A. Transparent and conducting ITO films: new developments and applications. Thin Solid Films 411, 1-5 (2002).
Gregory, S.A. et al Extreme Subwavelength Metal Oxide Direct and Complementary Metamaterials. ACS Photonics 2, 606-614 (2015).

Guler, U. et al. Refractory Plasmonics. Science 344, 263-264 (2014).
Guo, P. et al. Large optical nonlinearity of ITO nanorods for sub-picosecond all optical modulation of the full-visible spectrum. Nature Communications 7, 1-10 (2016).
Guo, P. et al. Gigahertz Acoustic Vibrations of Elastically Anisotropic Indium-Tin-Oxide Nanorod Arrays. Nano Letters, 16, 5639-5646, (2016).
Guo, P. et al. Ultrafast Switching of Tunable Infrared Plasmons in Indium-Tin-Oxide Nanorod Arrays with Large Absolute Amplitude. Nature Photonics 10, 267-273 (2016).
Hamberg, I. et al. Band-gap widening in heavily Sn-doped $In_2O_3$. Physical Review B 30, 3240-3249 (1984).
Hamberg, I. & Granqvist, C.G. Evaporated Sn-doped $In_2O_3$ films: Basic optical properties and applications to energy-efficient windows. Journal of Applied Physics 60, R123-R160 (1986).
Hartland, G.V. Optical Studies of Dynamics in Noble Metal Nanostructures. Chemical Reviews 111, 3858-3887 (2011).
Harutyunyan, H. et al. Anomalous ultrafast dynamics of hot plasmonic electrons inanostructures with hot spots. Nat Nano 10, 770-774 (2015).
Helander, M.G. et al. Chlorinated Indium Tin Oxide Electrodes with High Work Function for Organic Device Compatibility. Science 332, 944-947 (2011).
Hjortsberg, A. et al. Transparent and heat-reflecting indium tin oxide films prepared by reactive electron beam evaporation. Thin Solid Films 90, 323-326 (1982).
Hu, M. et al. Vibrational Response of Nanorods to Ultrafast Laser Induced Heating: Theoretical and Experimental Analysis. Journal of the American Chemical Society 125, 14925-14933 (2003).
Juvé, V. et al. Probing Elasticity at the Nanoscale: Terahertz Acoustic Vibration of Small Metal Nanoparticles. Nano Letters 10, 1853-1858 (2010).
Kabashin, A.Y. et al. Plasmonic nanorod metamaterials for biosensing. Nat Mater 8, 867-871 (2009).
Kapfinger, S. et al. Dynamic acousto-optic control of a strongly coupled photonic molecule. Nat Commun 6 (2015).
Kandil, H.M. et al. Single-Crystal Elastic Constants of Yttria-Stabilized Zirconia in the Range 20° to 700° C. Journal of the American Ceramic Society 67, 341-346 (1984).
Kane, E.O. Band structure of indium antimonide. Journal of Physics and Chemistry of Solids 1, 249-261 (1957).
Kauranen, M. & Zayats, A.V. Nonlinear plasmonics. Nat Photon 6, 737-748 (2012).
Kelf, T.A. et al. Ultrafast Vibrations of Gold Nanorings. Nano Letters 11, 3893-3898 (2011).
Kinsey, N. et al. Epsilon-near-zero Al-doped ZnO for ultrafast switching at telecom wavelengths. Optica 2, 616-622. (2015).
Kohoutek, J. et al. Integrated All-Optical Infrared Switchable Plasmonic Quantum Cascade Laser. Nano Letters 12, 2537-2541 (2012).
Krasavin, A.V. & Zayats, A.V. Photonic Signal Processing on Electronic Scales: Electro-Optical Field-Effect Nanoplasmonic Modulator. Physical Review Letters 109, 053901 (2012).
Lee, B. et al. Three Dimensional Indium-Tin-Oxide Nanorod Array for Charge Collection in Dye-Sensitized Solar Cells. ACS Applied Materials & Interfaces 6, 17713-17722 (2014).
Lee, H.W. et al. Nanoscale Conducting Oxide PlasMOStor. Nano Letters 14, 6463-6468 (2014).
Liu, M. et al. A graphene-based broadband optical modulator. Nature 474, 64-67 (2011).
Li, S.Q. et al. Infrared Plasmonics with Indium-Tin-Oxide Nanorod Arrays. ACS Nano 5, 9161-9170 (2011).
Li, S.-Q. et al. Plasmonic-Photonic Mode Coupling in Indium-Tin-Oxide Nanorod Arrays. ACS Photonics 1, 163-172 (2014).
Li, S.-Q. et al. Broadband resonances in indium-tin-oxide nanorod arrays. Applied Physics Letters 107, 031104 (2015).
Li, W. et al. Refractory Plasmonics with Titanium Nitride: Broadband Metamaterial Absorber. Advanced Materials 26, 7959-7965 (2014).
Li, W. et al. Ultrafast All-Optical Graphene Modulator. Nano Letters 14, 955-959 (2014).

(56) References Cited

OTHER PUBLICATIONS

Li, Y. et al. Ultrafast Electron and Phonon Response of Oriented and Diameter-Controlled Germanium Nanowire Arrays. Nano Letters 14, 3427-3431 (2014).
Liu, X. et al. Quantification and impact of nonparabolicity of the conduction band of indium tin oxide on its plasmonic properties. Applied Physics Letters 105, 181117 (2014).
Llordes, A. et al. Tunable near-infrared and visible-light transmittance in nanocrystal-in-glass composites. Nature 500, 323-326 (2013).
Lounis, S.D. et al. Influence of Dopant Distribution on the Plasmonic Properties of Indium Tin Oxide Nanocrystals. Journal of the American Chemical Society 136, 7110-7116 (2014).
Luther, J.M. et al. Localized surface plasmon resonances arising from free carriers in doped quantum dots. Nat Mater 10, 361-366 (2011).
MacDonald, K.F. et al.Ultrafast active plasmonics. Nat Photon 3, 55-58 (2009).
Maheshwari, V. & Saraf, R.F. High-Resolution Thin-Film Device to Sense Texture by Touch. Science 312, 1501-1504 (2006).
Maier, S.A. et al. Local detection of electromagnetic energy transport below the diffraction limit in metal nanoparticle plasmon waveguides. Nat Mater 2,229-232 (2003).
Mante, P.-A. et al. Interferometric detection of extensional modes of GaN nanorods array. Opt. Express 20, 18717-18722 (2012).
Mariager, S.O. et al. Direct Observation of Acoustic Oscillations in InAs Nanowires. Nano Letters 10, 2461-2465 (2010).
Mason, W.P. Physical Acoustics and the Properties of Solids. The Journal of the Acoustical Society of America 28, 1197-1206 (1956).
Taga, N. et al. Effect of Sn Doping on the Crystal Growth of Indium Oxide Films. Japanese Journal of Applied Physics 37, 6585 (1998).
Niaik, G.V. et al. Epitaxial superlattices with titanium nitride as a plasmonic component for optical hyperbolic metamaterials. Proceedings of the National Academy of Sciences 111, 7546-7551 (2014).
Noginov, M.A. et al. Transparent conductive oxides: Plasmonic materials for telecom wavelengths. Applied Physics Letters 99, 021101 (2011).
O'Brien, K. et al. Ultrafast acousto-plasmonic control and sensing in complex nanostructures. Nat Commun 5 (2014).
Oulton, R.F. et al. Plasmon lasers at deep subwavelength scale. Nature 461, 629-632 (2009).
Pelton, M. et al. Damping of acoustic vibrations in gold nanoparticles. Nat Nano 4, 492-495 (2009).
Perner, M. et al. Observation of Hot-Electron Pressure in the Vibration Dynamics of Metal Nanoparticles. Physical Review Letters 85, 792-795 (2000).
Pisarkiewicz, T. & Kolodziej, A. Nonparabolicity of the Conduction Band Structure in Degenerate Tin Dioxide. physica status solidi (b) 158, K5-K8 (1990).
Rhodes, C. et al. Surface plasmon resonance in conducting metal oxides. Journal of Applied Physics 100, 054905 (2006).
Riha, S.C. et al. Hematite-based Photo-oxidation of Water Using Transparent Distributed Current Collectors. ACS Applied Materials & Interfaces 5, 360-367 (2013).
Ruijgrok, P.V. et al. Damping of Acoustic Vibrations of Single Gold Nanoparticles Optically Trapped in Water. Nano Letters 12, 1063-1069 (2012).
Ruske, F. et al. Optical modeling of free electron behavior in highly doped ZnO films. Thin Solid Films 518, 1289-1293 (2009).
Sachet, E. et al. Dysprosium-doped cadmium oxide as a gateway material for mid-infrared plasmonics. Nat Mater 14, 414-420 (2015).
Safavi-Naeini, A.H. et al. Electromagnetically induced transparency and slow light with optomechanics. Nature 472, 69-73 (2011).
Saleh, B.E.A. & Teich, M.C. In Fundamentals of Photonics 799-831 (John Wiley & Sons, Inc., 2001).
Schliching, K.W. et al. Thermal conductivity of dense and porous yttria-stabilized zirconia. Journal of Materials Science 36, 3003-3010 (2001).
Schumacher, T. et al. Nanoantenna-enhanced ultrafast nonlinear spectroscopy of a single gold nanoparticle. Nat Commun 2, 333 (2011).
Sidiropoulos, T.P.H. et al. Ultrafast plasmonic nanowire lasers near the surface plasmon frequency. Nat Phys 10, 870-876 (2014).
Sun, C.K. et al. Femtosecond-tunable measurement of electron thermalization in gold. Physical Review B 50, 15337-15348 (1994).
Tadesse, S.A. & Li, M. Sub-optical wavelength acoustic wave modulation of integrated photonic resonators at microwave frequencies. Nat Commun 5 (2014).
Tice, D.B. et al. Ultrafast Modulation of the Plasma Frequency of Vertically Aligned Indium Tin Oxide Rods. Nano Letters 14, 1120-1126 (2014).
Tittl, A. et al. A Switchable Mid-Infrared Plasmonic Perfect Absorber with Multispectral Thermal Imaging Capability. Advanced Materials 27, 4597-4603 (2015).
Vallée, F. Ultrafast Non-Equilibrium Dynamics in Metal Nanoparticles. in Non-Equilibrium Dynamics of Semiconductors and Nanostructures. 143-178 (ed. K.-T. Tsen) (Taylor & Francis Group, Boca Raton; 2005).
Van Laer, R. et al. Interaction between light and highly confined hypersound in a silicon photonic nanowire. Nat Photon 9, 199-203 (2015).
Vlasov, Y.A. et al. SJ.Active control of slow light on a chip with photonic crystal waveguides. Nature 438, 65-69 (2005).
Voisin, C. et al. Ultrafast electron-electron scattering and energy exchanges in noble-metal nanoparticles. Physical Review B 69, 195416 (2004).
Wagner, M. et al. Ultrafast Dynamics of Surface Plasmons in InAs by Time-Resolved Infrared Nanospectroscopy. Nano Letters 14, 4529-4534 (2014).
Wu, C. et al. Fano-resonant asymmetric metamaterials for ultrasensitive spectroscopy and identification of molecular monolayers. Nat Mater 11, 69-75 (2012).
Wurtz, G.A. et al. Designed ultrafast optical nonlinearity in a plasmonic nanorod metamaterial enhanced by nonlocality. Nat Nano 6, 107-111 (2011).
Wurtz, G.A. et al. Guided plasmonic modes in nanorod assemblies: strong electromagnetic coupling regime. Opt. Express 16, 7460-7470 (2008).
Yoon, J. et al. Ultrathin silicon solar microcells for semitransparent, mechanically flexible and microconcentrator module designs. Nat Mater 7, 907-915 (2008).
Yan, H. et al. Damping pathways of mid-infrared plasmons in graphene nanostructures. Nat Photon 7, 394-399 (2013).
Yu, K. et al. Compressible Viscoelastic Liquid Effects Generated by the Breathing Modes of Isolated Metal Nanowires. Nano Letters (2015).
Yu, N. & Capasso, F. Flat optics with designer metasurfaces. Nat Mater 13, 139-150 (2014).
Zavelani-Rossi, M. et al. Transient Optical Response of a Single Gold Nanoantenna: The Role of Plasmon Detuning. ACS Photonics 2, 521-529 (2015).
Zhang, K.H.L. et al. Surface Energies Control the Self-Organization of Oriented In2O3 Nanostructures on Cubic Zirconia. Nano Letters 10, 3740-3746 (2010).
Zhu, J. et al. Nanodome Solar Cells with Efficient Light Management and Self-Cleaning. Nano Letters 10, 1979-1984 (2010).
Zhu, Y. et al.Ultralow-power and ultrafast all-optical tunable plasmon-induced transparency in metamaterials at optical commmunication range. Sci. Rep. 3 (2013).
Wurtz, Gregory A., et al. "Designed ultrafast optical nonlinearity in a plasmonic nanorod metamaterial enhanced by nonlocality." Nature nanotechnology 6.2 (2011): 107-111.†

* cited by examiner
† cited by third party

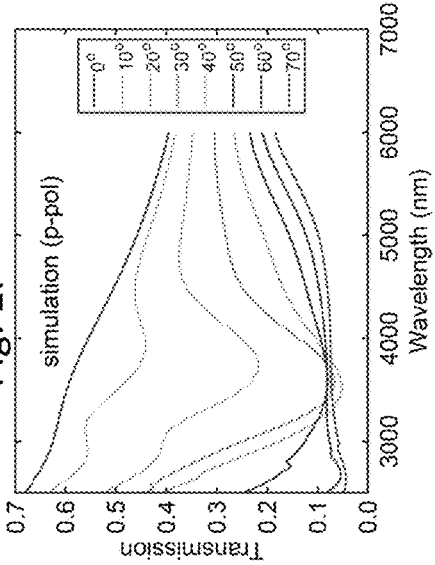
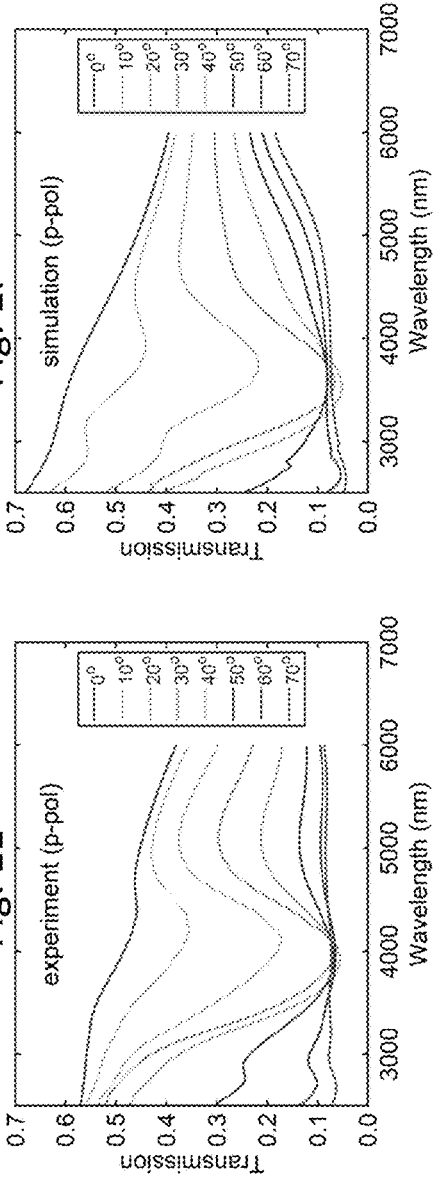
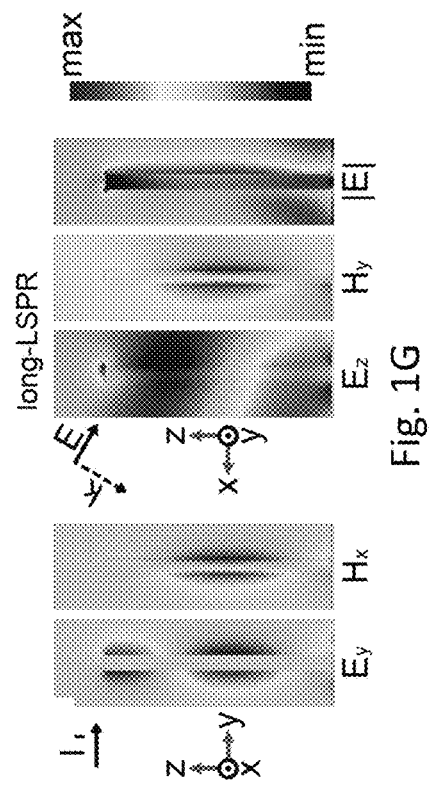

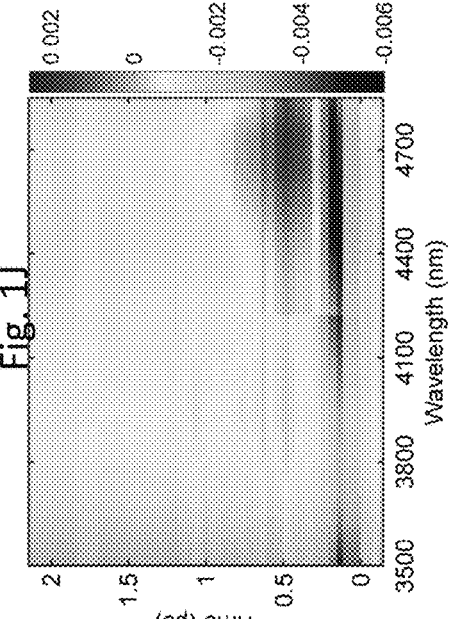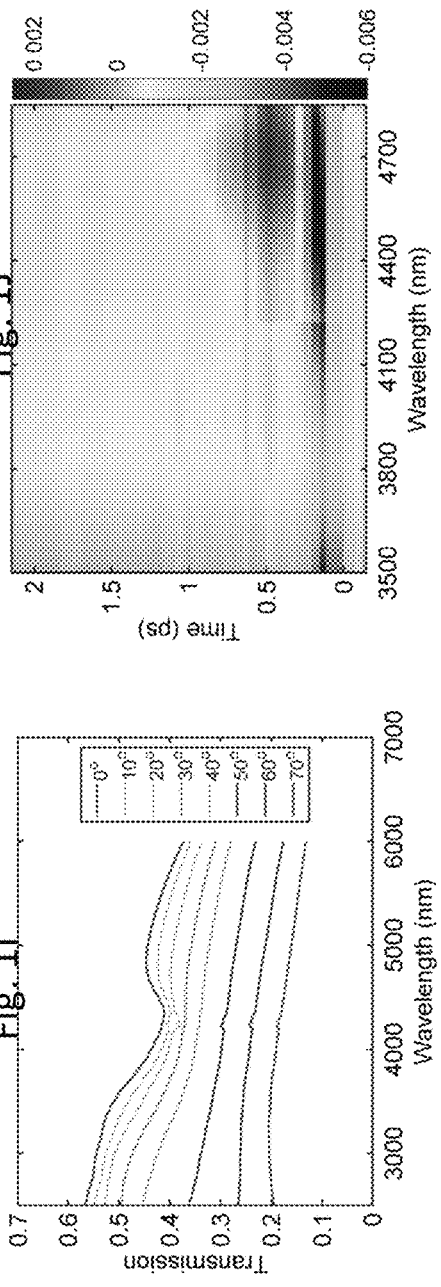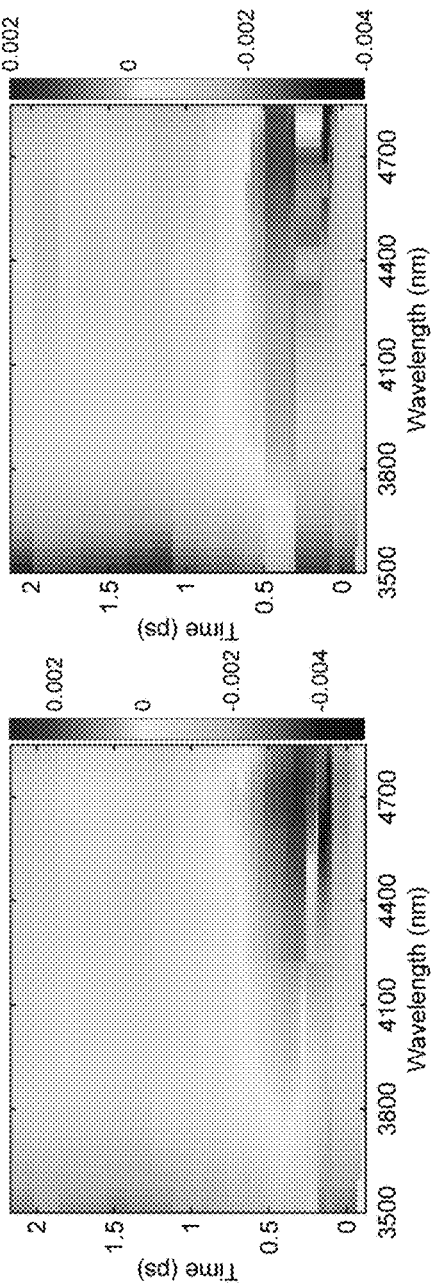

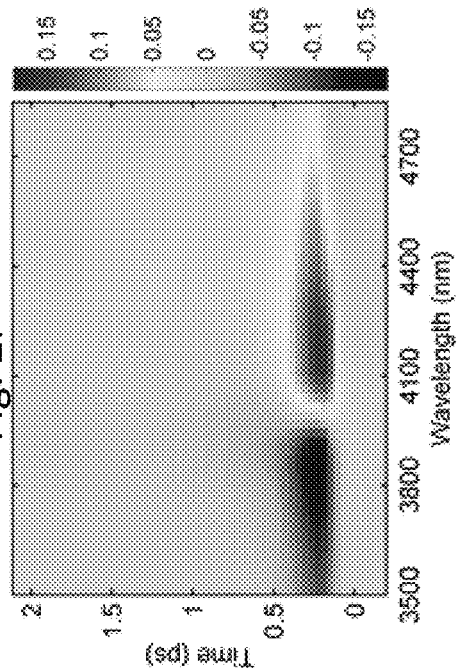
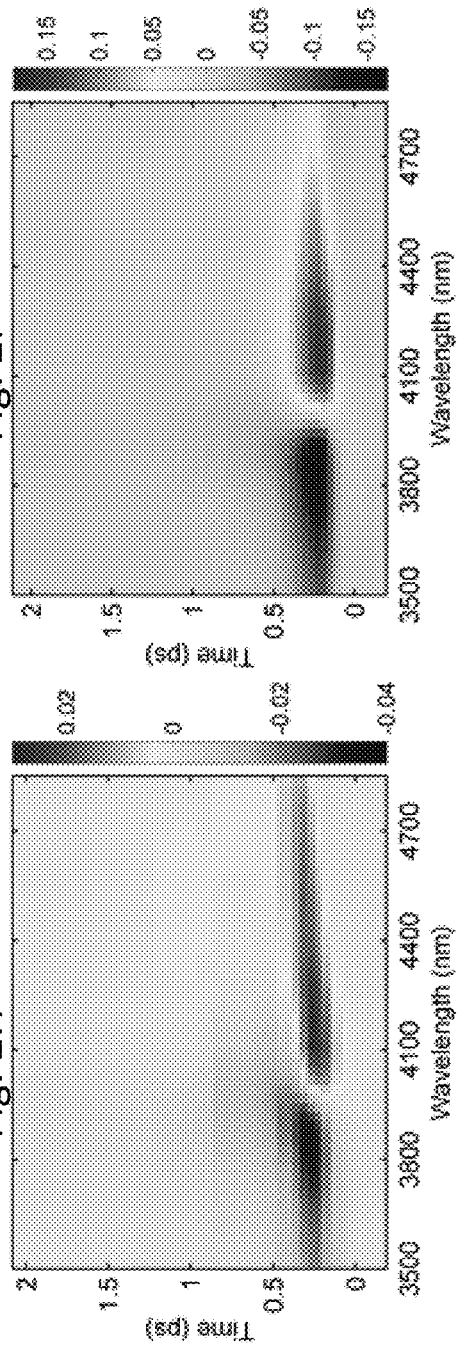
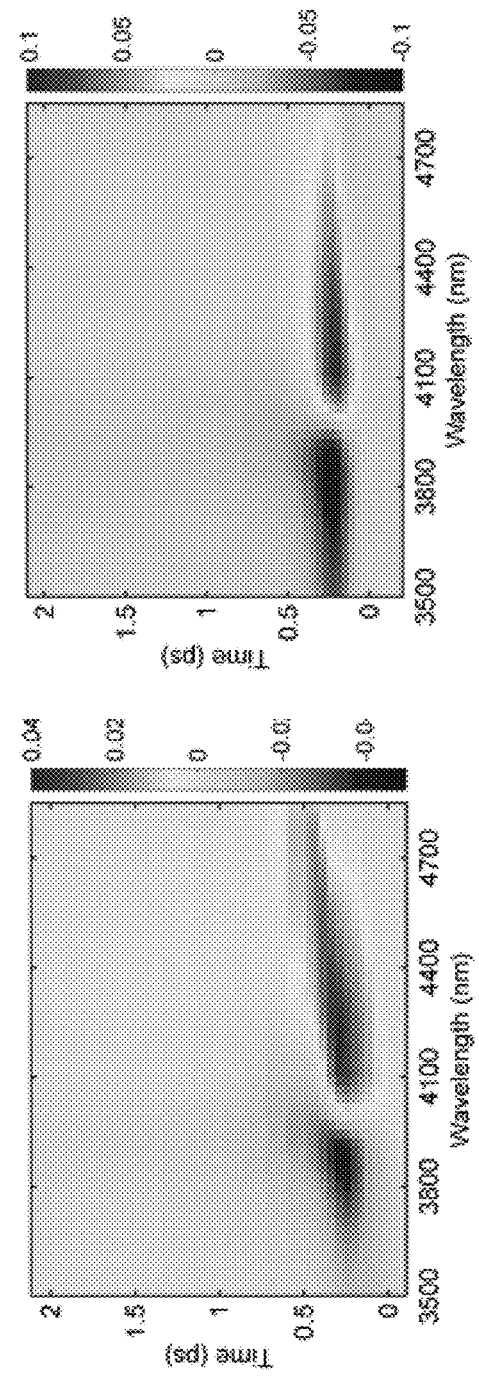
Fig. 2H  Fig. 2I
Fig. 2J  Fig. 2K

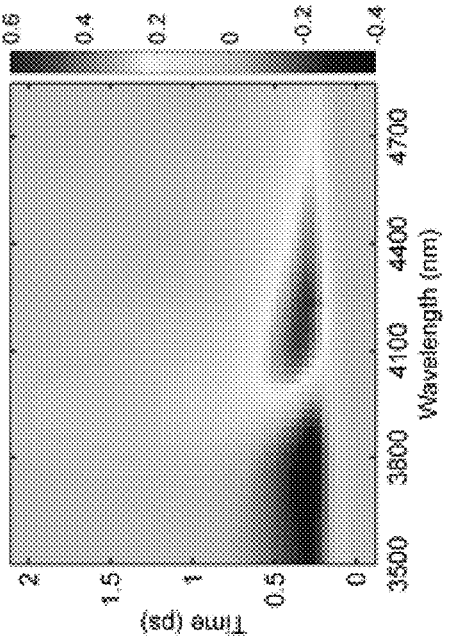
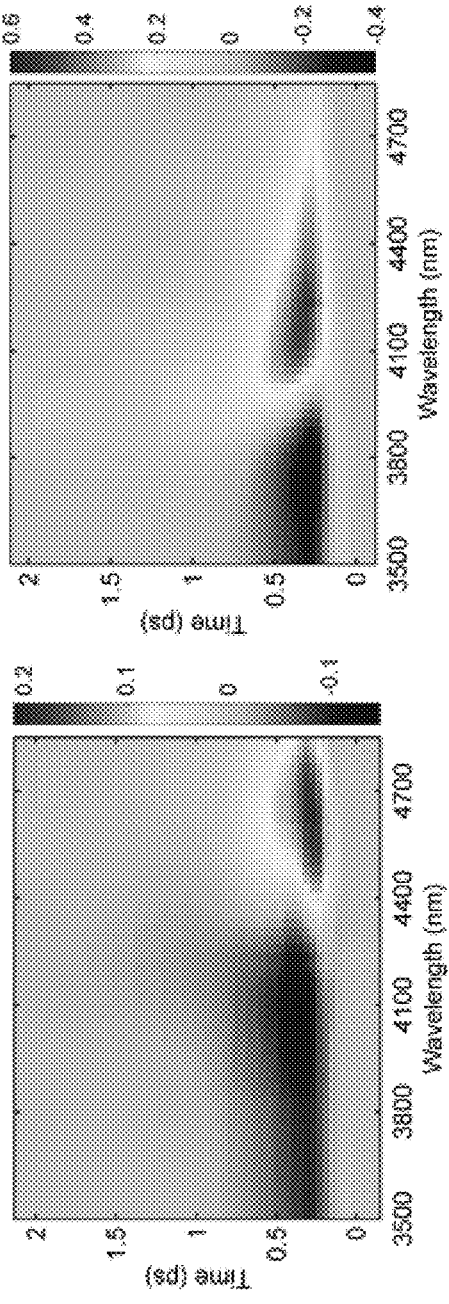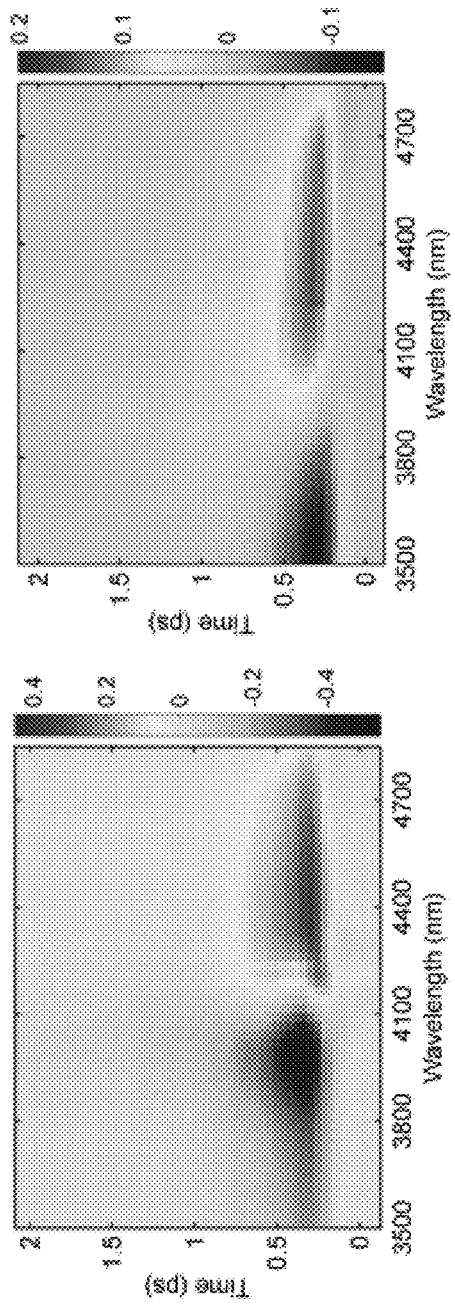
Fig. 2P  Fig. 2Q  Fig. 2R  Fig. 2S

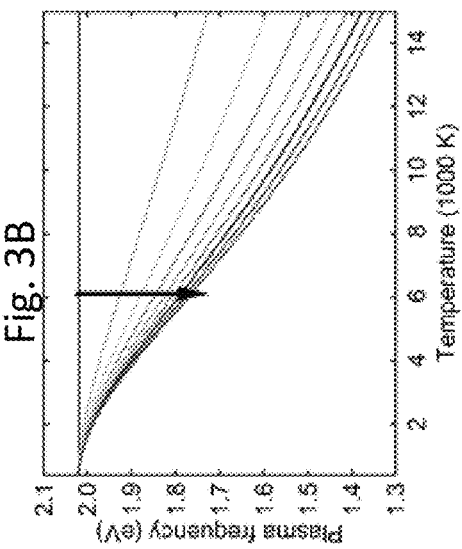
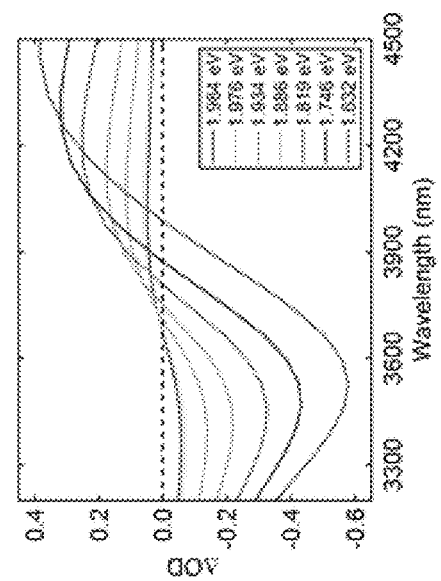
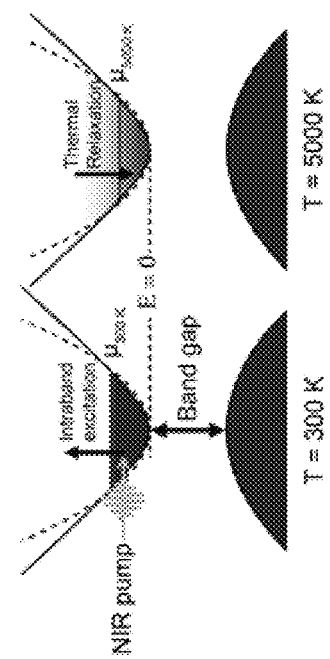
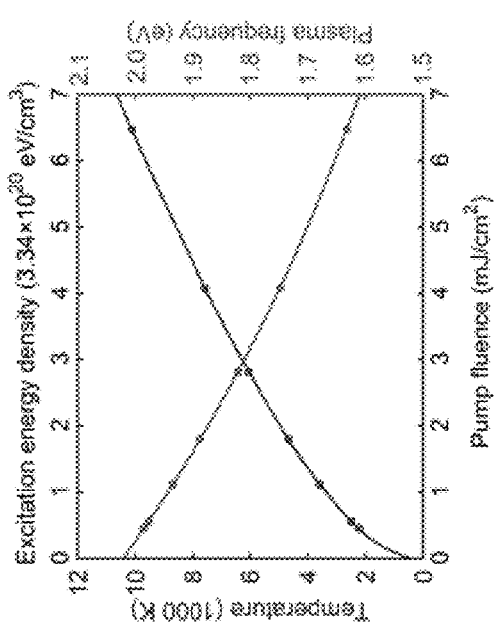
Fig. 3A
Fig. 3B
Fig. 3C
Fig. 3D

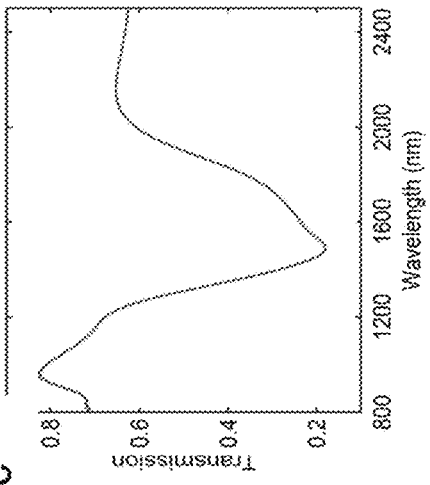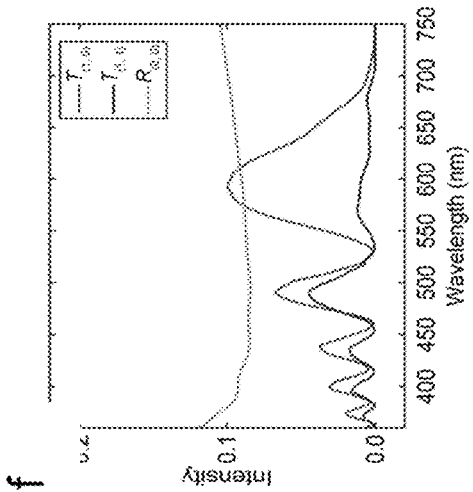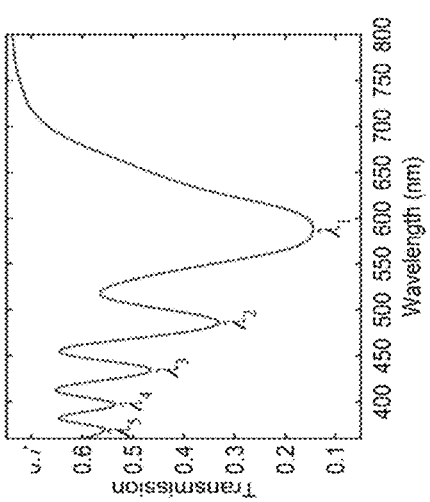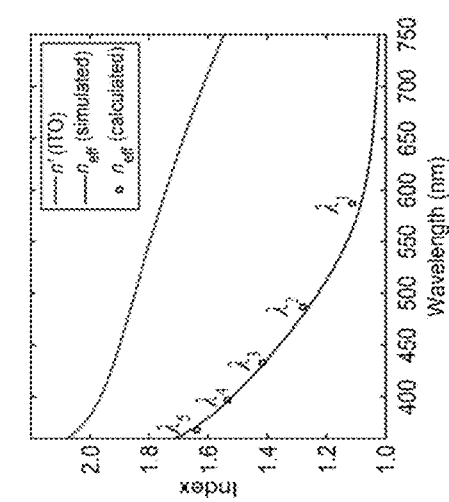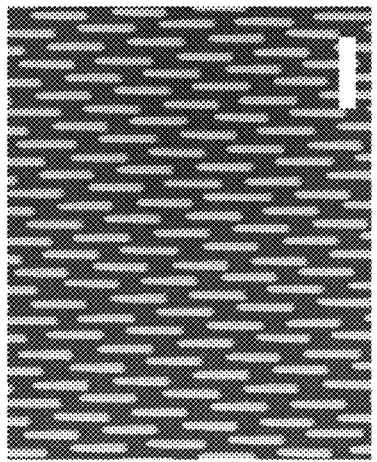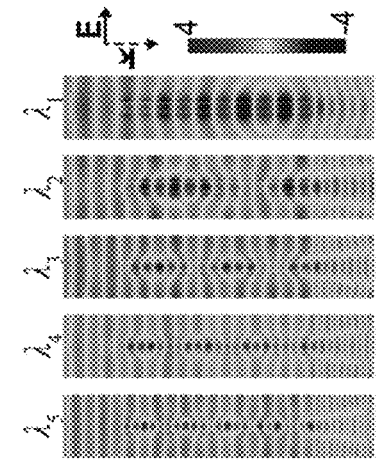
Fig. 8A  Fig. 8B  Fig. 8C
Fig. 8D  Fig. 8E  Fig. 8F

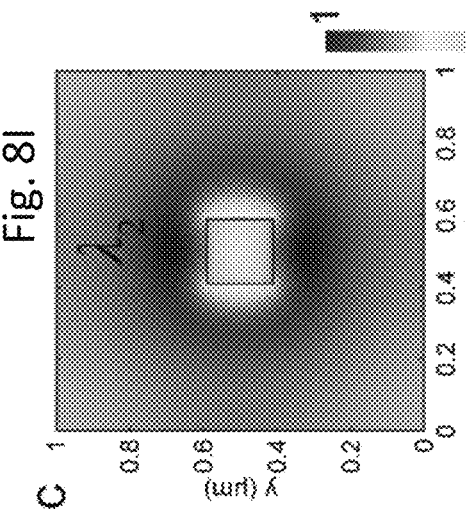
Fig. 8G
Fig. 8H
Fig. 8I
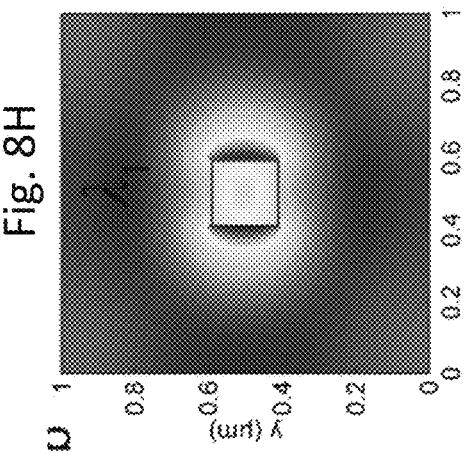
Fig. 8J
Fig. 8K
Fig. 8L
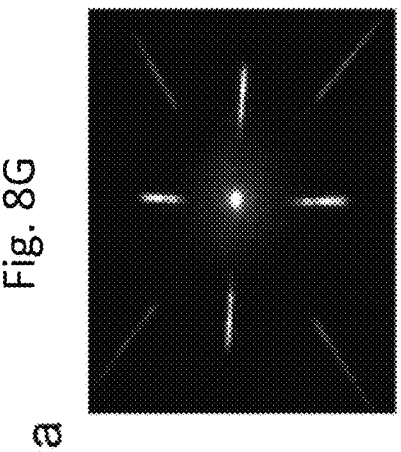
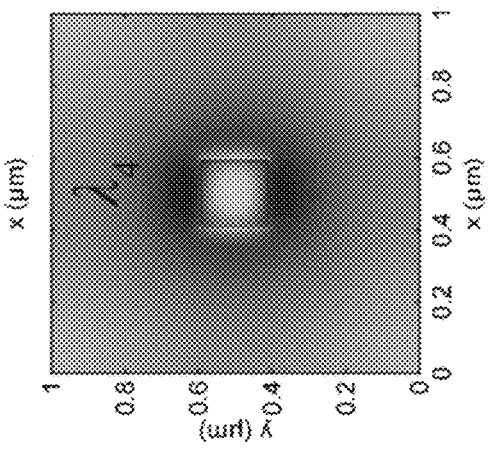
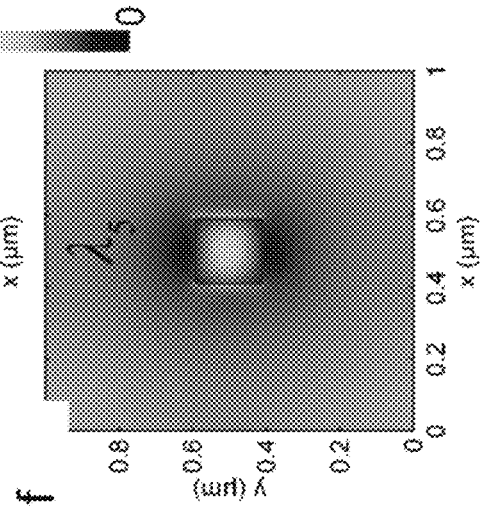
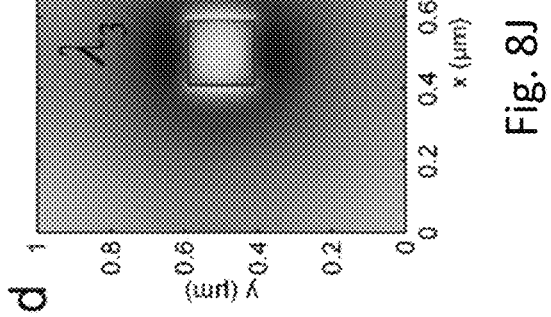

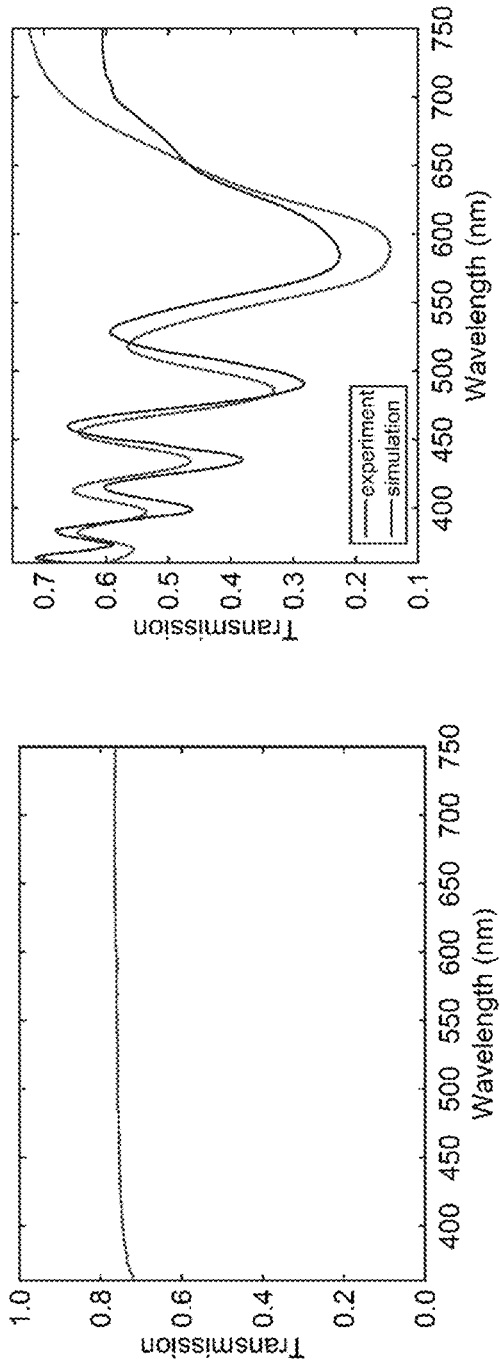

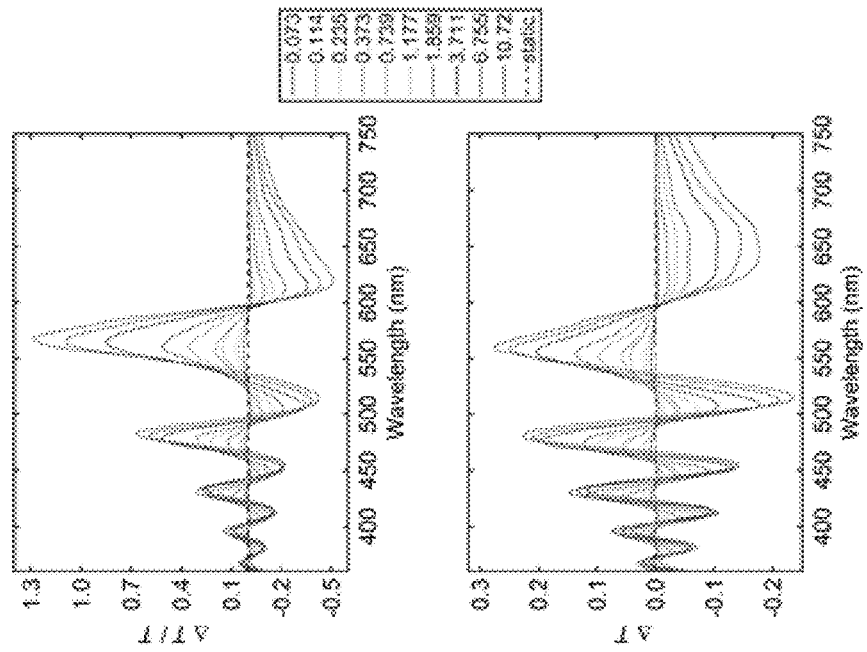
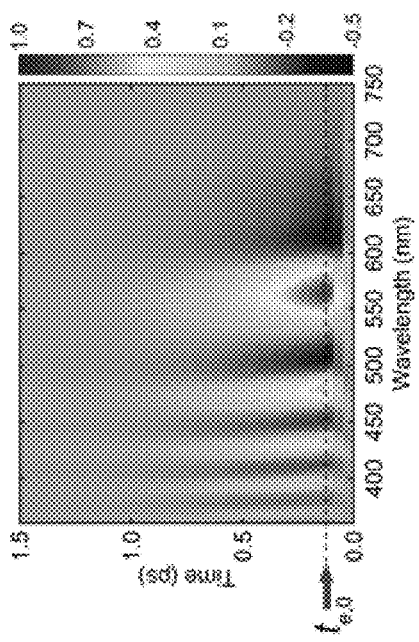
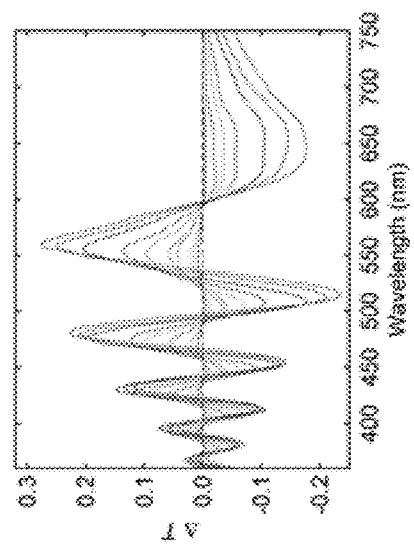
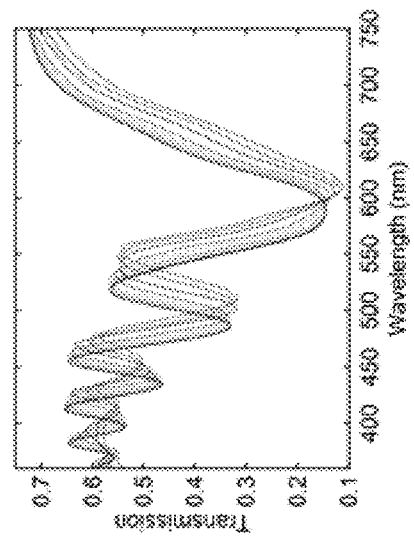

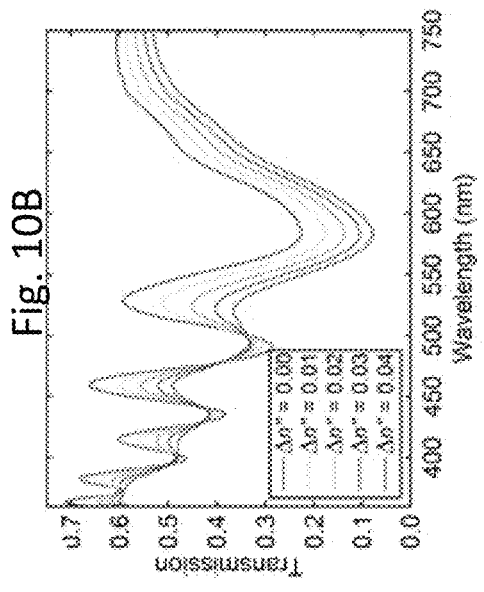
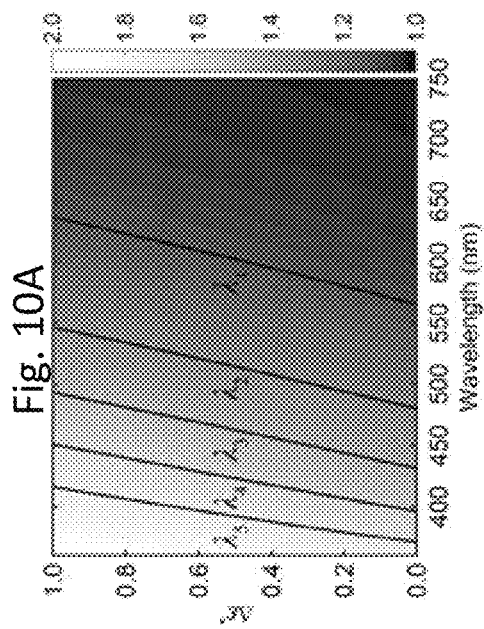
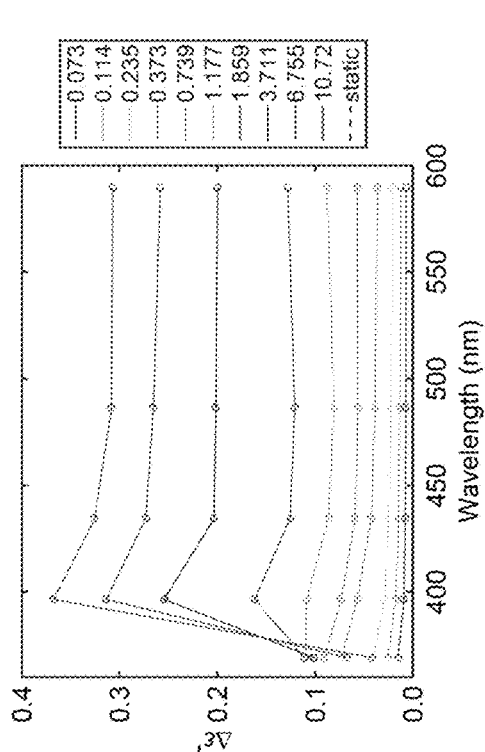
Fig. 10A
Fig. 10B
Fig. 10C

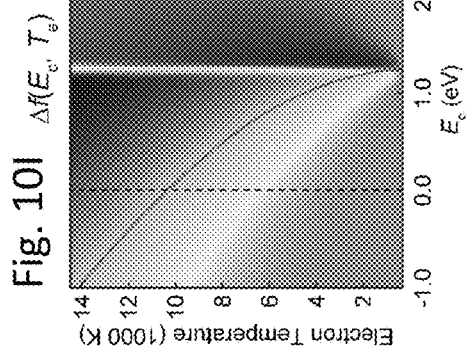
Fig. 10I  $\Delta f(E_c, T_e)$
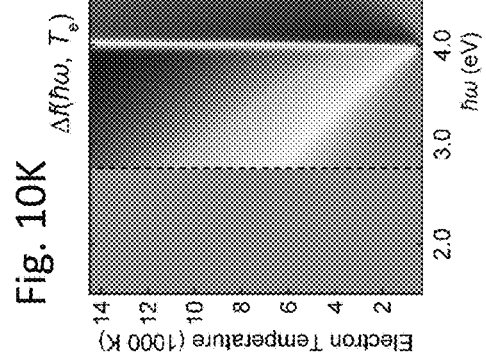
Fig. 10K  $\Delta f(\hbar\omega, T_e)$
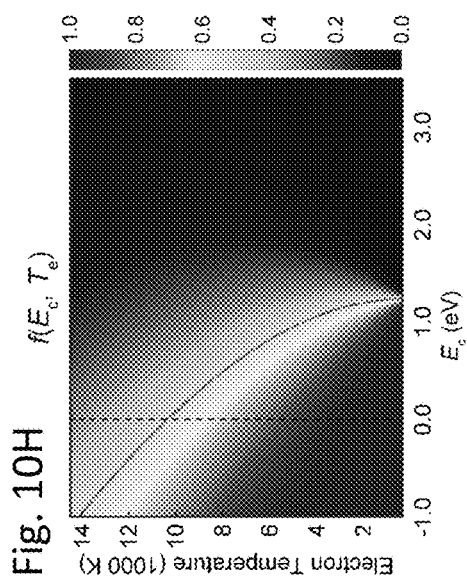
Fig. 10H  $f(E_c, T_e)$
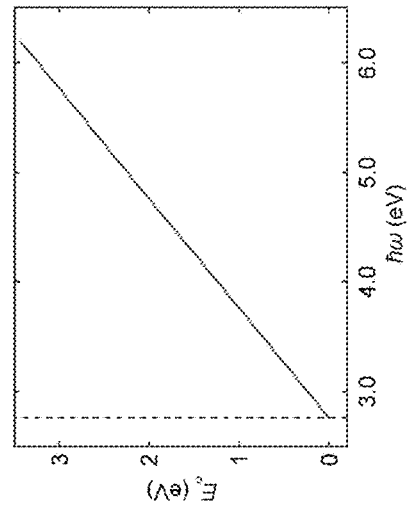
Fig. 10J

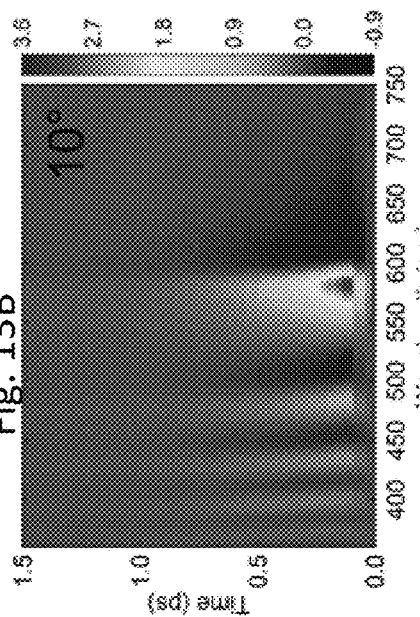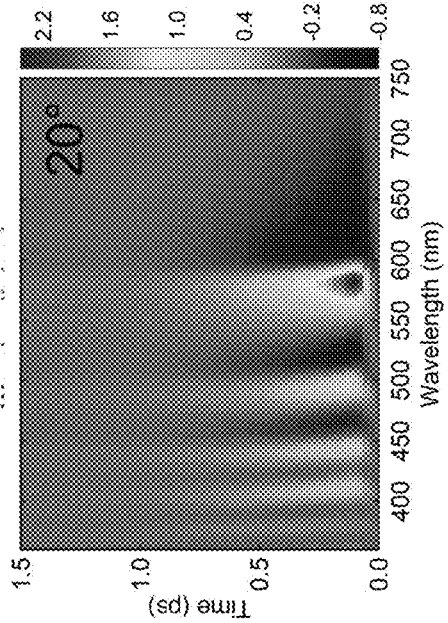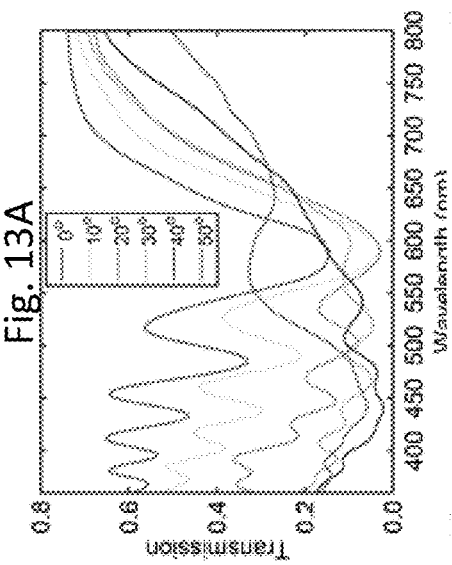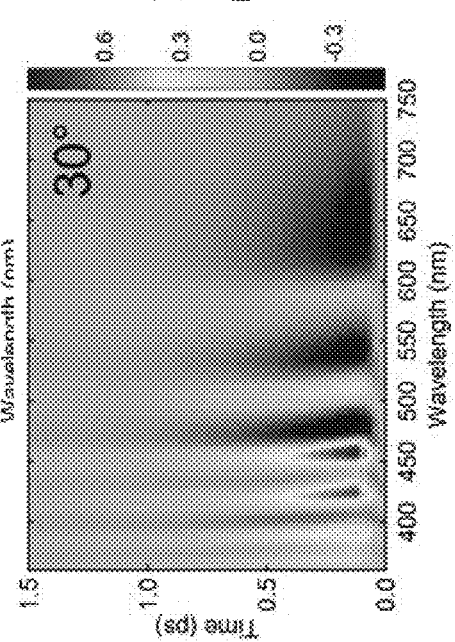
Fig. 13A
Fig. 13B
Fig. 13C
Fig. 13D

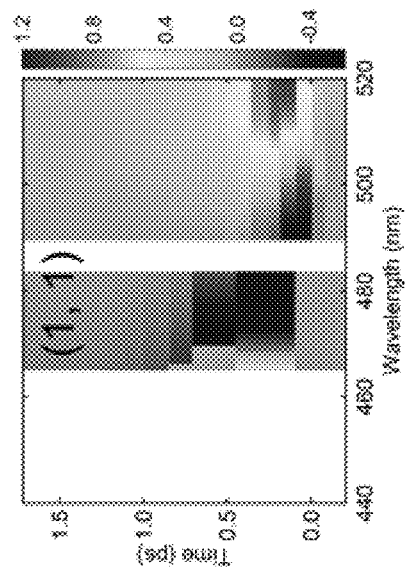
Fig. 14A
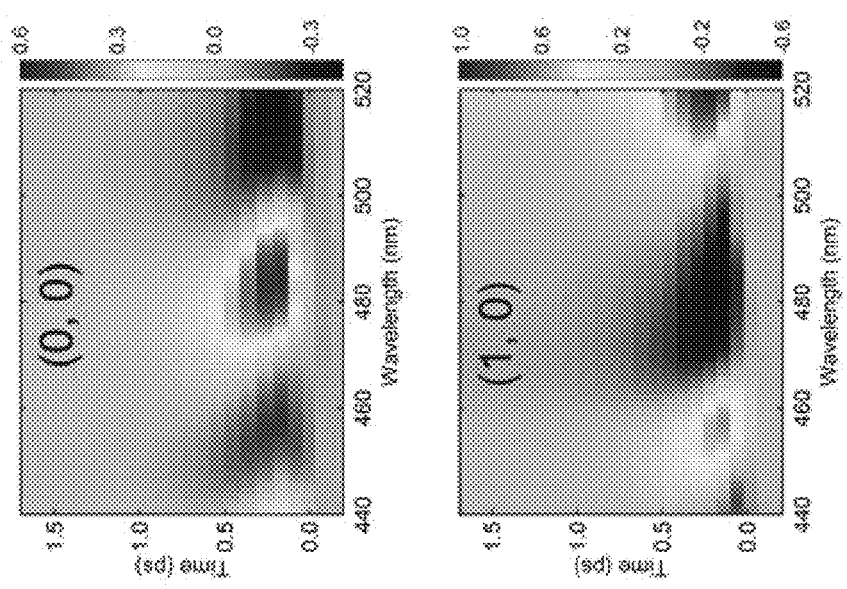
Fig. 14B
Fig. 14C

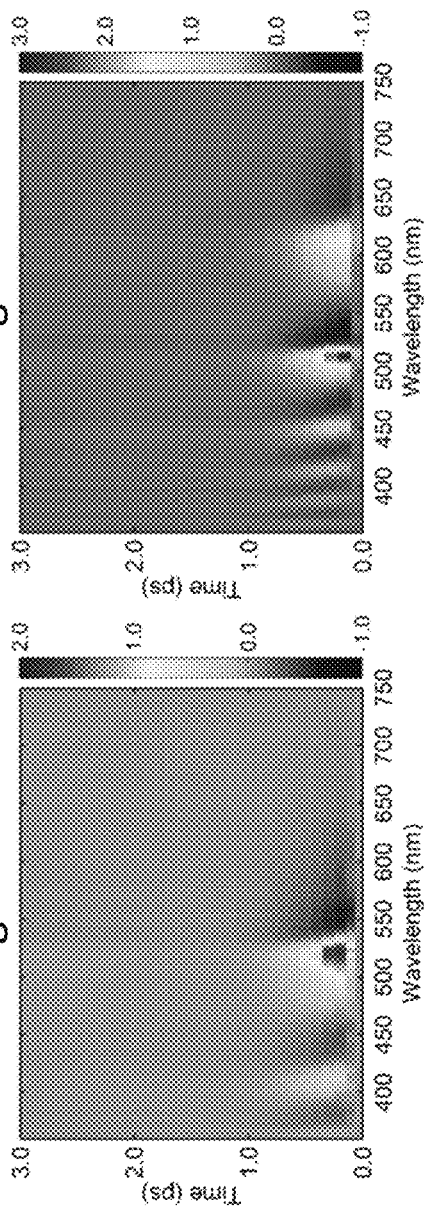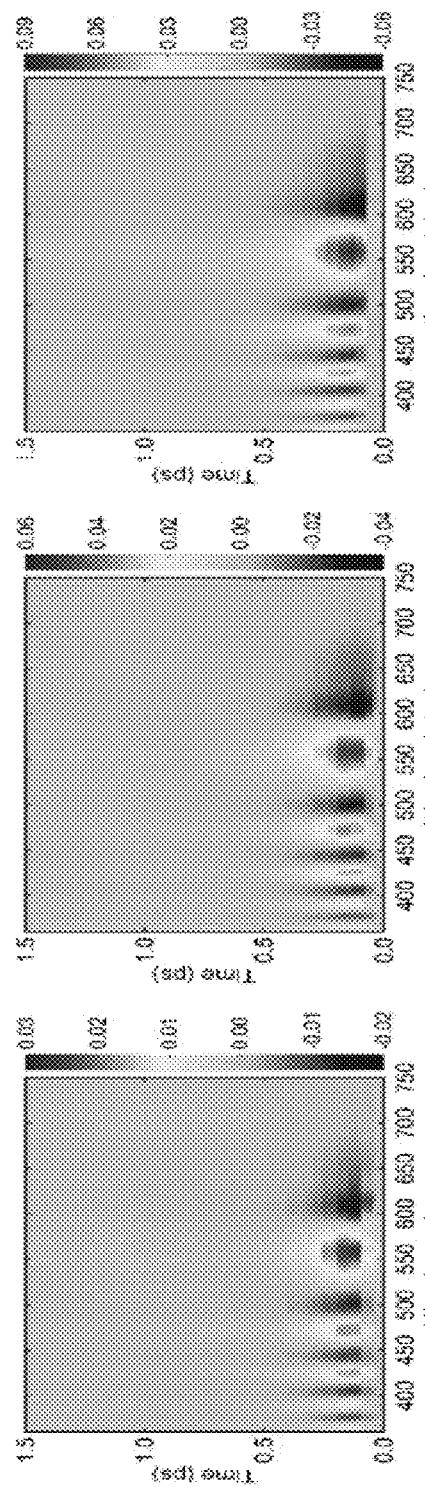

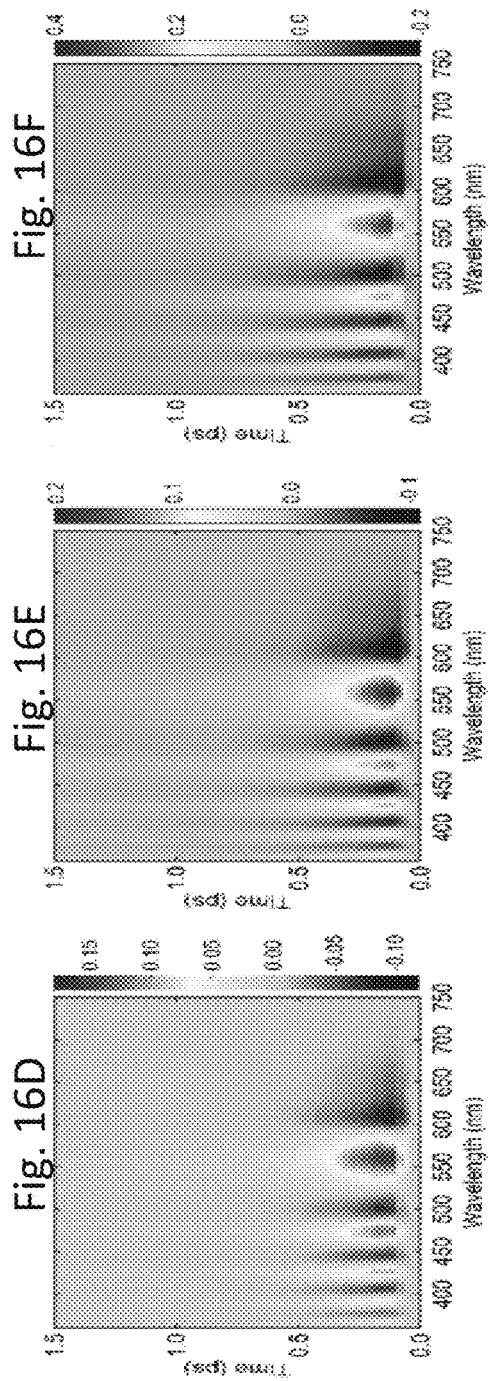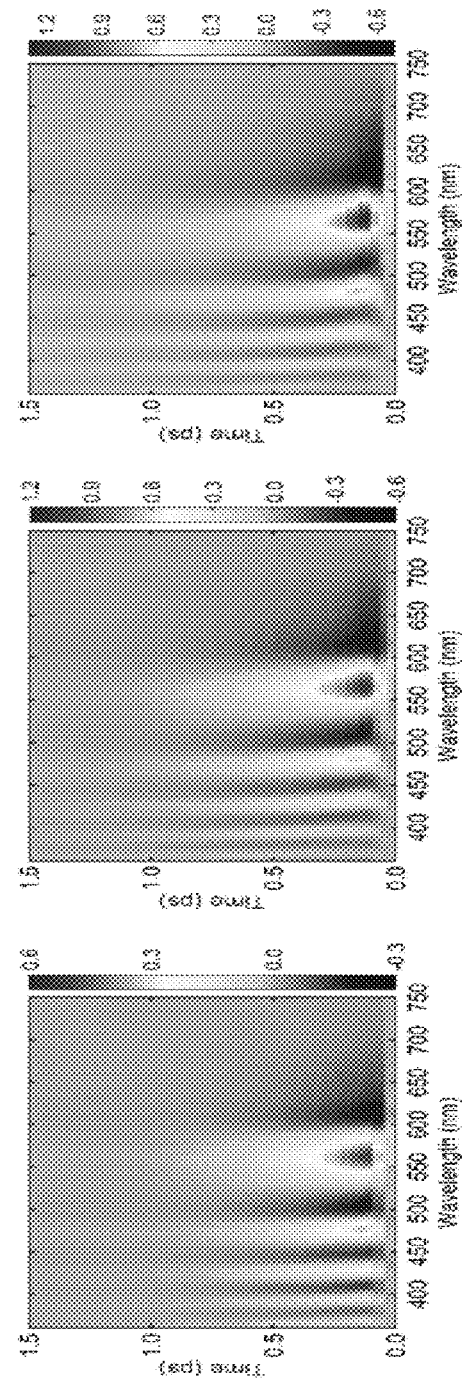

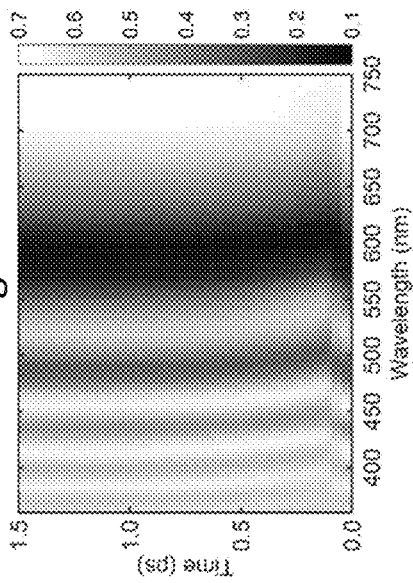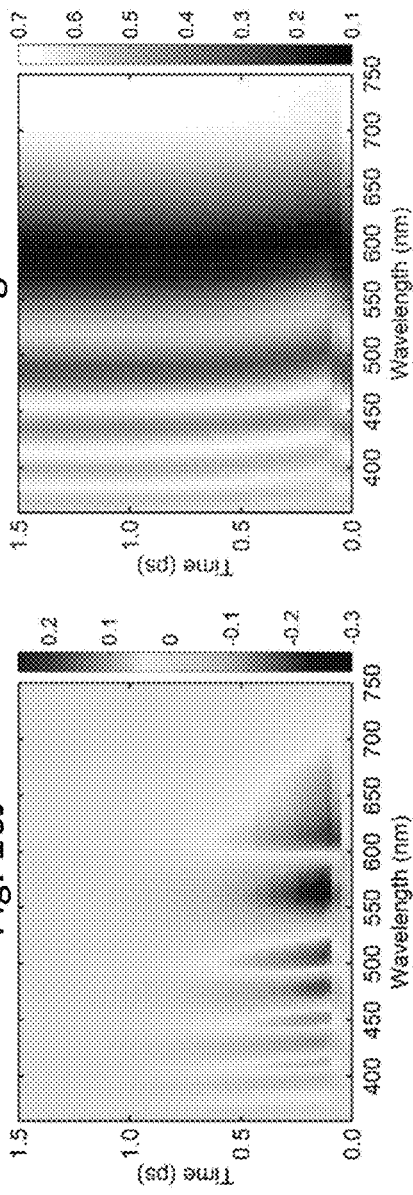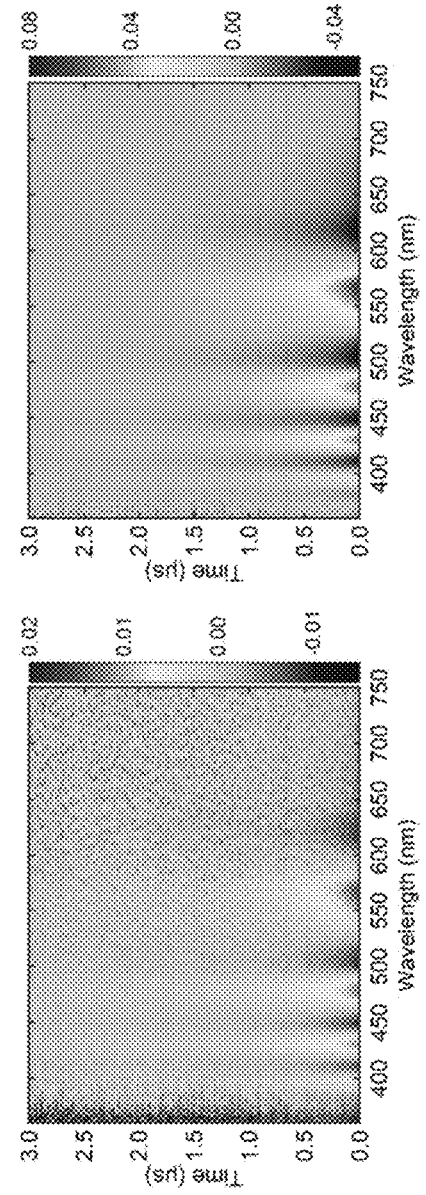
Fig. 16J  Fig. 16K  Fig. 16L  Fig. 16M

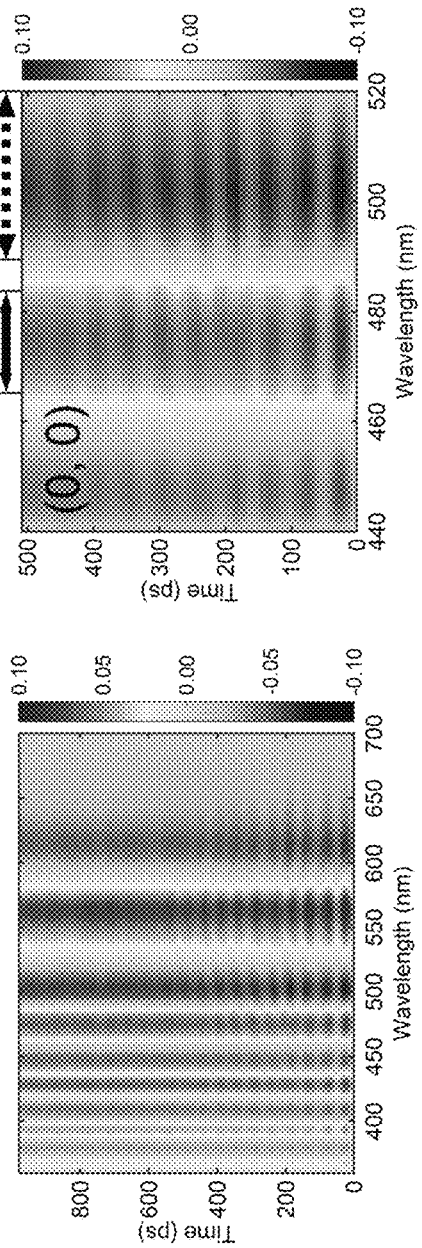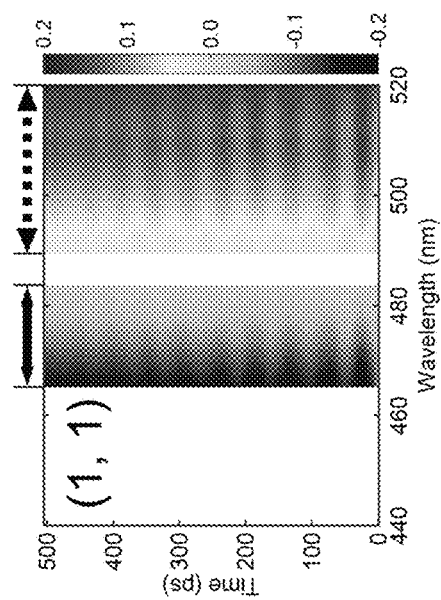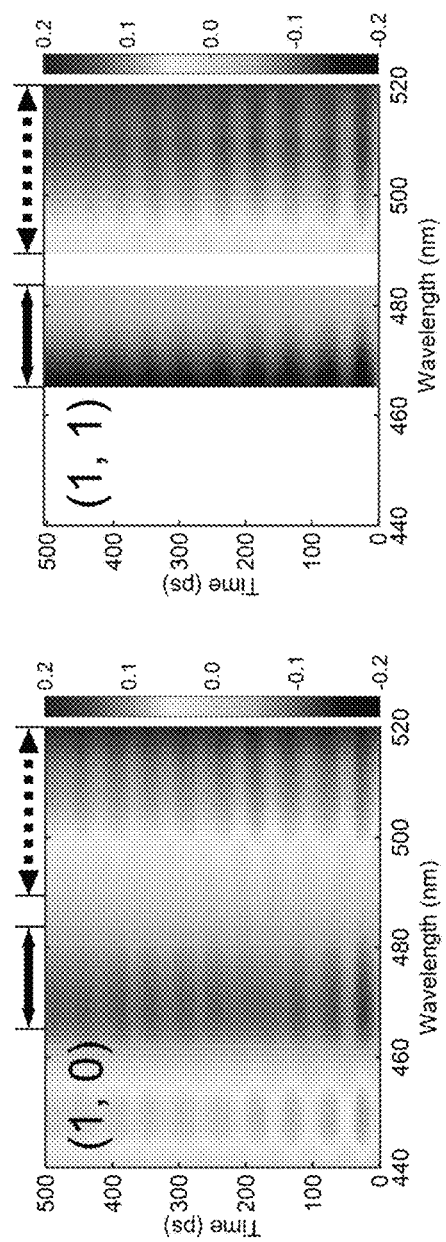
Fig. 18A  Fig. 18B  Fig. 18C  Fig. 18D

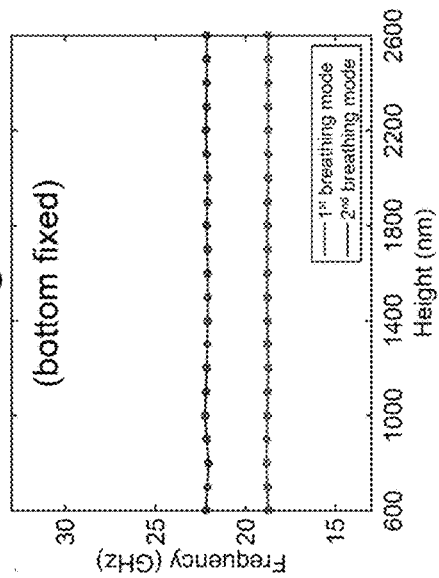
Fig. 19E (free standing)
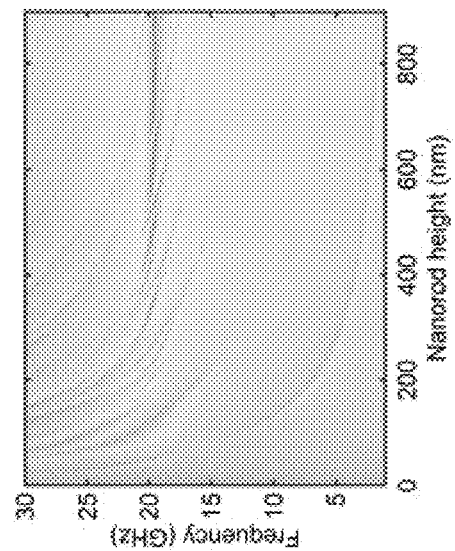
Fig. 19F (bottom fixed)
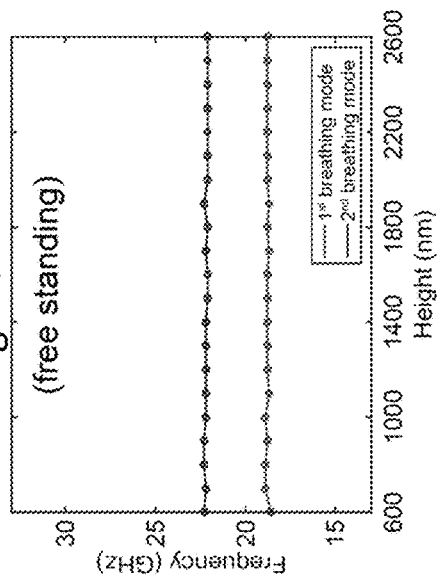
Fig. 19G
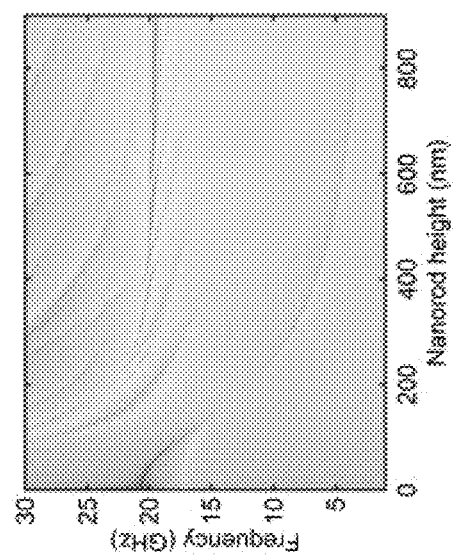
Fig. 19H

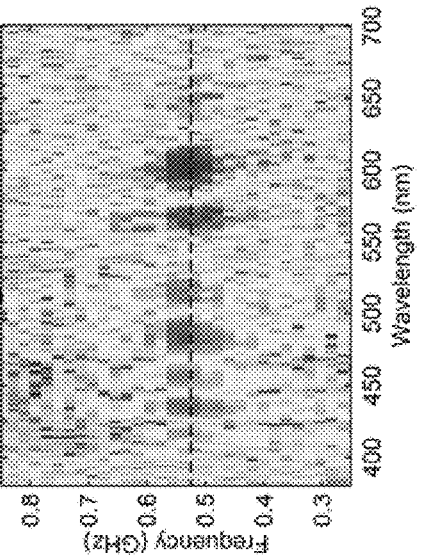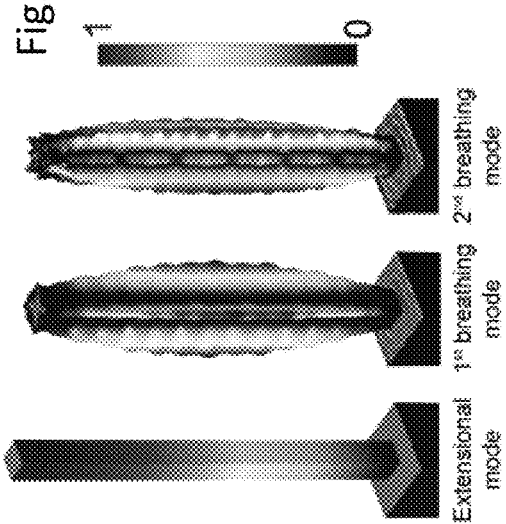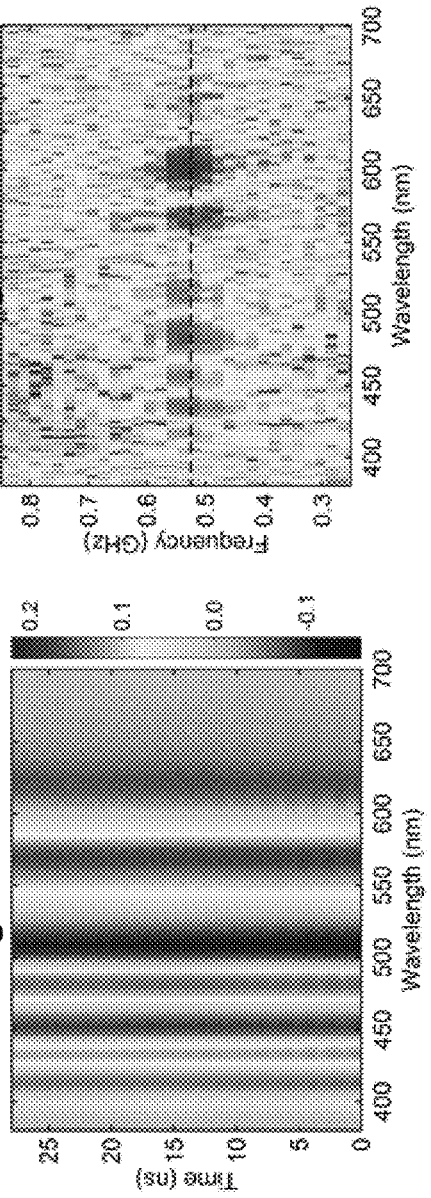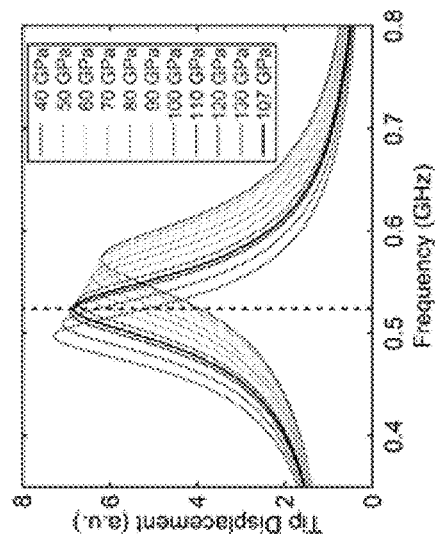
Fig. 21A
Fig. 21B
Fig. 21C
Fig. 21D

ULTRAFAST ALL-OPTICAL MODULATION OF THE VISIBLE AND INFRARED SPECTRUM WITH NANOROD ARRAYS

CROSS REFERENCE TO RELATED APPLICATIONS

This application claims priority benefit from U.S. Application Ser. No. 62/290,908, filed 3 Feb. 2016, the entirety of which is incorporated herein by reference.

STATEMENT OF GOVERNMENT INTEREST

This invention was made with government support under DE-AC02-06CH11357 awarded by the U.S. Department of Energy and DMR1121262 awarded by the National Science Foundation. The government has certain rights in the invention.

FIELD OF INVENTION

Disclosed herein are methods of all-optical modulation of light. More particularly, the methods are directed to ultrafast all-optical modulation of the visible and infrared spectrum with nanorod arrays.

BACKGROUND

While active plasmonics in the ultraviolet to visible has been demonstrated, control in the near-infrared (NIR) to mid-infrared (MIR) spectral range has recently attracted significant attention for importance in telecommunications, thermal engineering, infrared sensing, light emission and imaging. Infrared plasmonics has been demonstrated with materials such as colloidal quantum dots, Si and InAs, and graphene. However, challenges include material instabilities and strong infrared absorption of solvents (quantum dots in solution), limited carrier densities (Si and InAs) and spectral range (graphene).

Noble metallic nanostructures possess large negative permittivity in the visible and near-infrared (NIR) range, and can therefore concentrate optical fields into subwavelength dimensions with enhanced nonlinear plasmonic response. However, the high electron concentration in noble metals limits the extent to which the electron distribution can be modified and with it the achievable permittivity modulation. In addition, strong interband transitions in the visible range (such as those from the d-band to the Fermi-surface in gold at an energy of ~2.4 eV) give rise to a large dispersion of the permittivity modulation versus wavelength, which furthermore can overlap with their plasmonic resonances, thereby complicating the design of nonlinear optical devices.

As a result, there is a need for new materials and methods for all-optical modulation over a broad spectral range (from the visible to the infrared range) with ultrafast dynamics.

SUMMARY OF THE INVENTION

Disclosed herein is a method of optical modulation, the method comprising irradiating an optical switch with a control beam at a first control time and irradiating the optical switch with a signal beam at a signal time. The transmitted intensity of the signal beam in a direction depends on the delay time between the first control time and the signal time and the transmitted intensity of the signal beam in the direction is detectably different than a static signal. The optical switch comprises a nanorod array, the nanorod array comprising a plurality of nanorods extending outwardly from a substrate. In some embodiments, the nanorod array is arranged in a regular periodic pattern. In particular embodiments, the nanorod array has a periodicity of about 30 nm to about 5000 nm. In particular embodiments, the nanorod array comprises a plurality of nanorods having an average height of about 30 nm to about 5000 nm. In particular embodiments, the nanorod array comprises a plurality of nanorods having an average edge length of about 10 nm to about 500 nm.

The plurality of nanorods may comprise a transparent conducting oxide, a transparent conducting nitride, a transparent conducting carbide, or a transparent conducting silicide. In a particular embodiment, the plurality of nanorods comprise indium tin oxide. In some embodiments, plurality of nanorods comprise a plurality of film coated nanorods. In some embodiments, the substrate comprises indium tin oxide, yttria stabilized oxide, and/or aluminum oxide.

The method may further comprise irradiating the optical switch with a second control beam at a second control time, wherein the transmitted intensity of the signal beam in the direction depends on the delay time between the second control time and the signal time and the transmitted intensity of the signal beam in the direction is detectably different than a static signal. In particular embodiments, the first control time and the second control time are in controlled displacement.

The center wavelength of the control beam may be in the visible spectrum, the near infrared spectrum, mid infrared spectrum, or a combination thereof. The signal beam probe comprises wavelengths from the visible spectrum, near-infrared spectrum, mid-infrared spectrum, or a combination thereof. In particular embodiments, the signal beam is a broad band signal beam. In some embodiments, the control beam and/or the signal beam irradiate the nanorod array from an angle of incidence of 0° to 70°. In some embodiments, the control beam and/or the signal beam has a fluence less than 10 mJ/cm2.

The method may further comprise detecting the transmitted intensity of the signal beam in the direction. In some embodiments, the direction is substantially parallel with a forward propagation direction of the signal beam. In other embodiments, the direction is oblique with a forward propagation direction of the signal beam.

In some embodiments, the control beam excites a vibrational mode of the plurality of nanorod arrays and the transmitted intensity of the signal beam in the direction is modulated by the frequency of the vibrational mode. In particular embodiments, the vibrational mode is an extensional mode or a breathing mode.

BRIEF DESCRIPTION OF THE DRAWINGS

FIG. 1E shows experimental MIR transmission spectra at different incidence angles (from 0° to 70°) under p-polarization (referenced to air).

FIG. 1F shows simulated MIR transmission spectra at different incidence angles (from 0° to 70°) under p-polarization (referenced to air).

FIG. 1G shows simulated near-field distributions for the longitudinal LSPR at 30° incidence angle under p-polarization. Left: $E_y$ (scattered field) and $H_x$ (scattered field) in the y-z plane cutting through the center of the nanorod. Right: $E_z$ (scattered field), $H_y$ (scattered field) and $|E|$ (total field) in the z-x plane cutting through the center of the nanorod. Incident plane wave propagates in the x-z plane, with its electric field polarized in the x-z plane (indicated by k and E in the right figure) and magnetic field polarized along y direction (indicated by H in the left figure). All fields are normalized by the incident wave. Color-bar max (min) for $E_y$, $H_x$, $E_z$, $H_y$ and $|E|$ are 1.5 (−1.5), 2.5 (−2.5), 1 (−1), 2.5 (−2.5), and 2.5 (0), respectively.

FIG. 1I shows static MIR transmission spectra of the ITO-NRA measured at incidence angles from 0° to 70° under s-polarization (referenced to air).

FIG. 1J shows a transient spectral map measured at 0° incidence angle with s-polarized probe (fluence was 4.9 mJ/cm$^2$).

FIG. 1K shows a transient spectral map measured at 30° incidence angle with s-polarized probe (fluence was 4.9 mJ/cm$^2$).

FIG. 1L shows a transient spectral map measured at 50° incidence angle with s-polarized probe (fluence was 4.9 mJ/cm$^2$).

FIG. 2H shows a spectral map measured at 30° incidence angles with p-polarized probe (corresponding to the transient spectra, and kinetics shown in FIG. 2E and FIG. 2F). Pump fluence was 0.45 mJ/cm$^2$.

FIG. 2I shows a spectral map measured at 30° incidence angles with p-polarized probe (corresponding to the transient spectra, and kinetics shown in FIG. 2E and FIG. 2F). Pump fluence was 0.56 mJ/cm$^2$.

FIG. 2J shows a spectral map measured at 30° incidence angles with p-polarized probe (corresponding to the transient spectra, and kinetics shown in FIG. 2E and FIG. 2F). Pump fluence was 1.11 mJ/cm$^2$.

FIG. 2K shows a spectral map measured at 30° incidence angles with p-polarized probe (corresponding to the transient spectra, and kinetics shown in FIG. 2E and FIG. 2F). Pump fluence was 1.79 mJ/cm$^2$.

FIG. 2P shows a ΔOD spectral map measured at 20° incidence angle under p-polarized probe. Pump fluence was 4.9 mJ/cm$^2$.

FIG. 2Q shows a ΔOD spectral map measured at 30° incidence angle under p-polarized probe. Pump fluence was 4.9 mJ/cm$^2$.

FIG. 2R shows a ΔOD spectral map measured at 40° incidence angle under p-polarized probe. Pump fluence was 4.9 mJ/cm$^2$.

FIG. 2S shows a ΔOD spectral map measured at 50° incidence angle under p-polarized probe. Pump fluence was 4.9 mJ/cm$^2$.

FIG. 3A shows a schematic diagram of the electron configurations and electronic processes involved in the NIR intraband pumping. For the conduction band, solid lines and dashed lines are constructed with nonparabolic and parabolic dispersions, respectively.

FIG. 3B shows the dependence of the plasma frequency on the electron temperature calculated for different conduction band nonparabolicities with a fixed effective mass at the conduction band minimum. Black arrow indicates increasing the nonparabolicity from 0 eV$^{-1}$ to 0.8 eV$^{-1}$ with a 0.1 eV$^{-1}$ step.

FIG. 3C shows calculated dependences of plasma frequency and electron temperature on the calculated excitation energy density (upper x-axis) and the corresponding experimental pump fluences (lower x-axis). Circles in both curves are associated with experimentally used pump fluences.

FIG. 3D shows a finite-element simulation predicted MIR transmission spectra using plasma frequencies that correspond to experimental conditions (red circles in FIG. 3C).

FIG. 8A shows a 30° tilted SEM image of the ITO-NRA (1 μm pitch size, 2.6 μm height, 180 nm side length). Scale bar is 2 μm.

FIG. 8B shows an experimental static transmission spectrum in the visible range (referenced to air). $\lambda_1$ to $\lambda_5$ indicate the wavelengths of the transmission minima.

FIG. 8C shows an experimental transmission spectrum in the near-infrared range (referenced to air).

FIG. 8D shows a near-field plots for the five transmission minima marked in FIG. 8B. Electric field intensities are plotted for the plane cutting through the centre of the nanorod, and are normalized by the electric field intensity of the incident wave.

FIG. 8E shows a refractive index of ITO, and the simulated effective mode index of the nanorod waveguide. Circles are mode index calculated by equation $\lambda_m=2h(n_{eff}-1)/(2m-1)$ based on experimentally observed transmission minima wavelengths.

FIG. 8F shows simulated transmission spectra for one of the four equivalent (1, 0) and (1, 1) grating orders, shown as $T_{(1, 0)}$ and $T_{(1, 1)}$, and the zero degree (0, 0) reflection (shown as $R_{(0, 0)}$).

FIG. 8G shows a photograph of the zero and higher grating orders produced by diffraction of a broadband visible probe by the ITO-NRA sample at normal incidence.

FIG. 8H shows a simulated total electric field distribution at transmission minima $\lambda_1$ averaged over the length of the nanorod.

FIG. 8I shows a simulated total electric field distribution at transmission minima $\lambda_2$ averaged over the length of the nanorod.

FIG. 8J shows a simulated total electric field distribution at transmission minima $\lambda_3$ averaged over the length of the nanorod.

FIG. 8K shows a simulated total electric field distribution at transmission minima $\lambda_4$ averaged over the length of the nanorod.

FIG. 8L shows a simulated total electric field distribution at transmission minima $\lambda_5$ averaged over the length of the nanorod.

FIG. 8Q shows a transmission spectrum of a 0.5 mm thick YSZ substrate.

FIG. 8R shows a comparison of the simulated and experimental transmission spectra of the ITO-NRA.

FIG. 9A shows $\Delta T(t)/T(0)$ spectral map of the ITO-NRA for the first 1.5 ps under a pump fluence of 3.71 mJ·cm$^{-2}$. Purple arrow & black dashed line indicate $t_{e,0}$, which is the beginning of the fast component when $\Delta T(t)/T(0)$ amplitude reaches a maximum.

FIG. 9B shows fluence dependent $\Delta T(t)/T(0)$ spectra at $t_{e,0}$. Legend has a unit of mJ·cm$^{-2}$ and applies to FIG. 9B-9D.

FIG. 9C shows fluence dependent T(t) spectra at $t_{e,0}$.

FIG. 9D shows fluence dependent $\Delta T(t)$ spectra at $t_{e,0}$.

FIG. 10A shows a waveguide simulation predicted effective mode index as a function of wavelength and change of the real part of the relative permittivity (on top of the static value). Black solid lines indicate the calculated transmission minima wavelengths using equation $\lambda_m=2h(n_{eff}-1)/(2m-1)$.

FIG. 10B shows an optical simulation predicted transmission spectra after adding various constant imaginary parts (independent of wavelength), Δn", to the static refractive index of the ITO-NRA.

FIG. 10C shows $\Delta\epsilon'(\omega)$ at $t_{e,0}$ (beginning of the fast component) deduced from experimental data.

FIG. 10D Top: schematic band diagram showing the modification of interband transitions from 300 K (left) to 930 K (right). Bottom: Fermi distribution and change of Fermi distribution for the electron gas at 300 K (left) and 930 K (right).

FIG. 10E shows $\Delta\epsilon'(\omega)$ obtained by the theoretical calculation (curve); red circles represent $\Delta\epsilon'(\omega)$ obtained from the experimental data. Both data are plotted for electron gas at 930 K, corresponding to the lowest pump fluence of 73 μJ·cm−2.

FIG. 10F shows photon energy (x axis) and electron temperature (y axis) dependent $\Delta\epsilon'(\omega)$ obtained from the theoretical calculation; the vertical dashed line indicates the optical transition associated with electrons excited to the conduction band minimum.

FIG. 10G shows schematic diagram of the direct interband optical transition in a semiconductor with a non-parabolic conduction band and a parabolic valence band.

FIG. 10H shows an electron distribution as a function of $E_c$ and electron temperature. The vertical dashed line indicates the conduction band minimum.

FIG. 10I show a change of electron distribution as a function of $E_c$ and electron temperature. The vertical dashed line indicates the conduction band minimum. The dotted line in indicates the temperature dependent electron chemical potential $\mu$.

FIG. 10J shows $E_c$ as a function of photon energy $\hbar\omega$. The vertical dashed line indicates the conduction band minimum. The dotted line indicates the temperature dependent electron chemical potential $\mu$.

FIG. 10K shows a change of electron distribution as a function of photon energy $\hbar\omega$ and electron temperature. The vertical dashed line indicates the conduction band minimum.

FIG. 10L show a joint-density-of-states $\rho(\hbar\omega)$ as a function of photon energy $\hbar\omega$. The vertical dashed line indicates the conduction band minimum.

FIG. 10M shows a product of the electron distribution change and $\rho(\hbar\omega)$ as a function of photon energy and electron temperature. The vertical dashed line indicates the conduction band minimum.

FIG. 10N shows a change of the imaginary part of the relative permittivity as a function of photon energy and electron temperature. The vertical dashed line indicates the conduction band minimum.

FIG. 10O shows $\alpha(\omega)$ obtained from ellipsometry measurement of an ITO film (red line) and theoretically calculated $\alpha(\omega)$ for the case of a constant matrix element of $(2.8\times10^{-49}$ J·kg$)^{1/2}$ (blue line). The dash-dot line represents the absorption onset energy, $E_g+\mu(300$ K$)$, obtained by extrapolating the straight dotted line to the $\alpha=0$ axis.

FIG. 10P shows experimental and simulated $\Psi$ and $\Delta$ angles for the ITO film in the ultraviolet to the visible range; the corresponding refractive indices from the ellipsometric data fitting were used to calculate $\alpha(\omega)$ shown in Supplementary FIG. 10O

FIG. 13A shows static transmission spectra at various incidence angles (from 0° to 50° in 10° increments, referenced to air).

FIG. 13B shows $\Delta T(t)/T(0)$ spectral maps measured at 10° plotted for delay times up to 1.5 ps. Measurement was performed for the (0, 0) order, and the pump fluence was 3.71$\times\cos\theta_{inc}$ mJ·cm$^{-2}$, where $\theta_{inc}$ is the incidence angle.

FIG. 13C shows $\Delta T(t)/T(0)$ spectral maps measured at 20° plotted for delay times up to 1.5 ps. Measurement was performed for the (0, 0) order, and the pump fluence was 3.71$\times\cos\theta_{inc}$ mJ·cm$^{-2}$, where $\theta_{inc}$ is the incidence angle.

FIG. 13D shows $\Delta T(t)/T(0)$ spectral maps measured at 30° plotted for delay times up to 1.5 ps. Measurement was performed for the (0, 0) order, and the pump fluence was 3.71$\times\cos\theta_{inc}$ mJ·cm$^{-2}$, where $\theta_{inc}$ is the incidence angle.

FIG. 14A shows light intensity redistribution for the (0, 0) grating order, plotted for delay times up to 1.7 ps.

FIG. 14B shows light intensity redistribution for the (1, 0) grating order, plotted for delay times up to 1.7 ps.

FIG. 14C shows light intensity redistribution for the (1, 1) grating order, plotted for delay times up to 1.7 ps.

FIG. 15A shows a static transmission spectrum for an ITO-NRA sample with 1.4 $\mu$m height.

FIG. 15B shows a $\Delta T(t)/T(0)$ spectrum at delay time $t_{e,0}$ for an ITO-NRA sample with 1.4 $\mu$m height.

FIG. 15C shows a $\Delta T(t)/T(0)$ spectrum at delay time $t_{1,0}$ (850 ps) for an ITO-NRA sample with 1.4 $\mu$m height.

FIG. 15D shows a static transmission spectrum for an ITO-NRA sample with 2.9 $\mu$m height.

FIG. 15E shows a ΔT(t)/T(0) spectrum at delay time $t_{e,0}$ for an ITO-NRA sample with 2.9 μm height.

FIG. 15F shows a ΔT(t)/T(0) spectrum at delay time $t_{1,0}$ (850 ps) for ITO-NRA sample with 2.9 μm height.

FIG. 15G shows an SEM image for an ITO-NRA with 1.4 μm height. Scale bars 2 μm.

FIG. 15H shows a static NIR transmission spectrum for and ITO-NRA with 1.4 μm height.

FIG. 15I shows an ΔT(t)/T(0) spectral map for an ITO-NRA with 1.4 μm height.

FIG. 15J shows an SEM image for an ITO-NRA with 2.9 μm height. Scale bars 2 μm.

FIG. 15K shows a static NIR transmission spectrum for and ITO-NRA with 2.9 μm height.

Figure 1A:
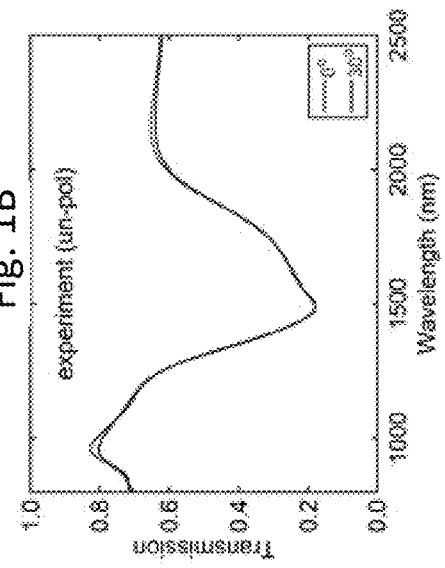
FIG. 1A shows a scanning electron microscopy (SEM) image of the ITO-NRA (30° tilted view).

FIG. 15L shows an ΔT(t)/T(0) spectral map for an ITO-NRA with 2.9 μm height.

FIG. 16A shows transient ΔT(t)/T(0) spectral maps for the fast components for delay times up to 1.5 ps. Pump fluence 0.073 mJ·cm$^{-2}$.

FIG. 16B shows transient ΔT(t)/T(0) spectral maps for the fast components for delay times up to 1.5 ps. Pump fluence 0.114 mJ·cm$^{-2}$.

FIG. 16C shows transient ΔT(t)/T(0) spectral maps for the fast components for delay times up to 1.5 ps. Pump fluence 0.235 mJ·cm$^{-2}$.

FIG. 16D shows transient ΔT(t)/T(0) spectral maps for the fast components for delay times up to 1.5 ps. Pump fluence 0.373 mJ·cm$^{-2}$.

FIG. 16E shows transient ΔT(t)/T(0) spectral maps for the fast components for delay times up to 1.5 ps. Pump fluence 0.739 mJ·cm$^{-2}$.

FIG. 16F shows transient ΔT(t)/T(0) spectral maps for the fast components for delay times up to 1.5 ps. Pump fluence 1.177 mJ·cm$^{-2}$.

FIG. 16G shows transient ΔT(t)/T(0) spectral maps for the fast components for delay times up to 1.5 ps. Pump fluence 1.859 mJ·cm$^{-2}$.

FIG. 16H shows transient ΔT(t)/T(0) spectral maps for the fast components for delay times up to 1.5 ps. Pump fluence 6.755 mJ·cm$^{-2}$.

FIG. 16I shows transient ΔT(t)/T(0) spectral maps for the fast components for delay times up to 1.5 ps. Pump fluence 10.72 mJ·cm$^{-2}$.

FIG. 16J shows ΔOD(t) spectral maps for the first 1.5 ps under a pump fluence of 3.71 mJ·cm$^{-2}$.

FIG. 16K shows T(t) spectral maps for the first 1.5 ps under a pump fluence of 3.71 mJ·cm$^{-2}$.

FIG. 16L shows transient ΔT(t)/T(0) spectral maps of the slow component for delay times up to 3 μs. Pump fluence 1.31 mJ·cm−2.

FIG. 16M shows transient ΔT(t)/T(0) spectral maps of the slow component for delay times up to 3 μs. Pump fluence 9.2 mJ·cm−2.

Figure 17A:
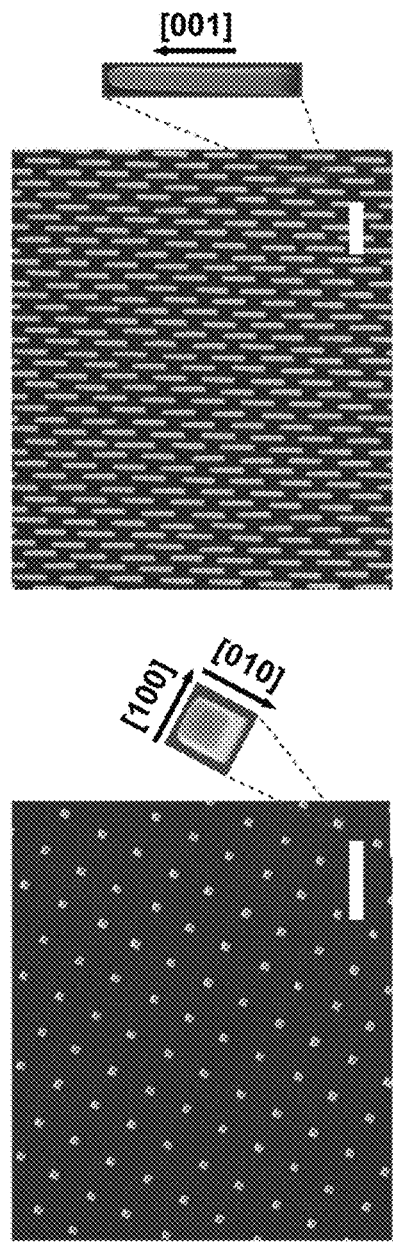

FIG. 17A shows top-down and 30° views of the ITO-NRA under scanning electron microscope. Scale bars in are 2 μm. Zoom-in views illustrate the crystalline directions of the nanorod.

Figure 17D:
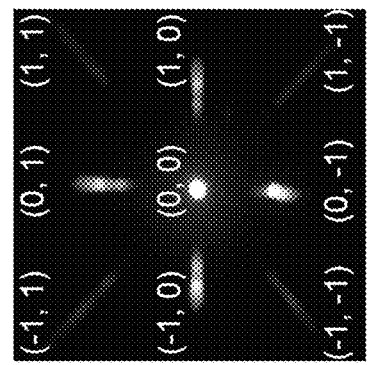
Figure 17C:
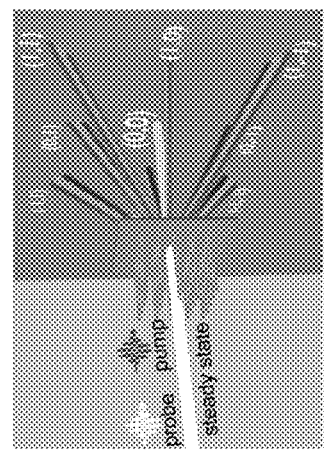
Figure 17B:
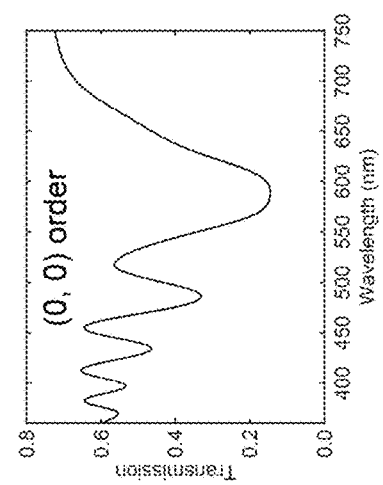

FIG. 17B shows a transmission spectrum of the ITO-NRA in the visible range (referenced to air).

FIG. 17C shows a schematic diagram of the optical diffraction, as well as the static and transient absorption measurements.

FIG. 17D shows a photograph of the diffraction spots produced from a white-light probe transmitted through the sample at normal incidence.

Figure 17E:
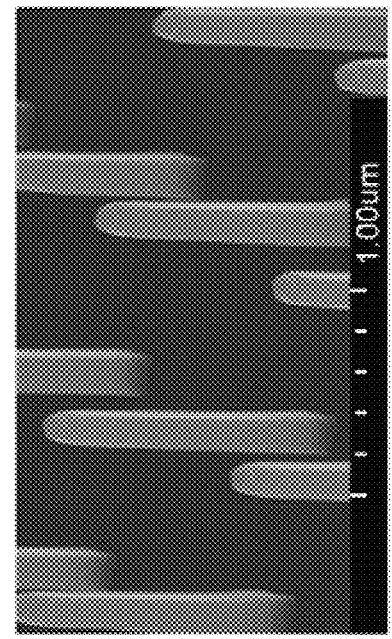

FIG. 17E shows a top-down view of the ITO nanorods under scanning electron microscope (SEM) with high resolution.

Figure 17F:
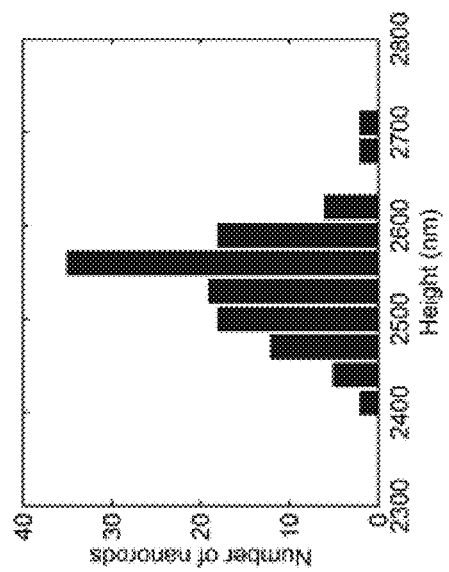

FIG. 17F shows a 30° view of the ITO nanorods under scanning electron microscope (SEM) with high resolution.

Figure 17G:
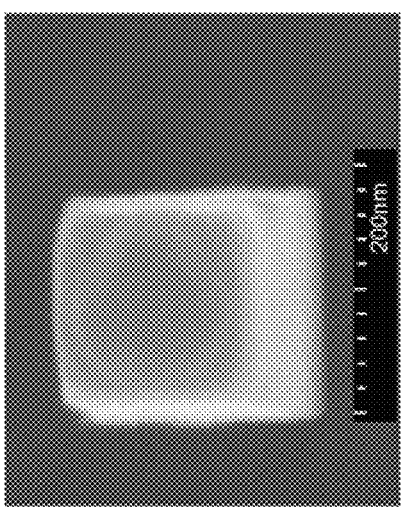
Figure 17H:
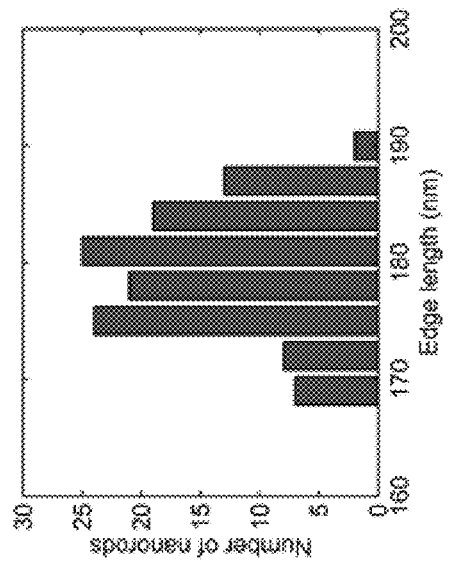

FIG. 17G shows a histogram of the nanorod edge length. Data shown were acquired from SEM measurements on 120 individual nanorods FIG. 17H shows a histogram of the nanorod height. Data shown were acquired from SEM measurements on 120 individual nanorods.

Figure 17I:
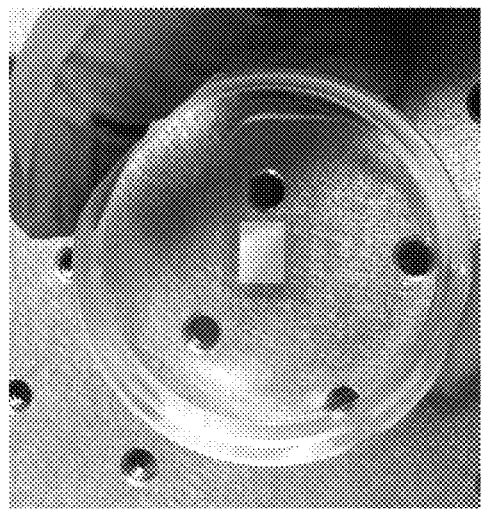

FIG. 17I shows a photograph of the ITO-NRA (0.6 cm by 0.9 cm) on YSZ substrate (1.27 cm by 1.27 cm).

Figure 17J:
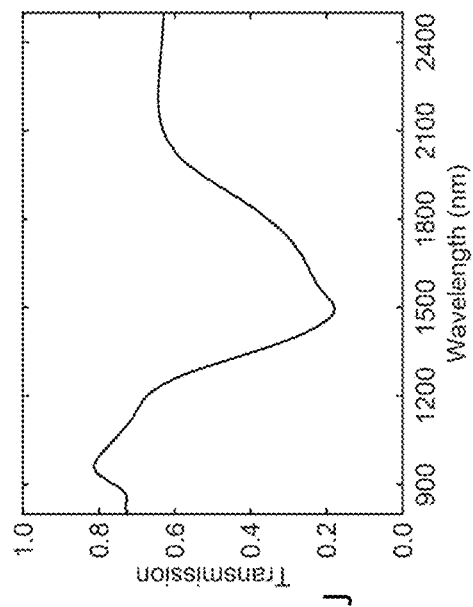

FIG. 17J shows a transmission spectrum of the ITO-NRA in the near-infrared range FIG. 18A a ΔT/T spectral map of the (0, 0) order for spectral range between 360 nm to 700 nm with delay time up to 1 ns. Pump fluence is 8.46 mJ·cm$^{-2}$.

FIG. 18B shows a ΔT/T spectral maps of the (0, 0) order plotted for delay times up to 500 ps. The solid arrow indicates the spectral window from 465 nm to 480 nm, and the dotted arrow indicates the spectral window from 490 nm to 520 nm. Data for the (0, 0) order is same as in FIG. 18A, but truncated in FIG. 18B for ease of comparison.

FIG. 18C shows a ΔT/T spectral maps of the (1, 0) orders plotted for delay times up to 500 ps. The solid arrow indicates the spectral window from 465 nm to 480 nm, and the dotted arrow indicates the spectral window from 490 nm to 520 nm.

FIG. 18D shows a ΔT/T spectral maps of the (1, 1) orders, plotted for delay times up to 500 ps. The solid arrow indicates the spectral window from 465 nm to 480 nm, and the dotted arrow indicates the spectral window from 490 nm to 520 nm. Data for the (0, 0) order is same as in (a), but truncated in (b) for ease of comparison.

Figure 18E:
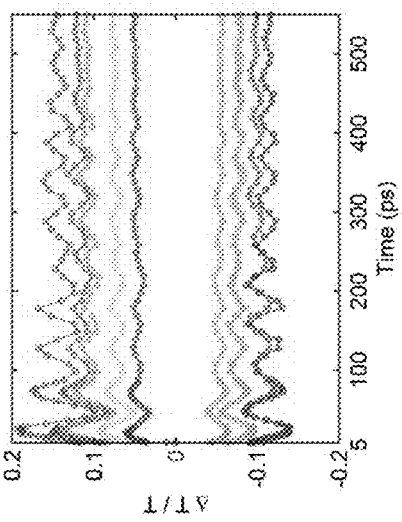

FIG. 18E shows a ΔT/T spectral map (pump fluence is 24.4 mJ·cm$^{-2}$).

Figure 18F:
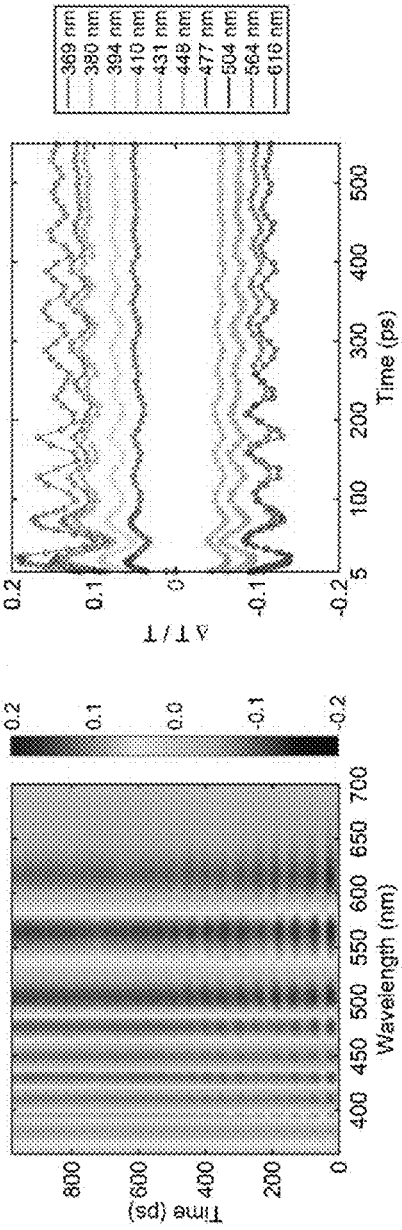

FIG. 18F shows ΔT/T kinetics at different wavelengths (data is same as shown in FIG. 18E, so pump fluence is 24.4 mJ·cm$^{-2}$).

Figure 18G:
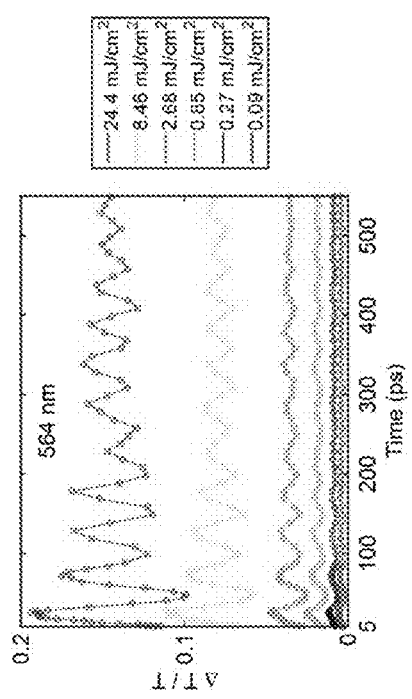

FIG. 18G shows ΔT/T kinetics at 564 nm under different pump fluences.

Figure 19B:
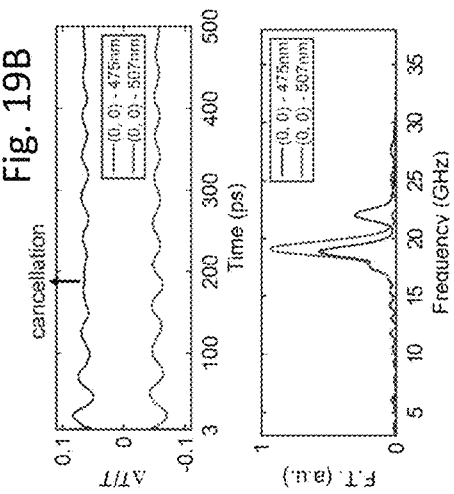
Figure 19D:
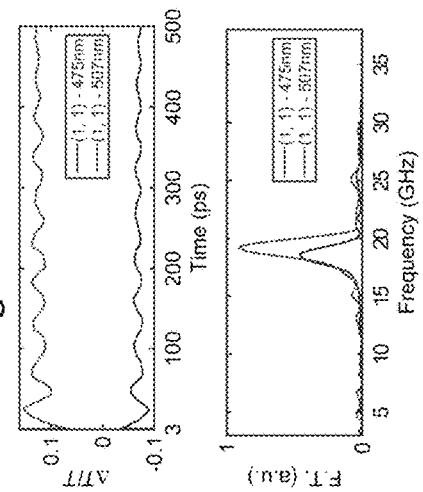
Figure 19C:
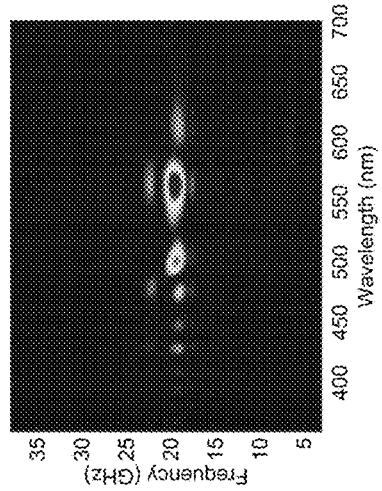
Figure 19A:
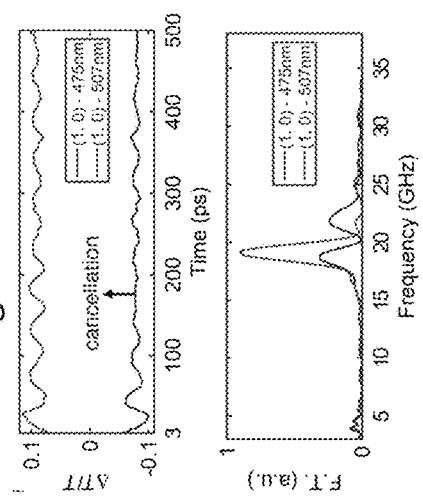

FIG. 19A shows a fourier transform of the ΔT/T spectral map for the (0, 0) order shown in FIG. 18B.

FIG. 19B shows ΔT/T kinetics at 475 nm and 507 nm for the (0, 0) order and their corresponding Fourier transform.

FIG. 19C shows ΔT/T kinetics at 475 nm and 507 nm for the (1, 0) order and their corresponding Fourier transform.

FIG. 19D shows ΔT/T kinetics at 475 nm and 507 nm for the (1, 1) order and their corresponding Fourier transform.

FIG. 19E shows Breathing mode frequencies as functions of the nanorod height for a free-standing ITO nanorod. The simulated ITO nanorod has an edge length of 180 nm. All simulations used $C_{11}$=277.5 GPa, $C_{12}$=107 GPa and $C_{44}$=33.8 GPa.

FIG. 19F shows breathing mode frequencies as functions of the nanorod height for a bottom-boundary-fixed ITO nanorod. The simulated ITO nanorod has an edge length of 180 nm. All simulations used $C_{11}$=277.5 GPa, $C_{12}$=107 GPa and $C_{44}$=33.8 GPa.

FIG. 19G shows integrated volumetric change (in log scale) as a function of nanorod height and vibrational frequency for a free-standing ITO nanorod.

FIG. 19H shows integrated volumetric change (in log scale) as a function of nanorod height and vibrational frequency for a bottom-boundary-fixed ITO nanorod.

Figure 19I:
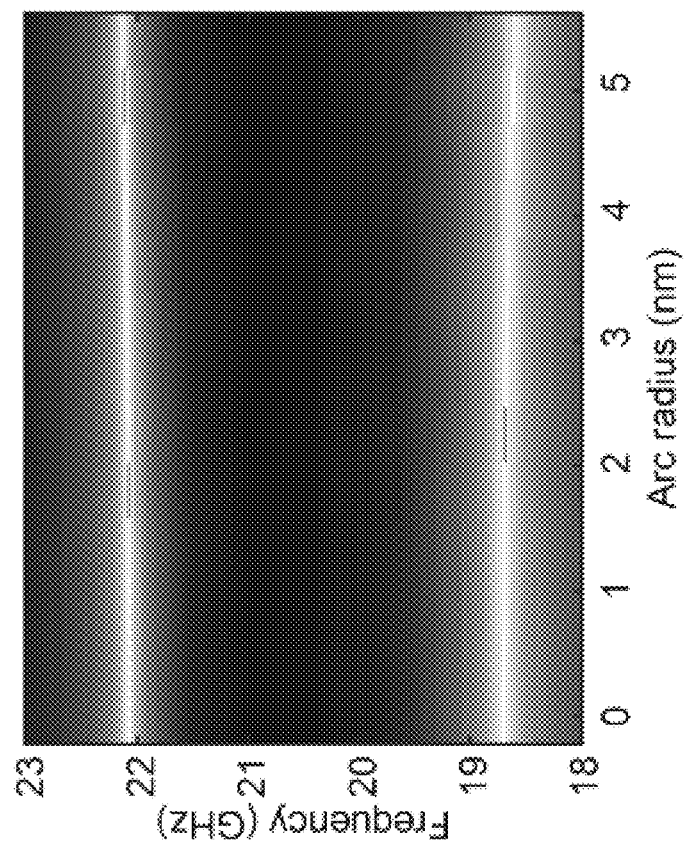

FIG. 19I shows dependence of the integrated volumetric change (in log scale) of the ITO nanorod cross-section on the radius of the 90°-arc corners and the vibrational frequency.

Figure 19K:
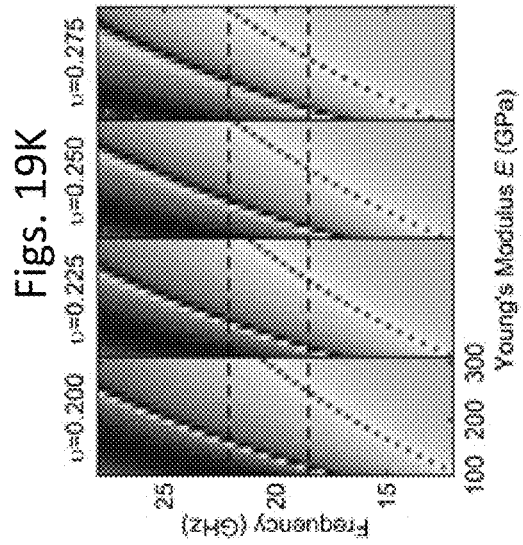
Figure 19M:
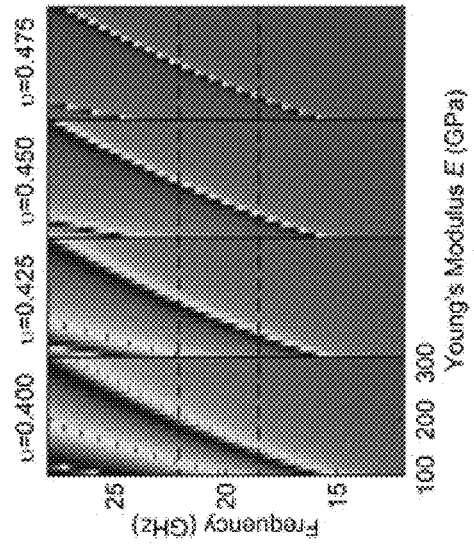
Figure 19J:
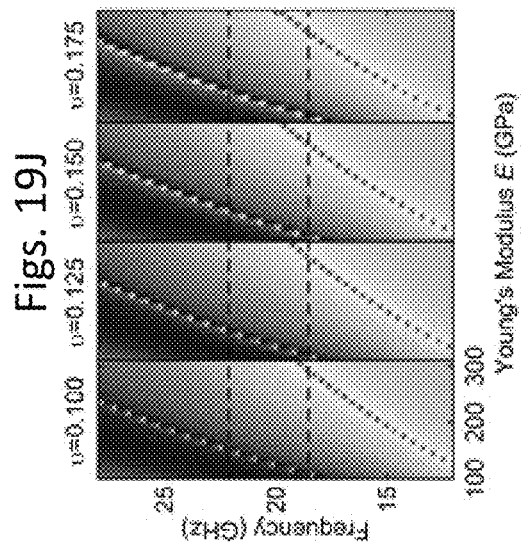

FIG. 19J shows integrated volumetric strain (in log scale) over the entire nanorod for different values of Young's Modulus E and Poisson's ratio υ. Each sub-panel is associated with a fixed υ but with E varying from 100 GPa to 300 GPa. Simulation results for υ swept from 0.1 to 0.475 with 0.025 per step are shown successively in the 4×4=16 sub-panels.

FIG. 19K shows integrated volumetric strain (in log scale) over the entire nanorod for different values of Young's Modulus E and Poisson's ratio υ. Each sub-panel is associated with a fixed υ but with E varying from 100 GPa to 300 GPa. Simulation results for υ swept from 0.1 to 0.475 with 0.025 per step are shown successively in the 4×4=16 sub-panels.

Figure 19L:
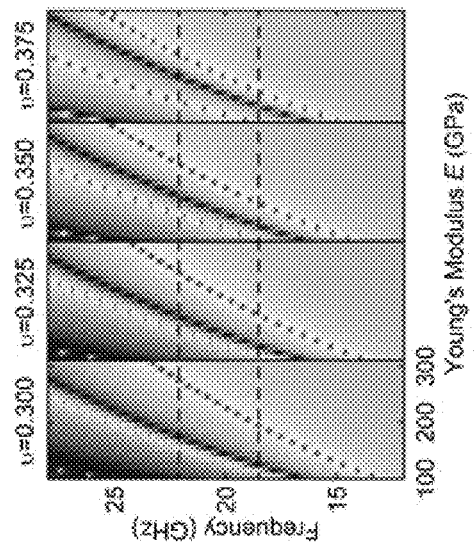

FIG. 19L shows integrated volumetric strain (in log scale) over the entire nanorod for different values of Young's Modulus E and Poisson's ratio υ. Each sub-panel is associated with a fixed υ but with E varying from 100 GPa to 300 GPa. Simulation results for υ swept from 0.1 to 0.475 with 0.025 per step are shown successively in the 4×4=16 sub-panels.

FIG. 19M shows integrated volumetric strain (in log scale) over the entire nanorod for different values of Young's Modulus E and Poisson's ratio υ. Each sub-panel is associated with a fixed υ but with E varying from 100 GPa to 300 GPa. Simulation results for υ swept from 0.1 to 0.475 with 0.025 per step are shown successively in the 4×4=16 sub-panels.

Figure 19N:
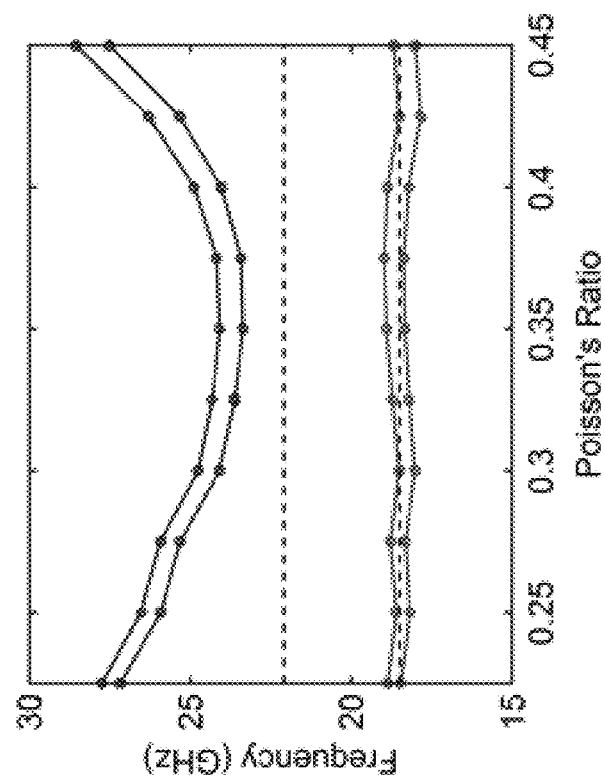

FIG. 19N shows Poisson's ratio dependence of the upper and lower frequency bounds for the 1st breathing mode and 2nd breathing mode identified from FIGS. 19J-19M. For each value of Poisson's ratio, two adjacent Young's moduli are chosen, for which the two corresponding simulated 1st breathing mode frequencies (shown as the two red lines) enclose the experimentally observed frequency of 18.7 GHz. The simulated 2nd breathing mode frequencies associated with these two Young's moduli are then plotted as blue lines. The lower and upper dashed lines (black color) indicate the experimentally observed 1st and 2nd breathing modes at 18.7 GHz and 22.1 GHz.

Figure 20B:
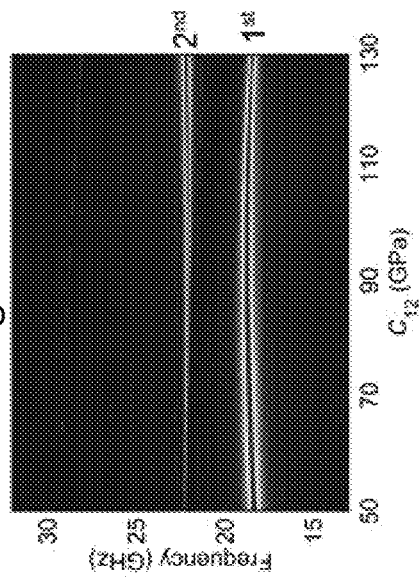
Figure 20D:
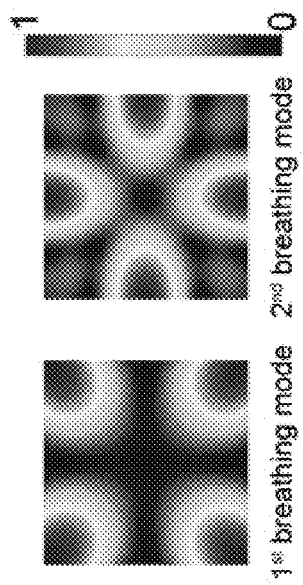
Figure 20A:
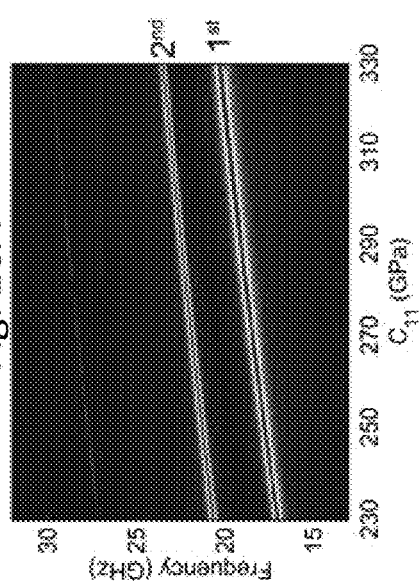

FIG. 20A shows finite-element simulations of the breathing modes with 2D cross-section simulation predicted volumetric strain integrated over the nanorod cross-section plotted as a function of frequency (shown as the vertical axis) and $C_{11}$ (shown as the horizontal axis).

FIG. 20B shows finite-element simulations of the breathing modes with 2D cross-section simulation predicted volumetric strain integrated over the nanorod cross-section plotted as a function of frequency (shown as the vertical axis) and $C_{12}$ (shown as the horizontal axis).

Figure 20C:
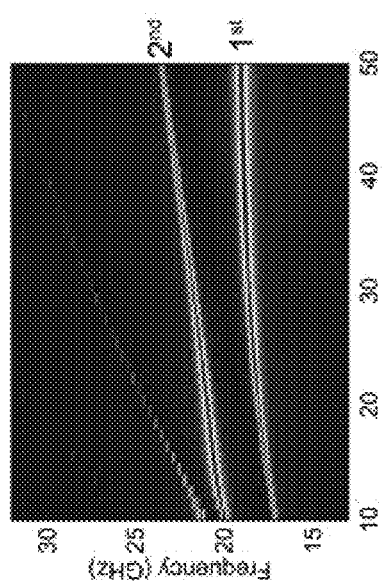

FIG. 20C shows finite-element simulations of the breathing modes with 2D cross-section simulation predicted volumetric strain integrated over the nanorod cross-section plotted as a function of frequency (shown as the vertical axis) and $C_{44}$, (shown as the horizontal axis).

FIG. 20D shows displacement amplitudes for the 1st and 2nd breathing modes (linearly scaled into the range of 0 to 1). Edge length of the cross-section is 180 nm. The common elastic constants used in simulations are $C_{11}$=277.5 GPa, $C_{12}$=107 GPa and $C_{44}$=33.8 GPa.

Figure 20E:
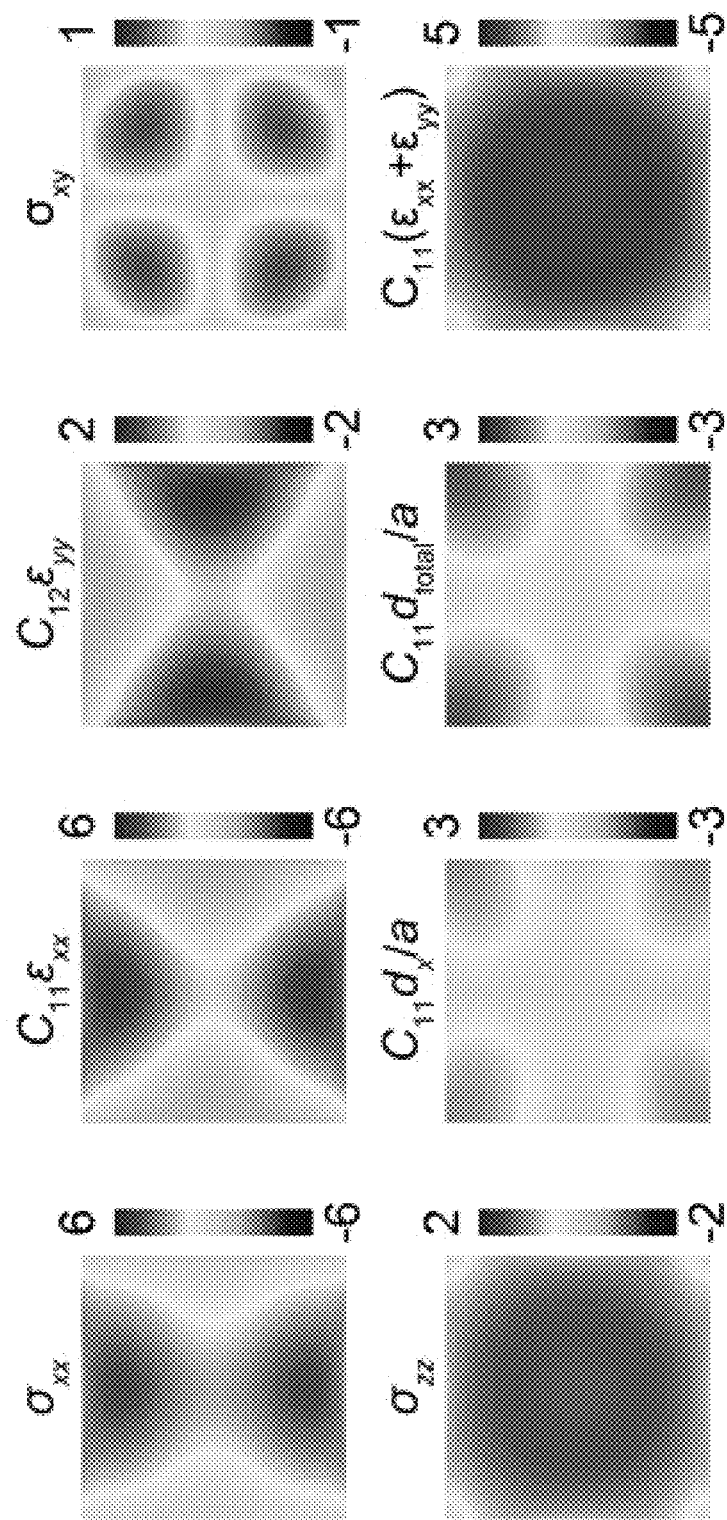

FIG. 20E Near-field plots of various stress components, strain components and displacement fields for the 1st breathing mode. All color bars are scaled equally in arbitrary units.

Figure 20F:
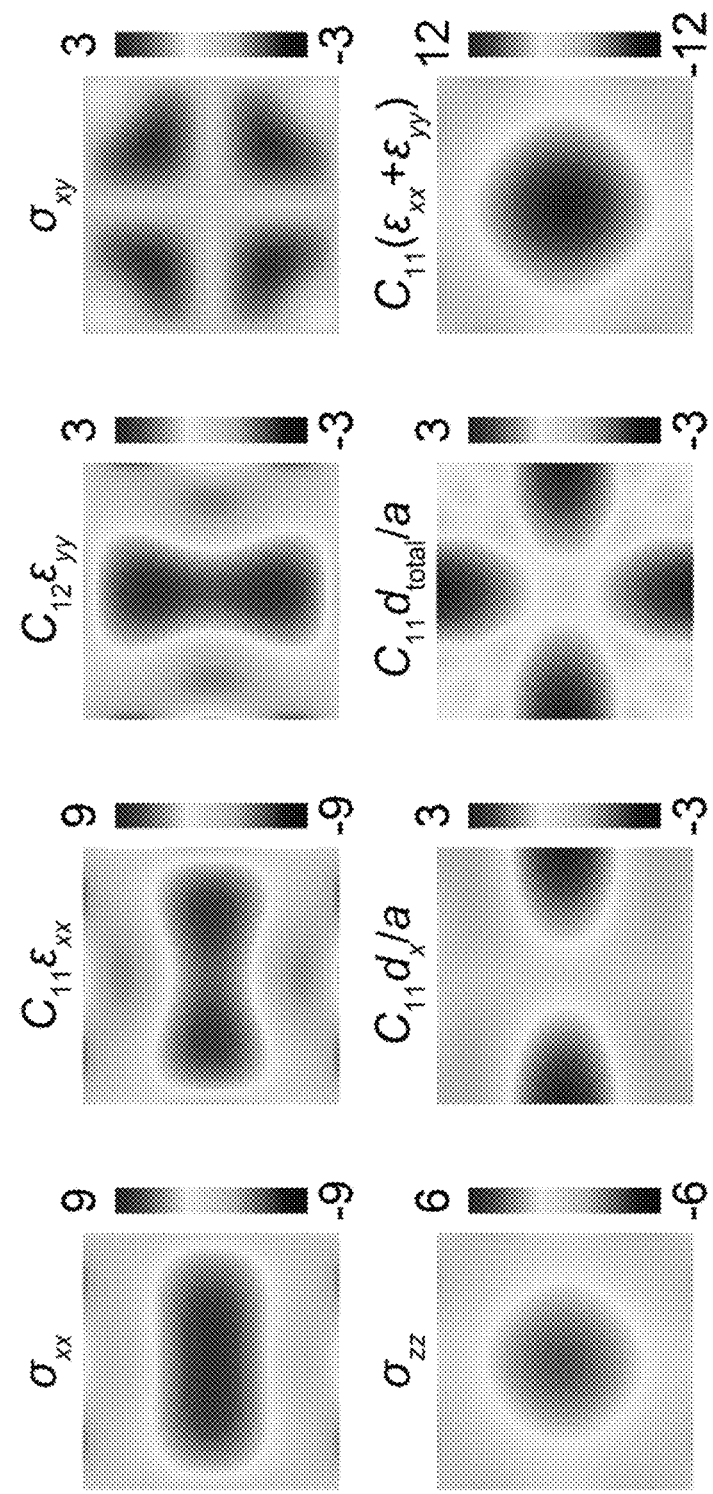

FIG. 20F shows near-field plots of various stress components, strain components and displacement fields for the 2nd breathing mode. All color bars are scaled equally in arbitrary units.

FIG. 21A shows a ΔT/T spectral map of the (0, 0) order for the spectral range between 360 nm to 700 nm with delay times up to 28 ns. Pump fluence is 34.2 mJ·cm$^{-2}$.

FIG. 21B shows a fourier transform of the ΔT/T spectral map shown in (a). The dashed line shows the weighted average of the vibrational frequency.

FIG. 21C shows a simulated displacement amplitude of the center of the nanorod top plane along the nanorod long axis for various $C_{12}$ values plotted as a function of frequency. Nanorod height and edge length in the simulation are 2561 nm and 180 nm, respectively. $C_{11}$ and $C_{44}$ are 277.5 GPa and 33.8 GPa.

FIG. 21D shows displacement amplitudes for the extensional mode and the two breathing modes. The displacement amplitude along the nanorod long axis is color-coded for the extensional mode; whereas total displacement amplitude is color-coded for the breathing modes. All displacement amplitudes are linearly scaled into the range of 0 to 1, and the deformation of the structure is linearly proportional to the corresponding displacement amplitudes.

Figure 21F:
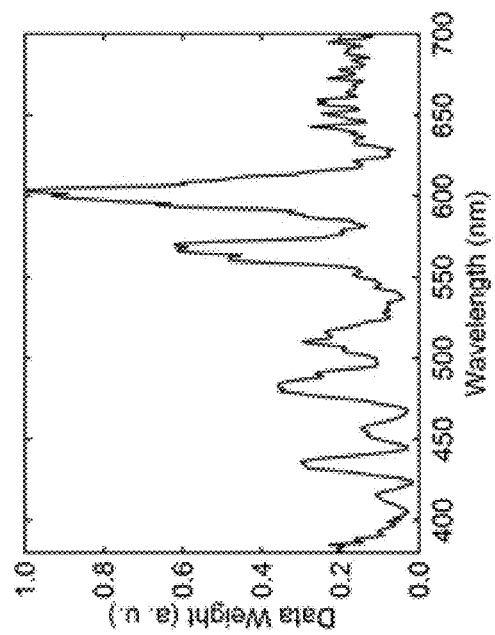
Figure 21E:
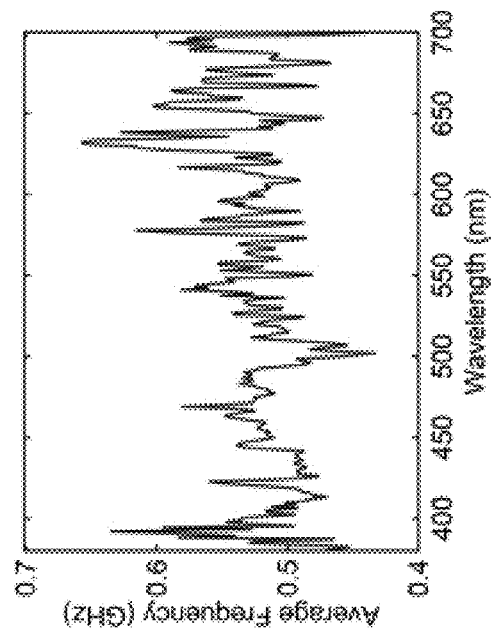

FIG. 21E shows the average frequency versus wavelength.

FIG. 21F shows a weight of the average frequency versus wavelength.

Figure 22B:
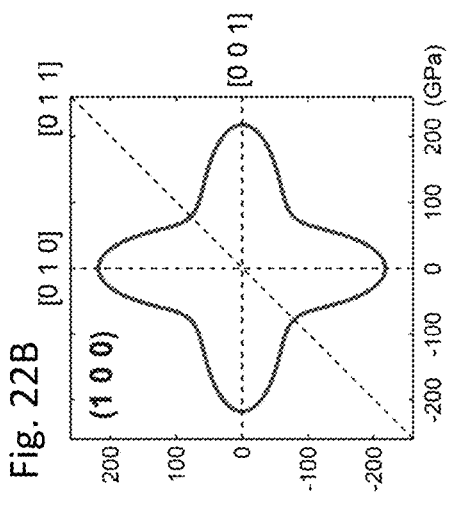
Figure 22D:
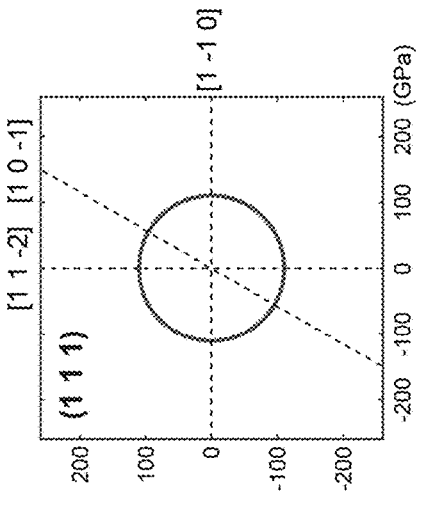
Figure 22A:
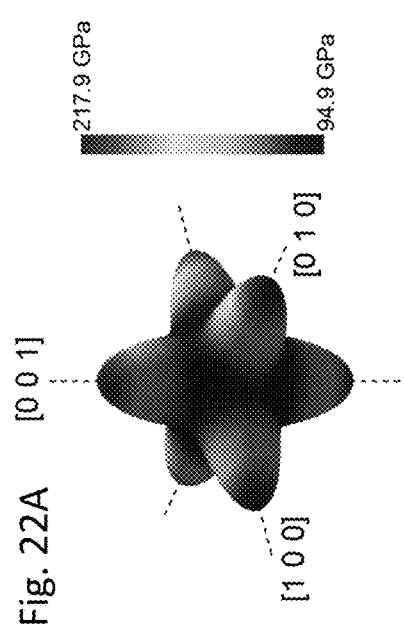

FIG. 22A shows a crystal-orientation dependent Young's modulus diagram for single-crystalline ITO. The distance from the origin to the surface is equal to the Young's modulus along that particular direction, and color-coded.

FIG. 22B shows a crystal orientation dependent Young's modulus for crystal directions in the (1 0 0) plane. Certain low-index directions are shown by the dashed line.

Figure 22C:
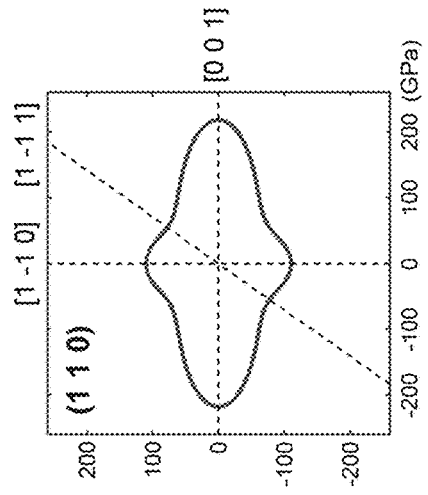

FIG. 22C shows a crystal orientation dependent Young's modulus for crystal directions in the (1 1 0) plane, respectively. Certain low-index directions are shown by the dashed line.

FIG. 22D shows a crystal orientation dependent Young's modulus for crystal directions in the (1 1 1) plane, respectively. Certain low-index directions are shown by the dashed line.

DETAILED DESCRIPTION OF THE INVENTION

Disclosed herein are all-optical switches and methods for all optical modulation. The all-optical switch is a device that permits controlling an optical signal with another optical signal. These devices have similarity to electrical transistors, the building blocks of computers, in which an electrical signal is controlled by another electrical signal. The ability to control signals allows for information processing functionalities for computing and communications. However, problems in electrical transistors include limited operating speed (limited to the gigahertz range). An alternative to signal processing is to use optical based techniques, where signals are all processed optically. For this purpose, photonic integrated circuits are proposed and actively pursued. This invention can be useful for performing functionalities in optical networks such as changing the amplitude of the beam (to realize the "on" and "off" states), changing the direction of the beam (to redirect signal transmission direction), and the polarization of the light. The light can be switched at hundreds of femto-seconds corresponding to a bandwidth in the terahertz regime.

The switching device is composed of periodic, vertically-aligned nanorod arrays. The switching device may be prepared by epitaxially growth of nanorods on a lattice matched substrate. Using an optical control beam to pump the nanorod array at its tunable plasmon resonance, one can switch a signal beam in the visible and infrared range with switching speed less than one picosecond, and absolute transmission modulation amplitudes of tens-of-percentage. In addition to turn-on and off functionalities, the nanorod array can also redistribute light intensities among different grating orders in the visible range in sub-picosecond time scales, and produce a periodic modulation of the signal beam with gigahertz frequency (corresponding to 10s of picosecond period), with differential transmission modulation amplitude. The switching in the infrared range primarily arises from a change of the plasma frequency of the nanorods, whereas the switching in the visible range primarily results from a change of the background permittivity of the nanorods. Both of change of the plasma frequency and background permittivity lead to a change of index of refraction of nanorods in respective ranges. The periodic modulation stems from the coherent acoustic vibrations of the nanorods following the optical pump.

The switching device allows for a number of different applications. The device allows for switching optical signals in the infrared. This can be used to switch telecommunication signals at 1550 nm, or switch (and control) infrared signals for infrared thermal imaging and engineering. In addition, the device may produce periodic oscillations of visible light at ~20 gigahertz frequency. This is due to generation of acoustic vibrations of the nanorods. As the material's conductivity is geometry dependent, one can optically drive a periodically varying resistivity in the nanorods, which can be used for electrical signal manipulation. In addition, the vibrational frequency is highly environmentally sensitive, and thus can be explored for ultrasensitive mass sensors. Furthermore, the invention allows redistribution (or beam steering) of the visible spectrum in a sub-picosecond time scale. This opens doors for compact optical elements.

Optical modulation over a broad spectral range is accomplished by exploiting the non-parabolicity of the conduction band of nanorod arrays composed of transparent conducting materials. This non-parabolicity accounts for extraordinary, pump-induced carrier temperatures, resulting in subpicosecond modulation with up to 300% transmission change, and operation at telecom wavelengths and in the mid-infrared fingerprint region.

It is known that one of the most important optical properties of a material is the dielectric permittivity, $\in$, which is a function of frequency. At high enough frequencies, $\in$ can be solely determined by the plasma frequency $\omega_p$ (if loss is negligible). The plasma frequency represents the natural resonant frequency of a collective oscillation, or plasmon, of a free-electron gas. For frequencies below $\omega_p$, the material can behave like a reflective metal ($\in$ is negative), whereas it acts like a transparent dielectric ($\in$ positive) for frequencies above $\omega_p$. Therefore, $\omega_p$ represents an effective 'knob' that allows tuning of optical material properties and plasmon resonances. Many ways exist to change $\omega_p$. In its simplest form, $\omega_p^2 = ne^2/m$ (with electron charge e), $\omega_p$ is insensitive to the electron temperature for a constant effective electron mass m and can be altered by tuning the electron density n. Whereas metals are characterized by a constant carrier density that fixes the plasma resonance frequency (typically visible or near-infrared frequencies), in semiconductors n is adjustable. This is most commonly realized by photoexcitation above the bandgap with intense laser pulses. But $\omega_p$ can depend on temperature in cases where the parabolic band-structure approximation fails where the electrons in a solid no longer follow the parabolic energy-momentum relation observed at band extrema. This non-parabolicity results in a momentum dependence of the effective mass, $m=m(k)$, which can significantly alter the plasma frequency even for a constant density of free electrons. This is the unique condition realized by the present technology.

In contrast to the noble metals with fixed carrier densities, metamaterials are characterized by a tunable carrier density and mobility that is achieved by doping or post-synthesis processing. Hence, plasmons in metamaterials can access the infrared fingerprint region for material identification and chemical sensing. In addition, metamaterials have a large bandgap. As a consequence, infrared or low-energy plasmons in metamaterials may experience much less damping than those in noble metals, where the interband transitions are close in energy to the plasmon resonances.

One may modify the LSPR on an ultrafast, subpicosecond timescale. The high-energy LSPR may be resonantly pumped with a control beam below the bandgap of a metamaterial. Owing to the absence of the interband excitation, the carrier density remains constant. Consequently, the change in plasma frequency observed in transmission at the LSPR with a signal beam does not stem from a carrier-density-induced modulation of plasma frequency as previously reported in other types of semiconductor. The pronounced pump probe signal is attributed to the conduction-band non-parabolicity in combination with a low carrier density and low heat capacity. These characteristics create a condition in which electrons in the conduction band are heated by the pump pulse to an astonishingly high carrier temperature. For comparison, gold, one of the most investigated plasmonic materials, exhibits far lower carrier temperatures of under similar pumping conditions. The exceptionally high carrier temperature ensures an electron distribution with a pronounced high-energy tail that is especially sensitive to the deviation of the conduction band from the parabolic form. The increase in effective mass at elevated energy states leads to a transient reduction in $\omega_p$. This is accompanied by relative transmission changes in the order of 300% for moderately high excitation intensities. The modulation depth is 1-2 orders of magnitude larger than in metals or semimetals (for example graphene) and comparable to other semiconductors. Furthermore, the timescale of the transient modulation is in the subpicosecond range, much faster than those observed in metals or semiconductors and on a par with single-layer graphene.

Spectral tuning of the plasmonic resonances in the near- and mid-infrared range can be achieved in different ways, for example by adjusting the carrier density, the pump fluence, or the photon energy by which a different LSPR mode can be excited. Additional flexibility is offered by shifting the resonances by means of the incidence angle and the geometry of the nanorod arrays. This allows one to target specific frequency windows with a broadband response. Electrical gating can, in principle, be included for adjusting the carrier density and hence $\omega_p$. The compatibility of the presented nanorod arrays with semiconductor processing technology is certainly an advantage over competing schemes, for instance graphene devices, and electrical gating would add only moderate complexity.

The switching device provides a number of advantages over existing technologies. First, the switch is ultra-broadband, which covers from the ultraviolet (about 355 nm) to the visible (710 nm), as well as the infrared range (1.5 micron to ~10 microns). This outperforms other materials such as graphene, noble metals, or traditional semiconductors, where the spectral range of the modulation that can be achieved is very limited. The switching capability is usually enhanced at optical resonances, in this cases being multiple plasmon resonances in the infrared, and a number of interference-induced transmission dips in the ultraviolet to the visible. Second, the sub-picosecond switching speed is an order-of-magnitude faster than other nonlinear plasmonic materials (such as noble metal gold and silver) based all-optical switches, and is orders of magnitude faster than other type of optical switches. For example, mechanical switch has speed from milliseconds to microseconds, whereas semiconductor waveguide, and electric-optic switches have switching speed of nanoseconds). Third, the periodic modulation with tens of gigahertz frequency is faster than acousto-optic modulators, which have modulation frequencies up to 1 gigahertz. Forth, the absolute transmission intensity modulation, which is up to 35% in the visible and beyond 20% in the near-infrared and mid-infrared (corresponding to several hundred percent differential transmission modulation), is significantly larger than existing ultrafast all-optical switching devices (in gold based systems, the modulation amplitude is a few percent at most). Fifth, the sample is technologically easy to handle and fabricate. It does not degrade in air; it is stable under high optical pump powers up to tens of mJ/cm2 (while noble metal based structures melt at a few mJ/cm2); it can be grown over large areas by conventional chemical vapor deposition means combined with large-scale patterning techniques (such as nanoimprint or soft-lithography). Sixth, by simply tailoring the geometry of the nanorod array (including the height, periodicity, and edge lengths of the nanorods), or the carrier concentration of ITO by annealing in different oxygen environments, one can spectrally tune the normally-off or normally-on switching wavelengths. Seventh, no waveguide or fiber is required; both the control and signal beams can be directly coupled to the switch from free space. Moreover, the diffraction property of the nanorod arrays in the visible permit a dynamic intensity redistribution between the zero order and higher order diffraction modes.

One aspect of the invention is a method of optical modulation. The method comprises irradiating an optical switch comprising a nanorod array with a control beam at a control time and a signal beam at a signal time. The transmitted intensity of the signal beam in a particular direction depends on the delay time between the control time and the signal time. The transient behavior of the transmitted intensity of the signal beam is the result of a control beam and signal beam interacting with the nanorod array. This, in turn, is a key to all optical modulation and allows one to control the signal output over a broad range of frequencies and time scales suited to a number of different applications.

The controlled variation of the signal beam will enable a number of different functions. In one instance, the signal beam may be contain an optical bit. This may be accomplished by evaluating the transient signal beam relative to its static counterpart. When the intensity of the signal beam is greater than the threshold, that signal beam may be characterized as a "1" in an analogous manner to semiconductor transistor. Similarly, when the intensity of the signal beam is greater than the threshold, that signal may be characterized as a "0". The switching between the "1" and "0" state is accomplished by controlling the interaction of the control beam and the signal beam with the nanorod arrays. This allows for the propagation of information and, by extension, logic gates and/or logic circuits.

Moreover, the propagation direction of the signal beam may be used to incorporate information. Because the signal beam is vectorial, intensity as well as directional information is contained in the transmitted signal.

The optical modulation is accomplished by optical switches comprising nanorod arrays. The nanorod arrays comprise a plurality of nanorods extending outwardly from a substrate. The plurality of nanorods may be composed of a metamateral. Metamaterials are artificial, engineered materials with rationally designed compositions and arrangements of nanostructured building blocks. These materials have an extraordinary response to electromagnetic, acoustic, and thermal waves that transcends the properties of natural materials. Examples of materials that may be used to prepare the nanorod arrays include transparent conducting oxides, transparent conducting nitrides, transparent conducting carbides, or transparent conducting silicides. Transparent conducting oxides include oxide semiconductors such as zinc oxide, cadmium oxide, tin oxide, and indium oxide that is doped to make them conducting. Examples of transparent conducting oxides include indium tin oxide (ITO), aluminum-doped zinc oxide (AZO), gallium-doped zinc oxide (GZO), indium-doped cadmium oxide (In:CdO), or fluorine-doped tin oxide (FTO). Examples of transparent conducting nitrides include TiAlN, TaN, ZrN, $Zr_3N_4$, YN, VN, NbN, $Cu_3N$ and WN. An example of a transparent conducting carbide includes SiC. Examples of transparent conducting silicides include silicides formed from metals such as Co, Cr, Fe, Hf, Ir, Nb, Ni, Os, Pt, Pd, Re, Rh, Ru, Ta, Ti, V, W, Zr, Ca, Mg and alkali metals. In particular embodiments, the nanorod array consists essentially of indium tin oxide.

The nanorod arrays, in some embodiments, may be film coated. The film coating may comprise any of the transparent conducting oxides, transparent conducting nitrides, transparent conducting carbides, or transparent conducting silicides described above.

The physical parameters of the nanorod array may affect the particular signal beam to be modulated as exemplified below. Physical parameters that may be varied include, but are not limited to, the arrangement of the nanorods on the substrate, the height of the nanorods, and the edge length of the nanorods. The nanorod array may comprise a plurality of nanorods arranged in any particular manner. The pattern may be a random pattern or a regular periodic pattern. The regular periodic pattern may be any pattern so long as it repeats at least 3 times along one or more directions. In particular embodiments the pattern may repeat at least 10 times, 25 times, 50 time, or 100 time along one or more directions. Examples of regular periodic patterns include the plurality of nanorods arranged in columns and rows, in a triangular pattern, in a hexagonal pattern, or a circular pattern. In in particular embodiments the periodic pattern is a regular square pattern of columns and rows. In certain embodiments the nanorod array has an average periodicity of about 30 nm to about 5000 nm in one or more directions that may be measured from the center of a nanorod to its nearest neighbor, including any interval therebetween. In particular embodiments, the nanorod array has a periodicity greater than 50 nm, 100 nm, 150 nm, 200 nm, 250 nm, 300 nm, 400 nm, 450 nm, 500 nm, 550 nm, 600 nm, 650 nm, 700 nm, 750 nm, 800 nm, 850 nm, 900 nm, 950 nm, 1000 nm and less than 5000 nm, 4500 nm, 4000 nm, 3500 nm, 3000 nm, 2500 nm, 2000 nm, 1500 nm, 1450 nm, 1400 nm, 1350 nm, 1300 nm, 1250 nm, 1200 nm, 1150 nm, 1100 nm, 1050 nm, 950 nm, 850 nm, 800 nm, 750 nm, 700 nm, 650 nm, 600 nm 550 nm, or 500 nm.

The plurality of nanorods may have an average height of about 30 nm to about 5000 nm measured from the substrate to the top of the nanorod, including any interval therebetween. In particular embodiments, the nanorod array has an average height greater than 50 nm, 100 nm, 150 nm, 200 nm, 250 nm, 300 nm, 400 nm, 450 nm, 500 nm, 550 nm, 600 nm, 650 nm, 700 nm, 750 nm, 800 nm, 850 nm, 900 nm, or 950 nm, 1050 nm, 1100 nm, 1150 nm, 1200 nm, 1250 nm, 1300 nm, 1400 nm, 1450 nm, 1500 nm, 1550 nm, 1600 nm, 1650 nm, 1700 nm, 1750 nm, 1800 nm, 1850 nm, 1900 nm, 1950 nm, 2050 nm, 2100 nm, 2150 nm, 2200 nm, 2250 nm, 2300 nm, 2400 nm, 2450 nm, 2500 nm, 2550 nm, 2600 nm, 2650 nm, 2700 nm, 2750 nm, 2800 nm, 2850 nm, 2900 nm, or 2950 nm and less than 5000 nm, 4500 nm, 4000 nm, 3500 nm, 3000 nm, 2500 nm, 2000 nm, 1500 nm, 1450 nm, 1400 nm, 1350 nm, 1300 nm, 1250 nm, 1200 nm, 1150 nm, 1100 nm, 1050 nm, 950 nm, 850 nm, 800 nm, 750 nm, 700 nm, 650 nm, 600 nm 550 nm, or 500 nm.

The plurality of nanorods may have an average edge length of about 10 nm to about 500 nm, including any interval therebetween. In particular embodiments, the nanorod array has an average edge length greater than 10 nm, 20 nm, 30 nm, 40 nm, 50 nm, 60 nm, 70 nm, 80 nm, 90 nm, 110 nm, 120 nm, 130 nm, 140 nm, 150 nm, 160 nm, 170 nm, 180 nm, 190 nm, or 200 nm and less than 500 nm, 450 nm, 400 nm, 350 nm, 300 nm, 250 nm, or 200 nm.

The nanorods extend outwardly from a substrate. The substrate may be any material that supports or facilitates the growth of the plurality of nanorods. In some embodiments, the substrate is at least partially transparent to light over specific or a wide range of wavelengths.

The substrate may comprise one or more materials. This may include a film of the material of the nanorods themselves and more or more additional materials. In some embodiments, the substrate is an oxide but other materials may be used as well. In some embodiments, the substrate comprises a film comprising indium, tin, and oxygen. In some embodiments, the substrate comprises yttria stabilized oxide or aluminum oxide (sapphire). In particular embodiments, the substrate comprises both a film comprising indium, tin, and oxygen as well as yttria stabilized oxide.

With the use of the nanorod arrays described above, one may optically modulate light over a broad range of wavelengths and over a broad range of time scales. The method comprises irradiating a nanorod array with a control beam at a control time and a signal beam at a signal time. In some embodiments, the method further comprises irradiating the nanorod array with a second control beam at a second control time. Where two control beams are used, controlling the displacement between the delay time between the first control time and the signal time and the delay time between the second control time may be equal or different may affect the intensity of the signal beam in the direction. Depending on the temporal proximity of a control time with a signal time, the signal beam may be detectably different than a static signal or not depending on the circumstances.

The use of two control beams may allow for optical processing in an analogous manner to semiconductor logic gates. This may be accomplished when the signal beam is detectably different than a static signal. The delay time between the first control time and the signal time and the delay time between the second control time and the signal time may be equal or different. For example, where a first and a second control signal are necessary to induce a change in the emitter signal above a threshold value over a static value, that may be analogized to an AND logic gate. As another example, where either a first or a second control signal may induce a change in the emitter signal above a threshold value over a static value, the may be analogize to an OR logic gate.

Depending on the number of optical switches used and arrangement, logic circuits may be prepared. The signal beam emanating from an optical switch may be directed onto another optical switch comprising a nanorod array. The signal beam in this instance may act as either a control signal or a probe. In some cases, the signal beam may be split and act as both a control signal and a probe.

The method may further comprise detecting the signal beam. Detectors and methods of detecting optical signals are known in the art, and no particular detector or method of detection is a necessary limitation of the present technology.

Over a period of time, a signal beam that is detectably different transiently than a static signal will revert to the static signal. As a result, the static signal beam is equivalent to a transient signal beam in the limit that the delay time between the control time and the probe time are infinite. This provides the baseline for the temporal response. Depending on the wavelengths of the control beam and signal beam, as well as the physical parameters of the nanorod array, the temporal response may be on the order of femtoseconds, picoseconds, nanoseconds, or microseconds. This may allow for the nanorod arrays described to be used in applications.

The center wavelength of a control beam may be any wavelength capable if inducing an electronic transition. In some embodiments, center wavelength of the first control beam is in the visible spectrum, the near infrared spectrum, mid infrared spectrum, or a combination thereof. In particular embodiments, the center wavelength may be tuned to induce an electronic transition associated with a localized surface plasmon resonance. Particular wavelengths capable of inducing that transition include control beams having a center wavelength about 1500 nm.

A control beam may irradiate the nanorod array at any angle of incidence capable of inducing an electronic transition. In some embodiments, the control beam irradiates the nanorod array from an angle of incidence of 0° to about 70°, including without limitations angles of incidence of between any range between any of 0°, 5°, 10°, 15°, 20°, 25°, 30°, 35°, 40°, 45°, 50°, 55°, 60°, 65°, and 70°.

The control beam may have a wide range of fluences. A surprising advantage of the present invention is that the nanorod arrays allow for high fluences. Particularly, the nanorod arrays allow for fluence high enough to irreversibly degrade other dielectric materials such as noble metals. The fluence may be high enough to allow for an emitter signal to be detectably different than a static signal. In other embodiments, the fluence may only be high enough to allow for an emitter signal to be detectably different than a static signal when a second control signal irradiates the nanorod array. In certain embodiments, the control signal has a fluence less than about 30 $mJ/cm^2$. In particular embodiments, the control signal has a fluence less than 25 $mJ/cm^2$, 20 $mJ/cm^2$, 15 $mJ/cm^2$, or 10 $mJ/cm^2$.

Another surprising advantage of the present invention is that the nanorod arrays allow for a wide range of wavelengths to be modulated. The signal beam may be narrowly banded such that the full width half maximum bandwidth is tens or hundreds of nanometers. Alternatively, the signal beam may be a broad band probe that has a bandwidth greater than hundreds of nanometers. The center wavelength of the signal beam may be in the near ultraviolet spectrum, visible spectrum, the near infrared spectrum, mid infrared spectrum, or a combination thereof. In some embodiments, the signal beam is between 350 nm to 6000 nm. In a particular embodiment, the signal beam is between about 350 nm and 750 nm, 1500 nm and 6000 nm, or both. In certain embodiments, the signal beam has a fluence less than about 30 mJ/cm$^2$. In particular embodiments, the control signal has a fluence less than 25 mJ/cm$^2$, 20 mJ/cm$^2$, 15 mJ/cm$^2$, 10 mJ/cm$^2$, 9 mJ/cm$^2$, 8 mJ/cm$^2$, 7 mJ/cm$^2$, 6 mJ/cm$^2$, 5 mJ/cm$^2$, 4 mJ/cm$^2$, 2 mJ/cm$^2$, or 1 mJ/cm$^2$.

The transient transmission signal may be a transient bleaching or induced absorption. As an alternative, the transient transmission signal may be a transient red-shifting or blue-shifting of a spectral peak. The kinetics of any of the bleaching, induced absorption, red-shifting, or blue-shifting may determine the temporal response. The absolute change in the intensity of the transmission may be greater than 5%, including changes greater than 10%, 15%, 20%, 25%, 30%, or 35%.

In some embodiments, the emitter signal is diffracted by the nanorod array acting as an optical grating. Any of the grating modes may be used as the signal beam. In some embodiments, the signal beam is detected at a zero-order grating mode. In other embodiments, the signal beam is detected at a non-zero-order grating mode. In particular embodiments, the signal beam is detected at both a zero-order grating mode and a non-zero-order grating mode.

Ultrafast plasmon modulation in the near-infrared (NIR) to mid-infrared (MIR) range by intraband pumping of nanorod arrays allows for the preparation of optical switches and methods for optical modulation. In contrast to noble metals, the lower electron density in nanorod arrays comprising indium, tin, and oxygen enables a remarkable change of electron distributions, yielding a significant plasma frequency modulation and concomitant large transient bleaches and induced-absorptions, which can be tuned spectrally by tailoring the nanorod array geometry. The low electron heat capacity explains the sub-picosecond kinetics that is much faster than noble metals.

Our work demonstrates a new scheme to control infrared plasmons for optical switching, telecommunications and sensing. A control signal with a center wavelength to the trans-LSPR wavelength may be used to maximize the sample absorption. A NIR probe that spans the trans-LSPR or a MIR probe that covers the long-LSPR may be used to prepare an emitted signal. The nanorod arrays support two LSPRs with collective electron oscillations along orthogonal directions. We denote the LSPR where electrons oscillate perpendicular, or parallel to the nanorod long axis as the transverse-LSPR (trans-LSPR), or longitudinal-LSPR (long-LSPR), respectively. The static transmission spectra of nanorod arrays measured using un-polarized light reveal a strong NIR absorption, which is associated with the trans-LSPR that can be excited at a range of incidence angles. The MIR transmission spectra under p-polarization shows strong transmission dips and a slight blueshift of the transmission dip under an increasing incidence angle, which are absent in the s-polarization analogue. The MIR transmission dips under p-polarization are attributed to the long-LSPR, which can only be excited by electric field component along the long axis. Due to weaker geometrical confinement, the long-LSPR occurs at a longer wavelength than the trans-LSPR.

The well-known sequence of events in plasmonic systems following pump excitation include electron dephasing, electron-electron scattering, electron-phonon coupling and lattice heat dissipation, which take place at different time scales. The temporal response in the infrared may include a sub-picosecond component is followed by a much weaker, slower-decaying tail that stays almost constant during the entire measured delay time up to tens of picoseconds. The sub-picosecond component of the emitter signal may be ascribed to electron-phonon coupling, whereas the slow-decaying, weaker component of the emitter signal results from the gradual cooling of the lattice.

In the examples below, we demonstrate both static LSPRs and their transient behaviors spanning the NIR to MIR range exhibited by nanorod under intraband excitations. Moreover we show that a high electron temperature achieved in nanorod arrays accounts for the sub-picosecond decay that is faster than that observed for noble metals. The low electron density of of the nanorod arrays enables a significant redistribution of electron energies under intraband pumping, which results in a remarkable change and thereby large differential and absolute transmission modulations. Furthermore, this spectral modulation can be tuned in the MIR through tailoring the sample geometry. Our results pave the way for robust manipulation of the infrared spectrum using heavily-doped, semiconductor-enabled material platforms.

Moreover, sub-picosecond optical nonlinearity of the nanorod arrays following intraband, on-plasmon-resonance optical pumping enables modulation of the full-visible spectrum with large absolute change of transmission, favorable spectral tunability and beam-steering capability. Furthermore, we observe a transient response in the microsecond regime associated with the slow lattice cooling, which arises from the large aspect-ratio and low thermal conductivity of the nanorod arrays. A number of transmission minima in the visible range, arising from collective light diffraction by the periodic dielectric nanorod array, give rise to a pump-induced transmission modulation with absolute amplitude up to ±20%. Our results demonstrate that all-optical control of the visible spectrum can be achieved by using wide-bandgap semiconductors in their transparent regime with speed faster than that of noble metals.

Moreover, the large scattering cross-section of the dielectric nanorod arrays (as opposed to the large absorption cross-section of noble metal nanostructures) allows for a dynamic redistribution of light intensities among different diffraction orders, and the spectral response of the nanorod arrays can be tuned by simply adjusting the incidence angle or tailoring the length of the nanorods. In the temporal domain, we found both a sub-picosecond response stemming from the electron-phonon coupling and a microsecond response arising from the lattice cooling in ITO.

The visible spectrum shown exhibits pronounced transmission minima. The transmission minima in the visible regime are not due to resonant absorption but are simply standing wave resonances. Each transmission minimum wavelength the waves reach an out-of-phase condition at the interface of the nanorod and substrate (which is at the bottom boundary of the nanorod). While the NIR LSPR is a localized phenomenon, the transmission minima in the visible range are due to coherent light diffraction by the nanorod arrays and therefore is attributed to an array effect. Effectively, the nanorod arrays acts as a two-dimensional diffraction grating that supports not only the forward propagating zero-order mode, but also non-zero-grating orders propagating in oblique directions. The dielectric nature of nanorod array in the visible range dictates that intensities of the non-zero grating orders should be complementary to that of the zero grating order.

Coupling light with acoustic vibrations in nanoscale optical resonators offers optical modulation capabilities with high bandwidth and small footprint. When using the nanorod arrays described herein as the operating media, optical modulation covering the visible spectral range with GHz bandwidth is achieved through the excitation of coherent acoustic vibrations. This broadband modulation results from the collective optical diffraction by the dielectric, and a high differential transmission modulation is achieved through efficient near-infrared, on-plasmon-resonance pumping.

The present disclosure is not limited to the specific details of construction, arrangement of components, or method steps set forth herein. The compositions and methods disclosed herein are capable of being made, practiced, used, carried out and/or formed in various ways that will be apparent to one of skill in the art in light of the disclosure that follows. The phraseology and terminology used herein is for the purpose of description only and should not be regarded as limiting to the scope of the claims. Ordinal indicators, such as first, second, and third, as used in the description and the claims to refer to various structures or method steps, are not meant to be construed to indicate any specific structures or steps, or any particular order or configuration to such structures or steps. All methods described herein can be performed in any suitable order unless otherwise indicated herein or otherwise clearly contradicted by context. The use of any and all examples, or exemplary language (e.g., "such as") provided herein, is intended merely to facilitate the disclosure and does not imply any limitation on the scope of the disclosure unless otherwise claimed. No language in the specification, and no structures shown in the drawings, should be construed as indicating that any non-claimed element is essential to the practice of the disclosed subject matter. The use herein of the terms "including," "comprising," or "having," and variations thereof, is meant to encompass the elements listed thereafter and equivalents thereof, as well as additional elements. Embodiments recited as "including," "comprising," or "having" certain elements are also contemplated as "consisting essentially of" and "consisting of" those certain elements.

Preferred aspects of this invention are described herein, including the best mode known to the inventors for carrying out the invention. Variations of those preferred aspects may become apparent to those of ordinary skill in the art upon reading the foregoing description. The inventors expect a person having ordinary skill in the art to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Recitation of ranges of values herein are merely intended to serve as a shorthand method of referring individually to each separate value falling within the range, unless otherwise indicated herein, and each separate value is incorporated into the specification as if it were individually recited herein. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this disclosure. Use of the word "about" to describe a particular recited amount or range of amounts is meant to indicate that values very near to the recited amount are included in that amount, such as values that could or naturally would be accounted for due to manufacturing tolerances, instrument and human error in forming measurements, and the like.

No admission is made that any reference, including any non-patent or patent document cited in this specification, constitutes prior art. In particular, it will be understood that, unless otherwise stated, reference to any document herein does not constitute an admission that any of these documents forms part of the common general knowledge in the art in the United States or in any other country. Any discussion of the references states what their authors assert, and the applicant reserves the right to challenge the accuracy and pertinence of any of the documents cited herein. All references cited herein are fully incorporated by reference, unless explicitly indicated otherwise. The present disclosure shall control in the event there are any disparities between any definitions and/or description found in the cited references.

While not wishing to be bound by theory, the theoretical discussions are meant only to be illustrative and are not meant as limitations on the scope of the invention or of appended claims.

The following examples are meant only to be illustrative and are not meant as limitations on the scope of the invention or of the appended claims.

EXAMPLES

Example 1

Ultrafast Switching in the Near- to Mid-Infrared Spectrum

Here we describe the transient behavior of the localized surface plasmon resonances (LSPRs) of indium-tin-oxide nanorod arrays (ITO-NRAs) following intense, ultrafast laser excitation. On comparing the static and transient results we observe redshifts of LSPRs in sub-picosecond time scales under resonant, intraband optical pumping, which we attribute to a conduction band nonparabolicity-induced plasma frequency ($\omega_p$) reduction. We generalize the calculation of $\omega_p$ to cover the case of a nonparabolic band and quantitatively determine the fluence dependent $\omega_p$ shifts. We further show that the ultrafast, sub-picosecond response time stems from a high electron temperature, a direct result of the lower electron density of ITO in comparison to its noble metal counterparts. In addition, the LSPR modulation, based on modification of the collective-electron behavior of ITO-NRAs, enables differential transmission modulation beyond +100% and absolute transmission modulation beyond +20% with fluence <7 mJ/cm$^2$ in both the NIR and MIR. The large bleaching and induced-absorption can enable both normally-off and normally-on optical switching functionalities, and can be further tuned spectrally by tailoring geometrical parameters of the ITO-NRAs.

Static LSPRs of the ITO-NRA

Figure 1B:
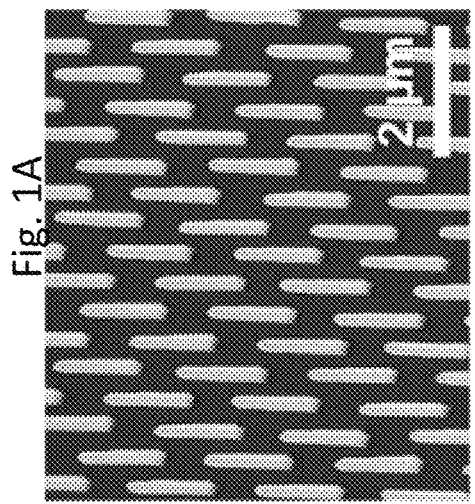
FIG. 1B shows experimental NIR transmission spectra at 0° and 30° incidence angles under un-polarized light.
Figure 1C:
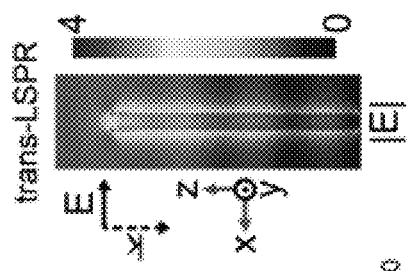
FIG. 1C shows simulated NIR transmission spectra at 0° and 30° incidence angles under p-polarized light referenced to air.
Figure 1D:
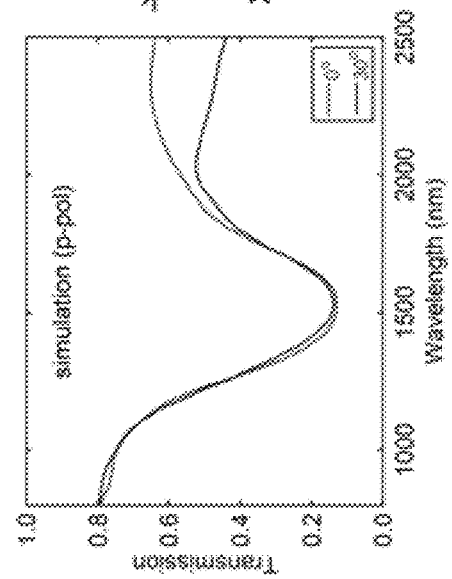
FIG. 1D shows simulated |E| field distribution for the transverse LSPR at 0° incidence angle plotted for the x-z plane cutting through the center of the nanorod (normalized by the incident wave). Incident plane wave propagates along −z direction with electric field polarized along +x direction (indicated by k and E).
Figure 1M:
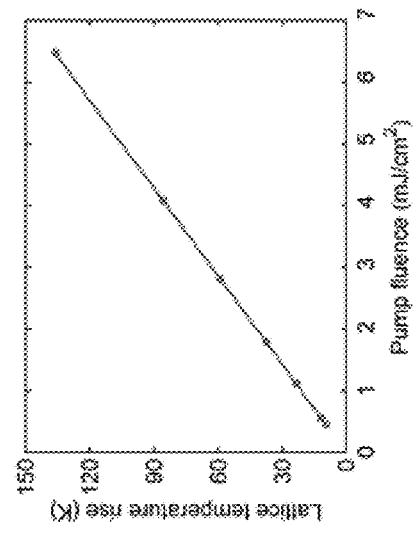
FIG. 1M shows a maximal lattice temperature rise as a function of experimentally used pump fluence.
Figure 1N:
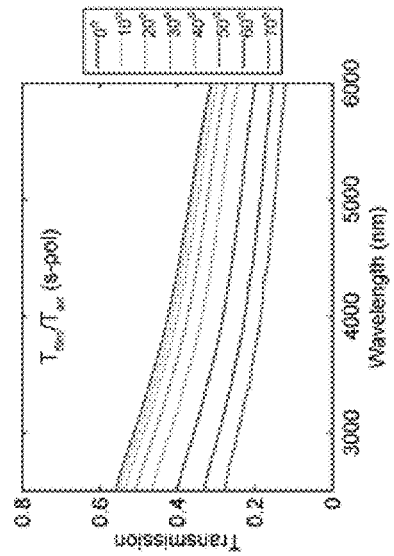
FIG. 1N shows a static transmission spectra of ITO film (after the nanorod growth) under p-polarization.
Figure 1H:
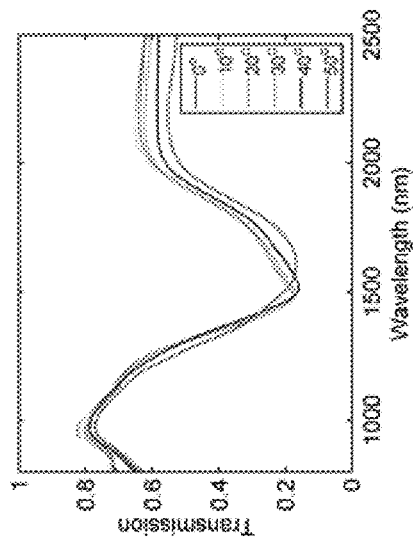
FIG. 1H shows static transmission spectra of the ITO-NRA measured at incidence angles from 0° to 50° using un-polarized light. Spectra are referenced to air.

The uniform ITO-NRA with 1 µm periodicity, 2.6 µm height and 180 nm edge length shown in FIG. 1A was fabricated using a modified procedure based on earlier report. [Li, S.-Q. et al. Plasmonic-photonic mode coupling in indium-tin-oxide nanorod arrays. *ACS Photonics* 1, 163-172 (2014)] The ITO-NRA supports two LSPRs with collective electron oscillations along orthogonal directions. We denote the LSPR where electrons oscillate perpendicular, or parallel to the nanorod long axis as the transverse-LSPR (trans-LSPR), or longitudinal-LSPR (long-LSPR), respectively. The static transmission spectra shown in FIG. 1B measured using un-polarized light reveal a strong NIR absorption centered at 1.5 μm, which is associated with the trans-LSPR that can be excited at a range of incidence angles (FIG. 1H). FIG. 1E depicts the MIR transmission spectra under p-polarization. Key features include strong transmission dips centered at around 4 μm and a slight blueshift of the transmission dip under an increasing incidence angle, which are absent in the s-polarization analogue (FIG. 1I). We attribute the MIR transmission dips under p-polarization to the long-LSPR, which can only be excited by electric field component along the long axis. Due to weaker geometrical confinement, the long-LSPR occurs at a longer wavelength than the trans-LSPR.

The LSPRs were further confirmed by finite-element simulations with ITO modeled using the Drude formula $$\varepsilon(\omega) = \varepsilon_\infty - \frac{\omega_p^2}{\omega^2 + i\gamma\omega}$$

(see below), where $\varepsilon_\infty = 3.95$ is the background permittivity, $\gamma = 0.12$ eV the damping factor, and $\omega_p = 2.02$ eV the plasma frequency. FIGS. 1C and 1F plot the simulated transmission spectra in the NIR and MIR, whose spectral features agree well with their experimental counterparts. Note that the ITO-film beneath the ITO-NRA becomes more reflective at longer wavelengths (FIGS. 1M-1O), manifested in FIGS. 1E and 1F as weaker transmissions red to the long-LSPR. The |E| near-field for the trans-LSPR plotted in FIG. 1d is mostly concentrated at the nanorod surface. For the long-LSPR near-field distributions shown in FIG. 1G, $E_y$, $H_x$, $E_z$ and $H_y$ are scattered fields produced by the ITO-NRA. The $H_x$ and $H_y$ fields stem from electron oscillation along the long axis that forms an equivalent line current. This is further supported by the $E_y$ field that resembles a longitudinal dipole field pattern. The |E| field is concentrated at the surface of the nanorod, whereas the asymmetric distribution arises from the oblique incidence angle. We note that the longitudinal dipole-dipole coupling, evident by the nonlocalized $E_z$ scattered field distribution, results in a periodicity dependent long-LSPR wavelength. The oblique incidence also produces a phase retardation induced dipole-dipole coupling strength variation for different incidence angles, which is manifested by the slight blueshift of the long-LSPR under an increasing incidence angle.

Transient Response of the Trans-LSPR and Long-LSPR

Figure 2A:
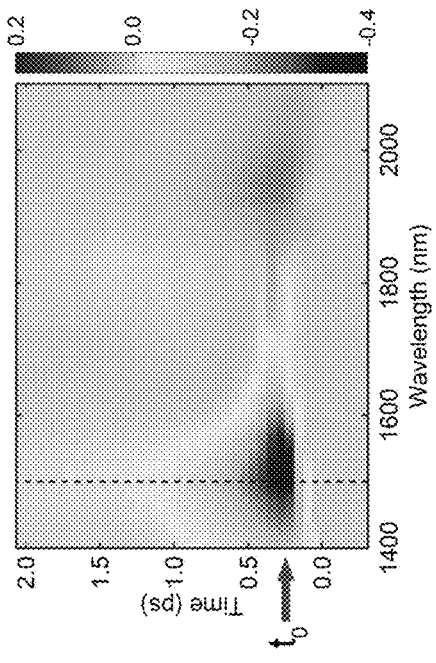
FIG. 2A shows schematic diagrams of the NIR-probe-TA (upper) and MIR-probe-TA (lower) measurements. Both measurements used a NIR pump centered at 1500 nm. The pump and probe have common electric field polarization indicated by the black up-down arrow.

Knowing the static LSPR features we then performed transient absorption (TA) experiments to investigate the transient response of the LSPRs following ultrafast optical excitation. Two TA experiments were performed; in both cases we matched the pump center wavelength to the trans-LSPR wavelength of 1500 nm to maximize the sample absorption. We used a NIR probe that spans the trans-LSPR in the first experiment (denoted as NIR-probe-TA), then a MIR probe that covers the long-LSPR in the second (denoted as MIR-probe-TA). Schematic diagrams of the two TA experiments are shown in FIG. 2A, where the black arrow indicates the common polarization for the pump and probe. To excite and probe the plasmons, the substrate was fixed at normal to the probe in NIR-probe-TA but rotated in MIR-probe-TA. Measurements with different probe polarizations were performed by rotating the sample along different axes as described in Methods. The pump spot diameter was 380 μm for NIR-probe-TA and 360 μm for MIR-probe-TA, so arrays of nanorods rather than individual nanorod were examined. In addition, both the pump and probe photons have energies much smaller than ITO's band gap of 3.8~4 eV; hence only pump-induced intraband excitation within the conduction band, and collective-electron behaviors (such as LSPRs) subsequently probed are relevant in our TA experiments.

Figure 2B:
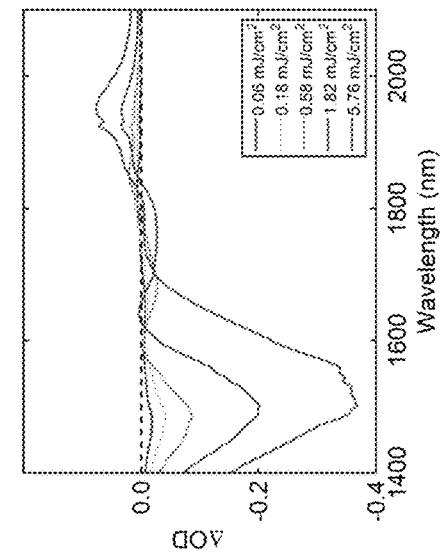
FIG. 2B shows a ΔOD spectral map around the transverse LSPR under a pump fluence of 5.76 mJ/cm$^2$. The center wavelength of the pump at 1500 nm is indicated by the black, dashed line. NIR-probe-TA are measured at 0° incidence angle under polarized probe.
Figure 2C:
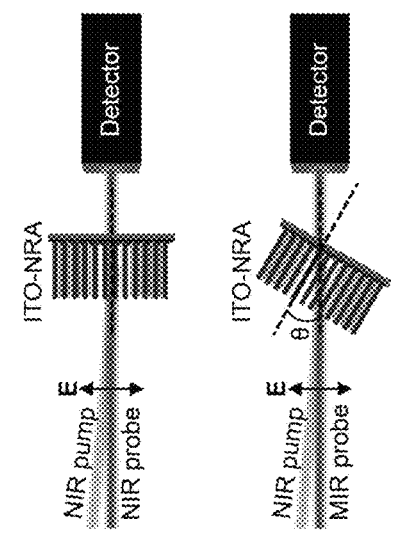
FIG. 2C shows fluence dependent transient ΔOD spectra around the transverse LSPR at the delay time $t_0$ when ΔOD amplitude is maximized ($t_0$ is indicated by the purple arrow in FIG. 2B).

FIG. 2B shows a representative ΔOD (definition in Methods) spectral map acquired from NIR-probe-TA. The well-known sequence of events in plasmonic systems following pump excitation include electron dephasing, electron-electron scattering, electron-phonon coupling and lattice heat dissipation, which take place at different time scales. In FIG. 2B, a sub-picosecond, strong ΔOD component is followed by a much weaker, slower-decaying ΔOD tail that stays almost constant during the entire measured delay time up to 50 ps (FIG. 2G). The sub-picosecond ΔOD signal is ascribed to electron-phonon coupling, whereas the slow-decaying, weaker ΔOD results from the gradual cooling of the lattice. The ΔOD spectral map is composed of a strong bleach (peak ΔOD of −0.37, equivalent to ΔT/T of 134%) at 1500 nm and a weak induced-absorption (peak ΔOD of 0.08, equivalent to ΔT/T of −17%) at 1960 nm, which are on the blue and red side of the static trans-LSPR, respectively. This gives an estimated 24% absolute transmission change at 1500 nm from its static value of 17.9% to a peak after-pump value of 41.9%. The fluence-dependent transient ΔOD spectra at delay time $t_0$ (indicated by the purple arrow in FIG. 2B, and similarly defined in FIG. 2D) when ΔOD reaches maximal magnitude is shown in FIG. 2C. For increased pump fluence from 0.06 mJ/cm² to 5.76 mJ/cm², we observed redshifts of the center wavelength from 1475 nm to 1500 nm for the bleach, and from 1840 nm to 1960 nm for the induced-absorption. The negative-to-positive ΔOD line-shape around the trans-LSPR and the fluence-dependent center wavelengths of the bleach and induced-absorption manifest redshifts of the trans-LSPR following intraband pump excitation.

Figure 2D:
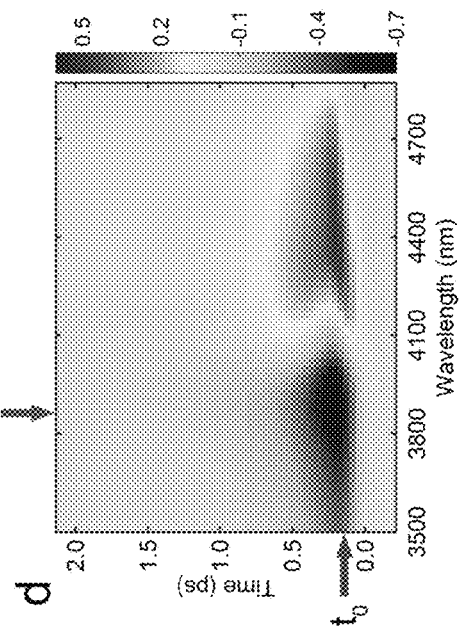
FIG. 2D shows a ΔOD spectral map around the longitudinal LSPR under a pump fluence of 6.47 mJ/cm$^2$. MIR-probe-TA experiments are measured at 30° incidence angle under p-polarized probe.
Figure 2E:
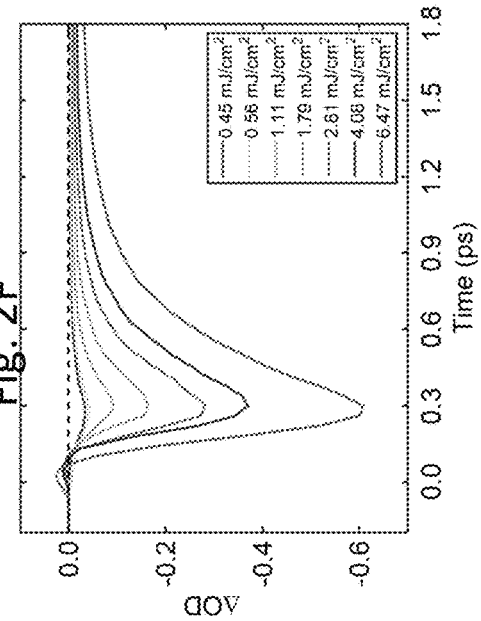
FIG. 2E shows a fluence dependent transient ΔOD spectra around the longitudinal LSPR at the delay time $t_0$ when ΔOD amplitude is maximized (indicated by the purple arrow in FIG. 2D).

The ΔOD spectral map shown in FIG. 2D and the fluence-dependent ΔOD spectra (full ΔOD spectral maps shown in FIGS. 2H-2M) at delay time $t_0$ shown in FIG. 2E are obtained from MIR-probe-TA at 30° incidence angle under p-polarized probe. We note that 30° was employed since it gives the most pronounced long-LSPR (FIG. 1E). Similar to its NIR analogue, we observe bleach and induced-absorption on the blue and red side of the long-LSPR, respectively, which correspond to a long-LSPR redshift. Notably, a fluence of 6.47 mJ/cm² yields a maximal bleach of −0.61 and induced-absorption of 0.53, which are equivalent to ΔT/T of +307% and −70% at 3900 nm and 4340 nm, respectively. This gives an estimated 20.3% absolute transmission change at 3900 nm from its static value of 6.6% to a peak after-pump value of 26.9%. In addition, the MIR modulation has a broad bandwidth that spans the entire probed spectral window. Additional MIR-probe-TA results shown in FIGS. 1I-1L and 2N-2S for different incidence angles and polarizations do not exhibit ΔT/T signals at normal incidence for p-polarized probe or for s-polarized probe regardless of the incidence angles. This confirms that the ΔT/T signal achieved at oblique incidence angles under p-polarized probe is a collective-electron behavior associated with the long-LSPR. Furthermore, FIG. 2E reveals that increasing the pump fluence is accompanied by redshifts of the center wavelength from 3850 nm to 3900 nm for the bleach, and from 4130 nm to 4340 nm for the induced-absorption.

Studies of noble metallic nanoparticles have shown the effect of intraband pumping on interband transitions by probing the system with photon energies comparable to the interband gap energy. There the intraband pump leads to a Fermi-surface smearing and change of the imaginary permittivity, $\Delta\in''(\omega)$, for optical transitions involving the perturbed electronic states, which in turn gives rise to a change of the real permittivity, $\Delta\in'(\omega)$, through the modification of background permittivity, $\Delta\in_\infty(\omega)$. A plasmon redshift arose owing to a positive $\Delta\in_\infty(\omega)$, which in the quasistatic limit can be understood as the LSPR frequency $$\frac{\omega_p}{\sqrt{2\varepsilon_m + \varepsilon_\infty}}$$

(neglecting the damping term; $\in_m$ is the permittivity of the surrounding medium) becomes smaller with an increasing $\in_\infty$.

The long-LSPR redshift of the ITO-NRA we observed, however, cannot originate from $\Delta\in_\infty(\omega)$. Revisiting the Drude permittivity $$\varepsilon(\omega) = \varepsilon_\infty - \frac{\omega_P^2}{\omega^2 + i\gamma\omega},$$

$\in'(\omega)$ at the trans-LSPR of 1500 nm is about −1.9, but at the long-LSPR wavelength of 4000 nm $\in'(\omega)$ reaches −33. While $\in(\omega)$ is sensitive mainly to $\Delta\omega_p$ but still partly to $\Delta\in_\infty(\omega)$ in the NIR range, $\in(\omega)$ behaves markedly different around the long-LSPR as it becomes much more sensitive to $\Delta\omega_p$ than to $\Delta\in_\infty(\omega)$, owing to the one order of magnitude smaller $\omega$ (0.31 eV at the long-LSPR, 0.83 eV at the trans-LSPR) in comparison to the 2.02 eV $\omega_p$. Furthermore, $\Delta\in_\infty(\omega)$ due to the modification of interband transition is strongly frequency dependent, reaching its maximum around the band gap energy and rapidly converging to a weak constant at longer wavelengths. Simulations with various $\Delta\in_\infty(\omega)$ show that an unreasonably large constant $\Delta\in_\infty$ of 1.0 in the long-LSPR range results in a peak $\Delta$OD of only −0.06 (See FIG. 2R). Based on these evidences we conclude that the strong $\Delta$OD around the long-LSPR is predominantly caused by an intraband pump induced $\omega_p$ reduction.

Theoretical Modeling of the Plasma Frequency Reduction

Without wishing to be bound to theory, theoretical modeling may provide insights into the present technology. Modulations of $\omega_p$ for TCOs have been achieved by tuning the electron density (denoted as n) through electrical, electrochemical, and optical (interband pumping or charge injection) methods as these two quantities are related by $$\omega_P^2 = \frac{ne^2}{m}$$

for a free electron gas, where n is the carrier density, e the elementary charge and m the effective mass. The intraband pumping used in our work, however, cannot change n, so the reduction of $\omega_p$ must result from the detailed electronic structure of ITO which cannot be captured by the free electron gas model. In particular, we attribute the reduction of $\omega_p$ to the conduction band nonparabolicity, which has been observed in several highly-doped TCOs whose electronic states are highly populated such that the chemical potential lies far above the conduction band minimum (CBM). Instead of being constant in a parabolic band, the effective mass in a nonparabolic band becomes k (the electron wave vector) dependent and increases for higher energy states. To quantitatively model the reduction of $\omega_p$ under intraband pumping, we derived semi-classically the $\omega_p$ for an electron gas in an isotropic, nonparabolic band. We adopted the formula $$\frac{\hbar^2 k^2}{2m} = E + \frac{E^2}{E_g}$$

originally proposed by Kane and Cohen. ($\hbar$ is the Planck constant, E is the electron energy referenced to CBM; $1/E_g$ denotes the nonparabolicity, where $E_g$ is on the order of but does not represent the band gap). Note that the conduction band dispersion is fully determined by $1/E_g$ and m. Starting from the linearized collisionless Boltzmann equation, $\omega_p$ is derived as $$\omega_p(\mu, T)^2 = \quad (1)$$
$$\frac{e^2}{3m\pi^2} \int_0^\infty dE \left(\frac{2m}{\hbar^2}(E + E^2/E_g)\right)^{\frac{3}{2}} (1 + 2E/E_g)^{-1} \left(-\frac{\partial f_0(\mu, T)}{\partial E}\right).$$

Similarly, the electron density n and electron energy density U become $$n(\mu, T) = \frac{1}{\pi^2} \int_0^\infty dE \frac{m}{\hbar^2}(1 + 2E/E_g)\left(\frac{2m}{\hbar^2}(E + E^2/E_g)\right)^{\frac{1}{2}} f_0(\mu, T), \quad (2)$$

and $$U(\mu, T) = \frac{1}{\pi^2} \int_0^\infty dE \frac{m}{\hbar^2} E(1 + 2E/E_g)\left(\frac{2m}{\hbar^2}(E + E^2/E_g)\right)^{\frac{1}{2}} f_0(\mu, T), \quad (3)$$

where T is the electron temperature, $\mu$ the electron chemical potential and n a constant due to the conservation of electrons. Once the band structure parameters ($1/E_g$ and m) and the static $\omega_p$ are known, equations (1), (2) and (3) allow the complete determination of T dependent $\mu$, $\omega_p$ and U. The static ITO-NRA LSPRs correspond to an electron gas at T=300 K and following optical excitation the electron gas occupies a temperature T>300 K. Heat exchange between the electrons and lattice through electron-phonon coupling results in a time dependent T, $\mu$, $\omega_p$ and U. The electron configurations before and after the pump excitation are schematically illustrated in FIG. 3A.

In FIG. 3B we plot the calculated $\omega_p$ v.s. T curves for different $1/E_g$ when fixing m=0.263 $m_0$. While increasing $1/E_g$ yields a more dramatic $\omega_p$ reduction with increased T, in the limiting case of a parabolic band ($1/E_g$=0 eV) $\omega_p$ becomes T independent. Using reported values of $1/E_g$=0.4191 eV$^{-1}$ and m=0.263 $m_0$ for ITO[47], we calculated $\mu(T)$, $\omega_p(T)$ and $U(T)$ for T ranging from 300 K to 15000 K. The electron energy density rise, [U(T)−U(300 K)] (in eV/cm$^3$), is assigned as the calculated excitation energy density (CEED), which represents the amount of energy required to raise the electron temperature from 300 K to T per unit volume. We then estimated the experimental excitation energy density (EEED) based on the pump fluences used in MIR-probe-TA. To do this we measured the pump transmission and reflection by the sample, which in turn gives the absorbed pump energy. The absorbed pump energy divided by the total volume of material illuminated by the pump then gives the estimated EEED of the electron gas.

In FIG. 3C we plot the dependences of $\omega_p(T)$ and T on the CEED (upper x-axis) and the equivalent experimental pump fluence (lower x-axis), which permits estimation of the experimental $\omega_p$ and T achieved in our MIR-probe-TA. Note that under the highest pump fluence (6.47 mJ/cm$^2$), $\omega_p$ is reduced by about 0.4 eV (20% reduction) from its static value, with T reaching ~10000 K. We then performed finite-element simulations using the estimated $\omega_p$ values (red circles in FIG. 3C). Note that in simulations we assumed that the ITO-NRA undergoes a uniform excitation and the entire nanorod volume presents a single $\omega_p$. The amplitudes of simulated ΔOD spectra shown in FIG. 3E compare well with their experimental counterparts (FIG. 2E), confirming that the CEED v.s. $\omega_p$ (T) yields reasonable estimates of $\omega_p$ shifts in our MIR-probe-TA experiments.

The temperature changes shown in FIG. 3C provide insights into the fluence dependent ultrafast ΔOD kinetics (FIG. 2F) at the maximum bleaching wavelength (indicated by the green arrow in FIG. 2D). We note that a much higher T is achieved in ITO-NRAs comparing to the ~2000 K achieved for gold nanorods pumped at similar intensities. This stems from the far lower electron density and a concomitant smaller electron heat capacity C (T) for ITO. We illustrate this further in FIG. S1 by plotting the numerically calculated C (T) obtain from CEED v.s. T, and that in the Sommerfeld limit where $$C(T) = \frac{1}{3}\pi^2 D(\mu) k_B^2 T,$$

valid for T<<$T_F$, where $k_B$ is the Boltzmann constant, $D(\mu)$ is the electronic density of states at the Fermi level and $T_F$ is the Fermi temperature $$\left(\text{here } T_F = \frac{\mu(300K)}{k_B} = \frac{1.24 \text{ eV}}{k_B} \approx 14500K\right).$$

Note that the Sommerfeld form well reproduces the numerically calculated C(T) at low temperatures for all nonparabolicities. In addition, the Sommerfeld form for ITO, although overestimating C(T) beyond low T range, is about one order of magnitude lower than the Sommerfeld C(T) for gold, confirming the much higher T that is achieved for ITO. In the two-temperature model for describing the dynamic energy exchange between the electrons and lattice, the electron-energy-loss-rate is proportional to the difference of the electron temperature rise, ΔT, and the lattice temperature rise, $\Delta T_L$. Based on the estimated $\Delta T_L$ (FIG. 1M), $\Delta T - \Delta T_L$ in ITO-NRAs is dominated by ΔT. As a result, the electron-energy-loss-rate in ITO-NRA greatly exceeds that in noble metals, consistent with the observed faster, sub-picosecond kinetics comparing to the few-picosecond kinetics observed in noble metals. We also note that the redshift of the zero-crossing-wavelength before $t_0$ in FIG. 2D (also appearing in FIGS. 4C and 4D) is likely associated with the noninstantaneous thermalization of the electron gas through electron-electron scattering following the pump pulse, whereas the blueshift of the zero-cross-wavelength after $t_0$ results from a decrease of T due to electron-phonon coupling.

Spectral Tunability of the Long-LSPR in the MIR

Figure 4A:
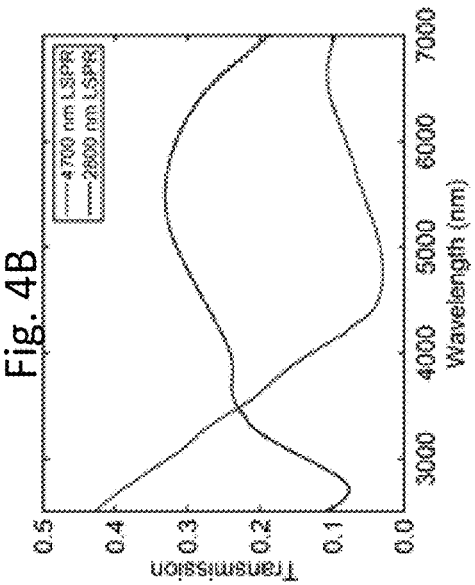
FIG. 4A shows MIR spectra obtained at different incidence angles for the ITO-NRA sample used in FIGS. 1-3.
Figure 4B:
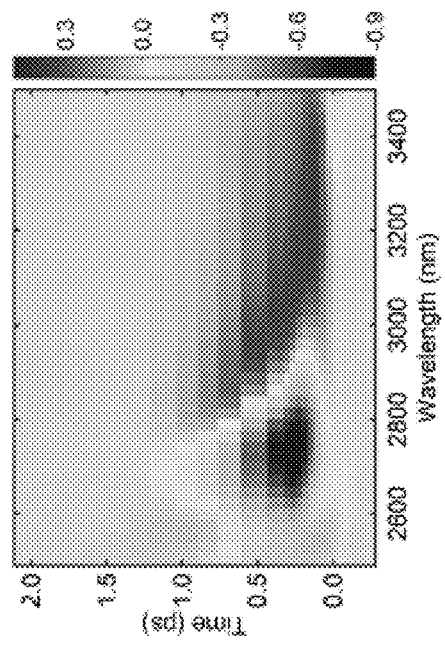
FIG. 4B shows a static MIR transmission spectra of ITO-NRAs with resonance centered at 4700 nm (ITO-NRA with 1000 nm periodicity and 3 μm height) and resonance centered at 2800 nm (ITO-NRA with 600 nm periodicity and 2.1 μm height).
Figure 4C:
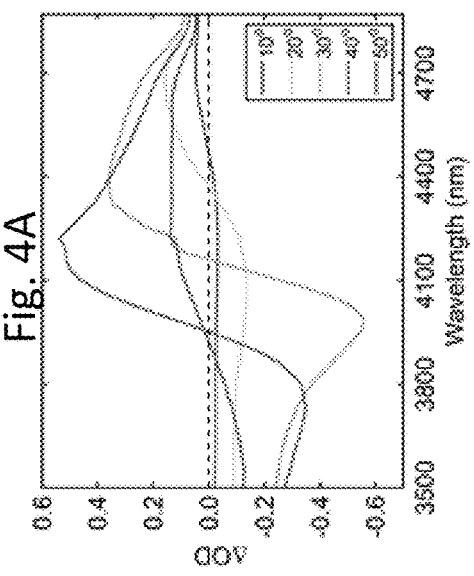
FIG. 4C shows a MIR transient spectral map measured from the ITO-NRAs in FIG. 4B with static longitudinal LSPR wavelength centered at 4700 nm. (Incidence angle was 45°; pump center wavelength was 1500 nm; and pump fluence was 10.4 mJ/cm$^2$)
Figure 4D:
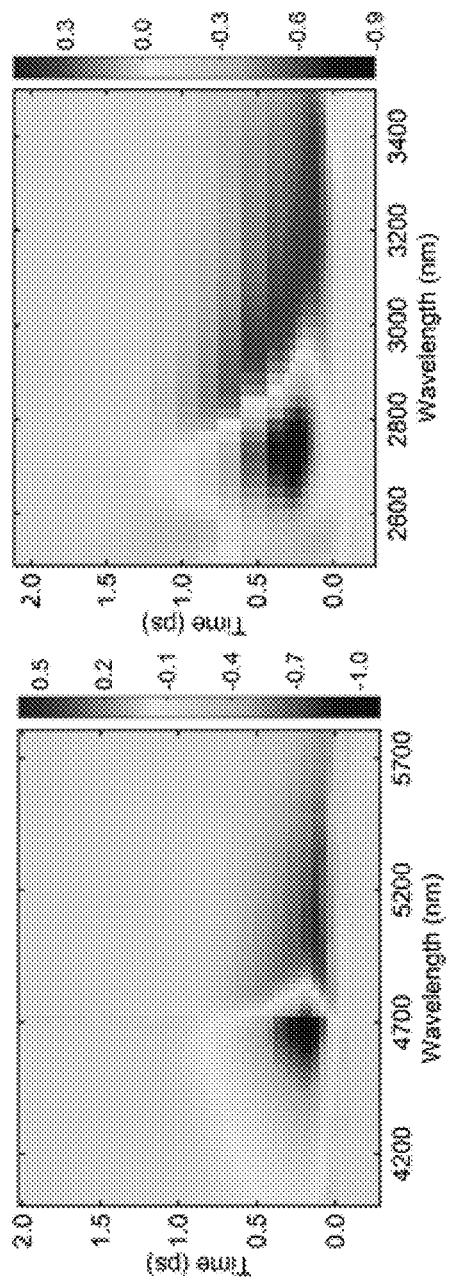
FIG. 4D shows a MIR transient spectral map measured from the ITO-NRAs in FIG. 4B with static longitudinal LSPR wavelengths centered at 2800 nm. (Incidence angle was 30°; pump center wavelength was 1500 nm; and pump fluence was 12.7 mJ/cm$^2$).
Figure 4F:
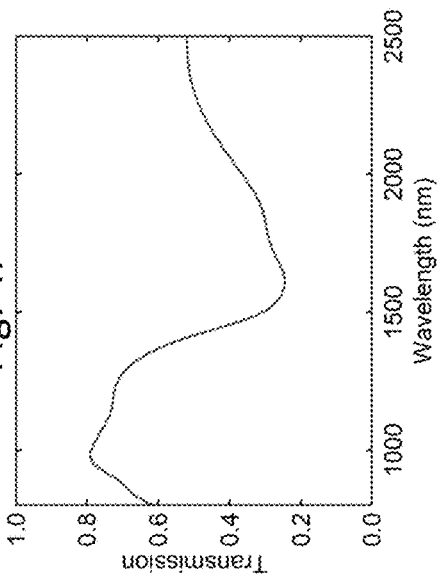
FIG. 4F shows a NIR transmission spectrum of the sample shown in FIG. 4E.
Figure 4H:
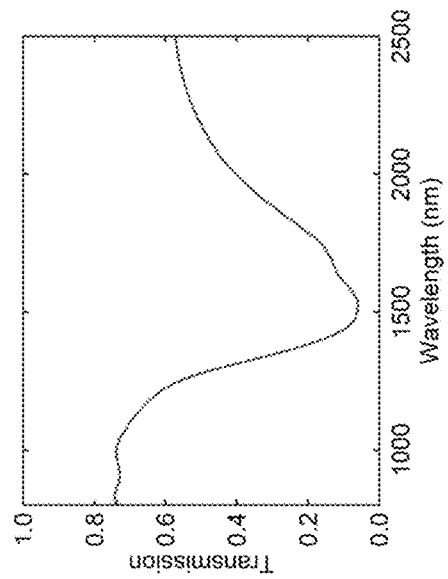
FIG. 4H shows a NIR transmission spectrum of the sample shown in FIG. 4G.
Figure 4E:
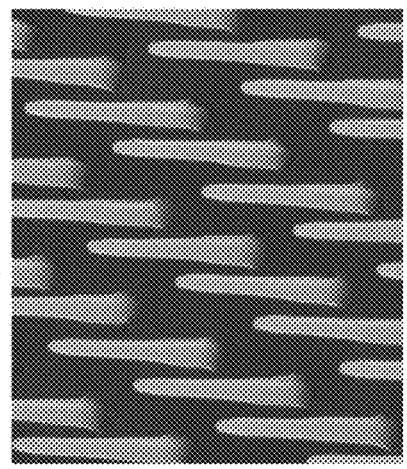
FIG. 4E shows an SEM image of ITO-NRA with 4700 nm longitudinal LSPR wavelength (1 μm periodicity and 3 μm height).
Figure 4G:
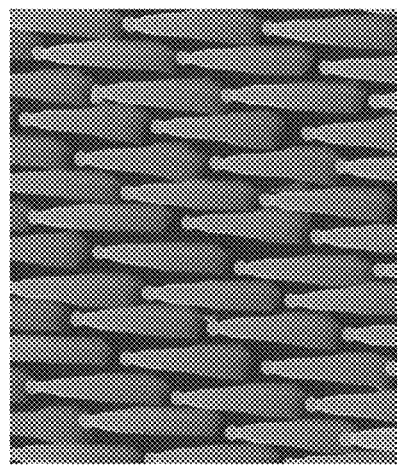
FIG. 4G shows an SEM image of ITO-NRA with 2800 nm longitudinal LSPR wavelength (600 nm periodicity and 2.1 μm height).

To illustrate the spectral tunability of the long-LSPR, we plot in FIG. 4B the angular dependent ΔOD spectra at time $t_0$ for the ITO-NRA sample used in FIG. 1 to FIG. 3. The zero-cros sing-wavelength of the ΔOD spectrum shifts from 4400 nm to 3900 nm as the incidence angle changed from 10° to 50°, consistent with the angular-dependent, static long-LSPR wavelength (FIG. 1E). In addition, we fabricated ITO-NRAs of 1 μm periodicity, 3 μm height, and 600 nm periodicity, 2.1 μm height (SEM images and NIR transmission spectra appear in FIGS. 4E-4H), which, as shown in FIG. 4B, exhibit static long-LSPRs centered at 4700 nm and 2800 nm, respectively. The MIR-probe-TA spectral maps are shown in FIGS. 4C and 4D, respectively. As expected, strong transient bleach and induced-absorption are observed in both samples around their long-LSPRs, demonstrating that control over modulation wavelength in the MIR can be achieved by adjusting the geometrical parameters of ITO-NRAs. This geometrical long-LSPR tunability exhibited by anisotropic ITO-NRA is consistent with studies on plasmonic gold nanorod arrays, in which a tunable longitudinal resonance is found to occur at an elliptic to hyperbolic transition regime.

The Generalized Plasma Frequency in Nonparabolic Bands

Assuming the collective oscillation of electrons produces an electron density of the form $n(r,t) = n_0 + \delta n(r,t)$ with $$\delta n(r,t) = \int \frac{dk}{4\pi^3} \delta f(r,t),$$

the electric field and electric potential of the electron gas follow as $E(r,t) = -\nabla \varphi(r,t)$ and $\nabla^2 \varphi(r,t) = -(-e)\delta n(r,t)$. From the linearized collisionless Boltzmann equation for electrons $$\frac{\partial \delta f(r,t)}{\partial t} + \frac{\partial \delta f(r,t)}{\partial r} \cdot v + \frac{\partial f_0}{\hbar \partial k} \cdot F = 0,$$

where $f_0$ is the Fermi function, and assuming a spatial and time dependence of the form $\varphi(r,t) = \varphi(q)e^{-\omega_p t + i q \cdot r}$ (and similarly for other spatial and time dependent terms), we obtain $E(q) = -iq\varphi(q)$, $$\varphi(q) = -\frac{e}{q^2}\delta n(q), \text{ and } \delta f(q) = i\frac{\partial f_0}{\partial E} \frac{eE(q) \cdot v}{(\omega_p - q \cdot v)},$$

and subsequently $$\frac{e^2}{q^2} \int \frac{dk}{4\pi^3} \left(\frac{\partial f_0}{\partial E}\right) \frac{qv\cos\theta}{(\omega_p - qv\cos\theta)} = 1 (*).$$

Here, $$v = \frac{\partial E}{\hbar \partial k},$$

E represents the electron energy referenced to the conduction band minimum, and E is the electric field. (Note that we have suppressed collisions, which is justified since $\omega_p$ and γ obtained from finite element simulations are 2.02 eV and 0.12 eV, respectively). In the long wavelength limit where the plasmon wave vector |q| is small, expanding the denominator in equation (*) gives the equation $$\frac{e^2}{q^2}\int\frac{dk}{4\pi^3}\left(-\frac{\partial f_0}{\partial E}\right)\left[\left(\frac{qv\cos\theta}{\omega_p}\right)+\left(\frac{qv\cos\theta}{\omega_p}\right)^2+\ldots\right]=1.$$

Terms that are odd in θ vanish on integrating over angle, hence keeping the second order term we obtain the expression for the plasma frequency $$\omega_p^2=\frac{e^2}{2\pi^2}\int_0^\pi d\theta\sin\theta\cos^2\theta\int_0^\infty dk\,k^2v^2\left(-\frac{\partial f_0}{\partial E}\right).$$

The isotropic, nonparabolic band structure is written as $$\frac{\hbar^2 k^2}{2m}=E+\frac{E^2}{E_g},$$

in which m and $1/E_g$ fully determine the conduction band structure. (Note that consistent with the original notation in reference 1, $E_g$ here is not the band gap in our notation but simply a parameter that characterizes the nonparabolicity of the conduction band). Taking derivative with respect to k of both sides of the nonparabolic equation gives the electron velocity $$v=\frac{1}{\hbar}\frac{\partial E}{\partial k}=\frac{\hbar k}{m(1+2E/E_g)}.$$

The plasma frequency is then written as $$\omega_p(\mu,T)^2=$$
$$\frac{e^2}{3\pi^2}\int_0^\infty dE\frac{m}{\hbar^2}(1+2E/E_g)\left(\frac{2m}{\hbar^2}(E+E^2/E_g)\right)^{\frac{1}{2}}\frac{\hbar\frac{2m}{\hbar^2}(E+E^2/E_g)}{m^2(1+2E/E_g)^2}$$
$$\left(-\frac{\partial f_0(\mu,T)}{\partial E}\right),$$

which can be further simplified as $$\omega_p(\mu,T)^2=\frac{e^2}{3m\pi^2}\int_0^\infty dE\left(\frac{2m}{\hbar^2}(E+E^2/E_g)\right)^{\frac{3}{2}}(1+2E/E_g)^{-1}\left(-\frac{\partial f_0(\mu,T)}{\partial E}\right),$$

which is equation (1) in the main text. Notably, when $E_g\to\infty$ eV (parabolic band condition), the usual expressions for plasma frequency $$\omega_p(\mu,T)^2=\frac{e^2}{3m\pi^2}\int_0^\infty dE\left(\frac{2m}{\hbar^2}E\right)^{\frac{3}{2}}\left(\frac{\partial f_0(\mu,T)}{\partial E}\right)=\frac{ne^2}{m}$$

and electron density $$\int_0^\infty dE\left(\frac{2m}{\hbar^2}E\right)^{\frac{3}{2}}\left(-\frac{\partial f_0(\mu,T)}{\partial E}\right)=3\pi^2 n$$

are recovered. At arbitrary temperature T, the conservation of electron density under intraband pumping in our experiments fixes the chemical potential μ through $$n(\mu,T)=\int_0^\infty\frac{dk}{4\pi^3}f_0(\mu,T)=\frac{2\pi}{4\pi^3}\int_0^\pi d\theta\sin\theta\int_0^\infty k^2\,dk,$$

or equivalently (by substituting in k), $$n(\mu,T)=\frac{1}{\pi^2}\int_0^\infty dE\frac{m}{\hbar^2}(1+2E/E_g)\left(\frac{2m}{\hbar^2}(E+E^2/E_g)\right)^{\frac{1}{2}}f_0(\mu,T),$$

which is equation (2) in the main text. The energy density of electrons (in $eV/cm^3$) referenced to the conduction band minimum can be calculated as $$U(\mu,T)=\int_0^\infty\frac{E\,dk}{4\pi^3}f_0(\mu,T)=$$
$$\frac{1}{\pi^2}\int_0^\infty dE\frac{m}{\hbar^2}E(1+2E/E_g)\left(\frac{2m}{\hbar^2}(E+E^2/E_g)\right)^{\frac{1}{2}}f_0(\mu,T),$$

which is equation (3) in the main text.

The relative permittivity of ITO was modeled using the Drude formula $$\varepsilon(\omega)=\varepsilon_\infty-\frac{\omega_p^2}{\omega^2+i\gamma\omega}$$

with $\varepsilon_\infty=3.95$ (taken from Granqvist, C. G. et al). A good match between the experimental and simulated NIR experimental transmission spectra of the ITO-NRA (FIGS. 1B and 1C) is obtained with $\omega_p$=2.02 eV and γ=0.12 eV. These values were used for the simulations of MIR transmission spectra shown in FIG. 1F. Compared with the experimental MIR spectra shown in FIG. 1E, the simulated MIR spectra in FIG. 1F using NIR spectra predicted $\omega_p$ and γ have slightly bluer long-LSPR wavelengths. This discrepancy may be due to (but is not limited by) the following factors. 1. The sharpness of the nanorod corners cannot be fully addressed due to the limitation of mesh size used in the finite element simulations (given that the simulation domain is as large as about 1 μm×1 μm×5 μm). 2. The background permittivity was based on literature reports that have different ITO preparation method and possibly crystallinities. 3. Additional Lorentz oscillators may contribute to ITO's relative permittivity, which are ignored in the current study. The refractive index of YSZ was taken as a constant of 2.1 in the entire infrared range explored.

We obtained the static (T=300 K) plasma frequency $\omega_p$(300 K)=2.02 eV from the finite element simulation fittings. Based on $\omega_p$(300 K)=2.02 eV we calculated μ(300 K) from equation (1), and with μ(300 K) we further determined n from equation (2). Under the intraband pumping in our study, conservation of n means that n is a temperature independent property. As a result, for electrons at temperature T>300 K, the constant n allows the determination of μ(T) from equation (2). Based on μ(T) we can further calculate $\omega_p$(T) and the energy density U(T) using equation (1) and equation (3), respectively. Using the reported $1/E_g$=0.4191 eV$^{-1}$ and m=0.263 m$_0$ for ITO (m$_0$ being free electron mass), we determined μ(300 K)=1.24 eV and n=1.59×10$^{21}$ cm$^{-3}$. The calculated electron energy density rise U(T)−U(300 K) (in eV/cm$^3$) represents the energy required to raise the electron temperature from 300 K to T. Note that knowing [U(T)−U(300 K)] v.s. T one can calculate the heat capacity C(T) for the electron gas, which is a temperature dependent quantity.

The Electron Heat Capacity for ITO-NRA

Figure 5A:
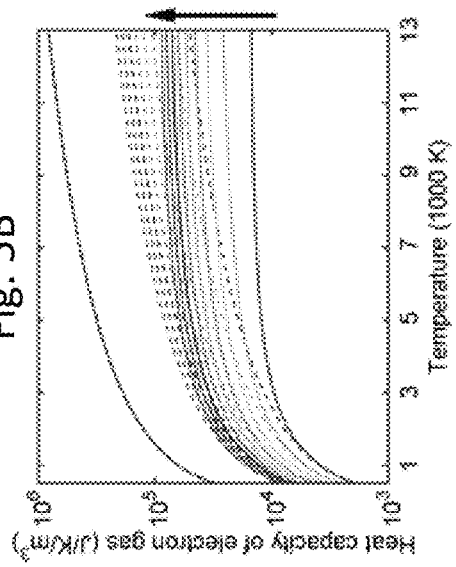
FIG. 5A shows a heat capacity C(T) per electron for an electron gas that has $\omega_p$(300 K)=2.02 eV.
Figure 5B:
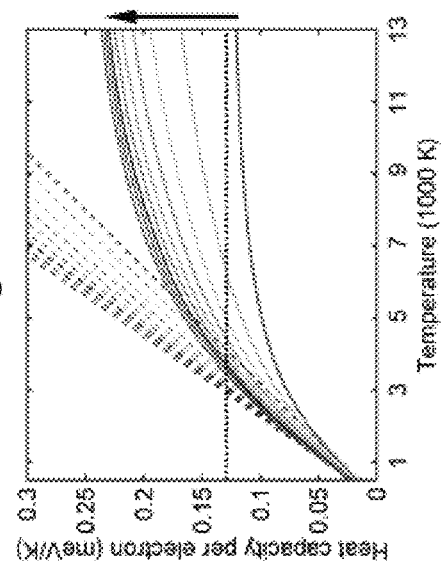
FIG. 5B a heat capacity C(T) (per cm$^3$) for an electron gas that has $\omega_p$(300 K)=2.02 eV.

In FIG. 5A-5B we plot the C(T) calculated for the electron gas of ITO-NRA with a static $\omega_p$ of 2.02 eV. Calculations based on the [U(T)−U(300 K)] v.s. T as well as the Sommerfeld approximations are performed for $1/E_g$ ranging from 0 eV$^{-1}$ to 0.8 eV$^{-1}$ with a fixed m=0.263 m$_0$.

In FIG. 5A, the colored solid lines are numerically calculated C(T) based on [U(T)−U(300 K)] v.s. T, whereas the colored dashed lines are heat capacities analytically calculated from the low temperature Sommerfeld approximation $$C(T) = \frac{1}{3}\pi^2 D(\mu) k_B^2 T,$$

where D(μ) is the density of states at the Fermi level. Calculations are performed for different $1/E_g$ with a fixed m=0.263 m$_0$. The black dotted line represents a constant heat capacity of $$\frac{3}{2}k_B$$

(the Dulong-Petit limit), where $k_B$ is the Boltzmann constant.

In FIG. 5B, the heat capacity C(T) (per cm$^3$) for an electron gas that has $\omega_p$(300 K)=2.02 eV. The colored solid lines are again numerically calculated results and dashed lines are Sommerfeld approximated results. The black dash-dotted line is the Sommerfeld C(T) for gold, which we write as C(T)=aT with a of 63 J·m$^{-3}$·K$^{-2}$. The black arrows in FIGS. 5A-5B indicate $1/E_g$ increasing from 0 eV$^{-1}$ to 0.8 eV$^{-1}$ with a 0.1 eV$^{-1}$ step.

Estimating the Experimental Excitation Energy Density

Transmission and reflection measurements showed that the ITO-NRA sample transmits ~50% and reflects ~5% of the pump power (relative to a gold film taken as 100% reflection) regardless of the pump fluence used in the TA experiments (up to 6.5 mJ/cm$^2$). As a result, we estimated the actual absorbed pump fluence to be 45% of the pump fluence. We then converted the experimental pump fluence in mJ/cm$^2$ to an excitation energy density in eV/cm$^3$. Relevant parameters are: pump spot diameter at normal incidence, D (in cm); energy per pump pulse, F (in mJ); incidence angle (angle between the pump beam and the substrate normal), $\theta_{inc}$ (in degree); area of the sample being pumped, $$\frac{\pi(D/2)^2}{\cos\theta_{inc}} \text{ (in cm}^2\text{);}$$

pump fluence, $$\frac{F\cos\theta_{inc}}{\pi(D/2)^2} \text{ (in mJ/cm}^2\text{);}$$

energy per pump pulse absorbed by the sample, 0.45×F (in mJ); nanorod array periodicity, height and edge length, a, H and L (in cm); total volume of the nanorods illuminated by the pump, $$\frac{\pi(D/2)^2 L^2 H}{a^2\cos\theta_{inc}} \text{ (in cm}^3\text{).}$$

The experimental excitation energy density is then $$\frac{0.45\times F}{\left(\frac{\pi(D/2)^2 L^2 H}{a^2\cos\theta_{inc}}\right)} \text{ (in mJ/cm}^3\text{),}$$

or, equivalently, $$\frac{0.45\times F}{\left(\frac{\pi(D/2)^2 L^2 H}{a^2\cos\theta_{inc}}\right)} \times 6.2415\times 10^{15} \text{ eV/mJ (in eV/cm}^3\text{).}$$

Figure 6A:
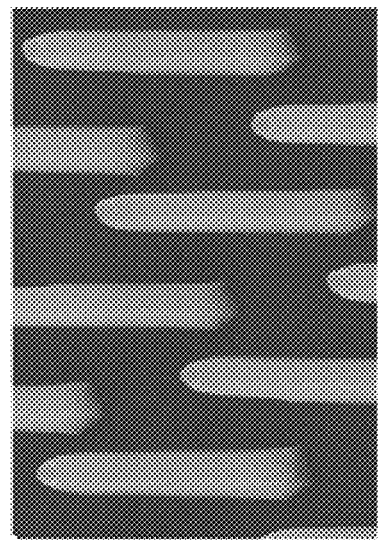
FIG. 6A shows a top-down SEM view of ITO-NRA.
Figure 6B:
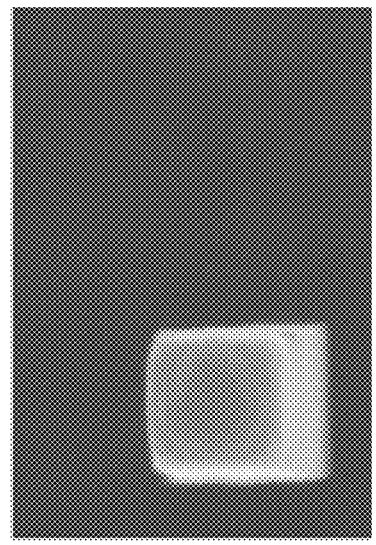
FIG. 6B shows a 30° tilted SEM view of the ITO-NRA.

As a result, the pump fluence $$\frac{F\cos\theta_{inc}}{\pi(D/2)^2} \text{ (in mJ/cm}^2\text{)}$$

multiplied by a factor $$0.45\times \frac{a^2}{L^2 H}\times 6.2415\times 10^{15} \text{ eV/mJ}$$

gives the experimental excitation energy density (in eV/cm$^3$). Using nanorod array periodicity a=1000×10$^{-7}$ cm, height H=2600×10$^{-7}$ cm and edge length L=180×10$^{-7}$ cm, the factor for converting pump fluence in mJ/cm$^2$ to excitation energy density in eV/cm$^3$ is estimated as $$0.45\times \frac{a^2}{L^2 H}\times 6.2415\times 10^{15} \text{ eV/mJ} = 3.34\times 10^{20} \text{ eV/mJ/cm,}$$

which appears in the upper x-axis in FIG. 3C. The height and edge of the nanorods were estimated from the SEM images shown in FIG. 6A-6B.

MIR-Probe-TA Under Various Incidence Angles, Polarizations, and Fluences

FIGS. 2L-2O summarize the MIR-probe-TA results at varying incidence angles under a p-polarized probe. Note that, ΔOD signals are only observed at oblique incidence angles, under which conditions the long-LSPR can be excited. The strong dependence of ΔOD magnitude on the incidence angle can be explained by the incidence angle dependent depth of the plasmon resonance shown in FIG. 1E, and maximal ΔOD intensity is achieved at 30° to 40°. In addition, the zero-crossing-wavelength of the ΔOD spectra exhibits a blueshift as the incidence angle is increased, due to the effect of phase-retardation on the longitudinal dipole-dipole coupling efficiency (details to be reported in future work), and is consistent with a slight blueshift of the static long-LSPR at increasing incidence angles shown in FIGS. 1E and 1F.

FIG. 1I shows the static MIR transmission spectra of the ITO-NRA at different angles under s-polarization. In contrast to the results under p-polarization shown in FIG. 1E, the strong transmission dips are absent at oblique incidence angles under s-polarization. FIGS. 1J to 1L further show the ΔOD spectral maps measured at 0°, 30° and 50° incidence angles under s-polarized probe. Negligible ΔOD signal was observed under s-polarized probe regardless of the incidence angle.

Since the pump and probe have the same polarization direction (as illustrated by the black arrow in FIG. 2A), one explanation for the absence of ΔOD signals in the s-polarized probe TA experiments can be poor absorption of the s-polarized NIR-pump under oblique incidence angles. We performed static transmission measurements in the NIR range at varying incidence angles under un-polarized light to eliminate this possibility. As demonstrated in FIG. 1H, strong dips with similar depths are observed over the entire range of incidence angles (0° to 50°). At an incidence angle of 0°, s-polarization and p-polarization become degenerate and both of them can strongly excite the trans-LSPR. As a result, the similar depths of the transmission dips at all incidence angles shown in FIG. 2L indicate that the trans-LSPR can be excited by both s-polarized and p-polarized components of the incident light for these incidence angles. Otherwise, the depth of the transmission dip would have become less significant with increasing incidence angle. From this we conclude that the absorption of the NIR pump by the ITO-NRA is similar for MIR-probe-TA experiments using s-polarized and p-polarized probes. The absence of ΔOD signal under s-polarized probe is not due to an inefficient pumping of the material.

Figure 2F:
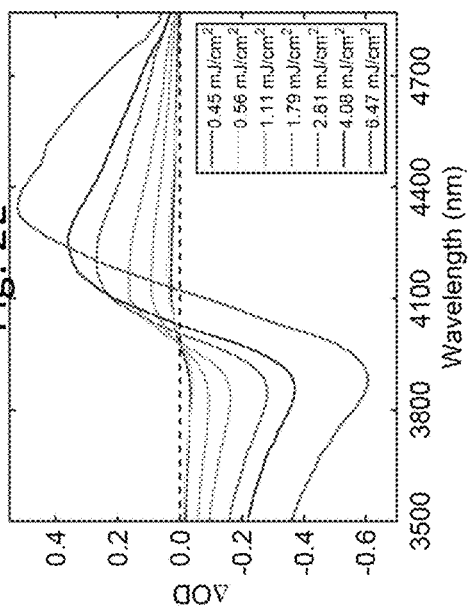
FIG. 2F shows a fluence dependent MIR ΔOD kinetics at the wavelength where the bleaching is maximized (indicated by the green arrow in FIG. 2D).
Figure 2G:
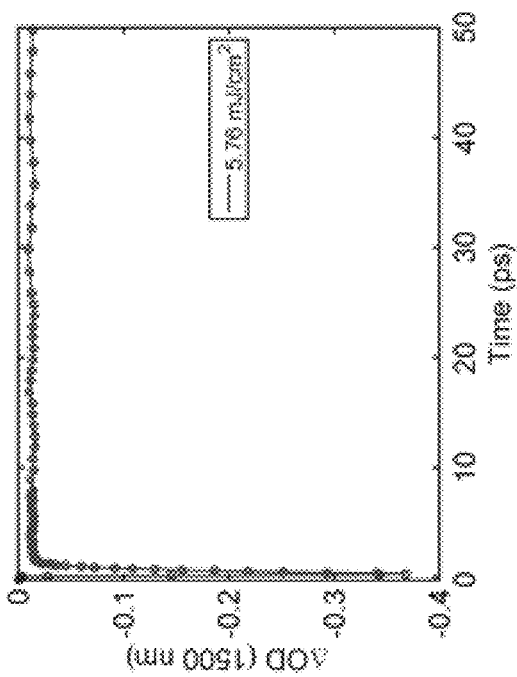
FIG. 2G shows ΔOD kinetics at 1500 nm for delay times up to 50 ps.
Figure 2N:
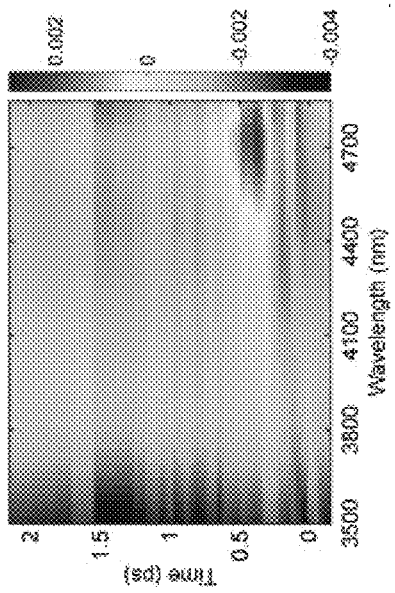
FIG. 2N shows a ΔOD spectral map measured at 0° incidence angle under p-polarized probe. Pump fluence was 4.9 mJ/cm$^2$.
Figure 2O:
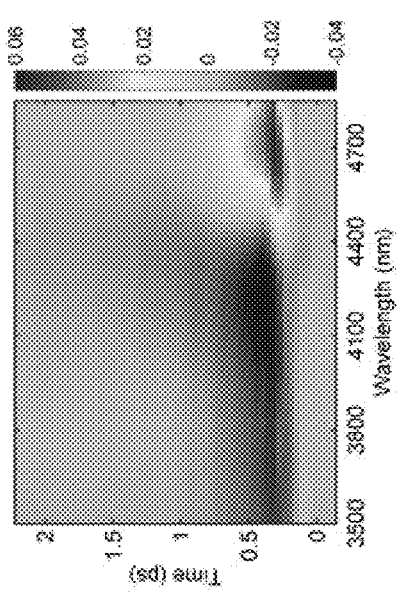
FIG. 2O shows a ΔOD spectral map measured at 10° incidence angle under p-polarized probe. Pump fluence was 4.9 mJ/cm$^2$.
Figure 2L:
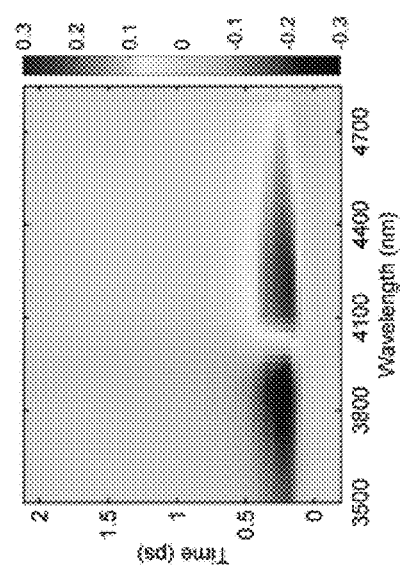
FIG. 2L shows a spectral map measured at 30° incidence angles with p-polarized probe (corresponding to the transient spectra, and kinetics shown in FIG. 2E and FIG. 2F). Pump fluence was 2.81 mJ/cm$^2$.
Figure 2M:
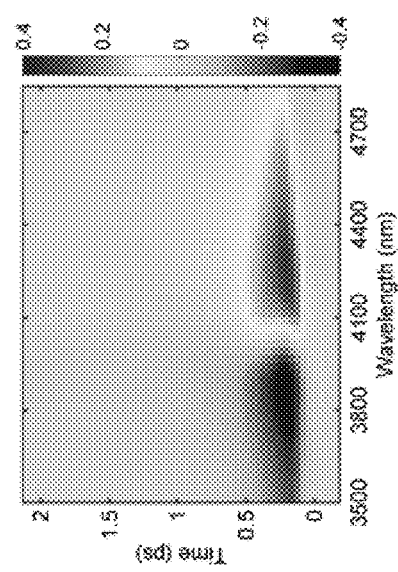
FIG. 2M shows a spectral map measured at 30° incidence angles with p-polarized probe (corresponding to the transient spectra, and kinetics shown in FIG. 2E and FIG. 2F). Pump fluence was 4.08 mJ/cm$^2$.
Figure 2T:
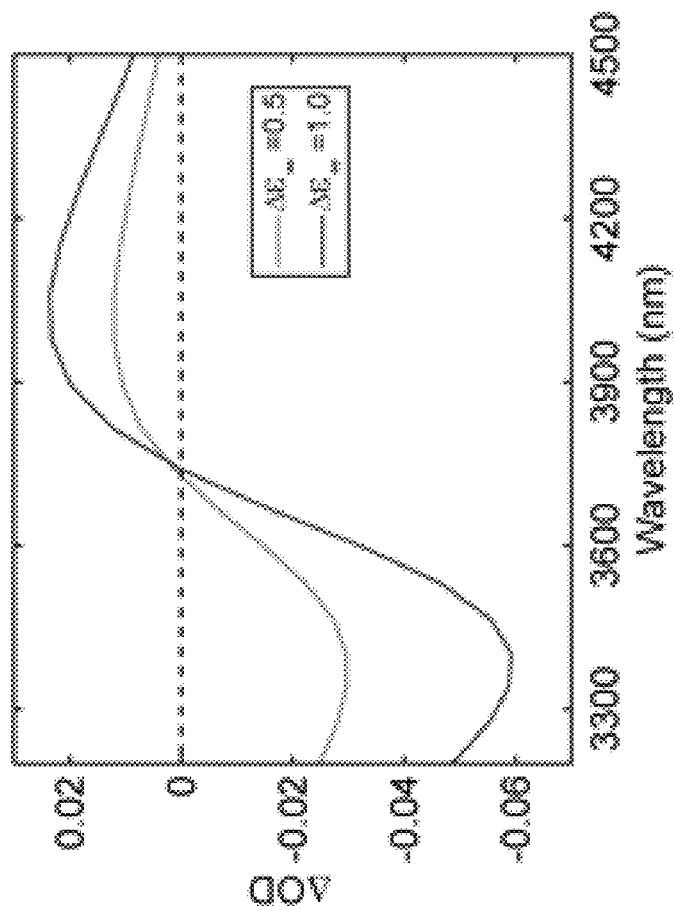
FIG. 2T shows a simulated ΔOD spectra with $\Delta\epsilon_\infty=0.5$ and $\Delta\epsilon_\infty=1.0$ at 30° incidence angle under p-polarization. Static values for the Drude permittivity are $\epsilon_\infty=3.95$, $\omega_p=2.02$ eV and $\gamma=0.12$ eV.

FIGS. 2H-2K show the fluence-dependent MIR-probe-TA results at 30° incidence angles under a p-polarized probe (same condition as FIG. 2D but using different pump fluences). The transient spectra shown in FIG. 2E and kinetics shown in FIG. 2F are line-cuts from these complete ΔOD spectral maps.

Estimation of the Lattice Temperature Rise

Due to the absence of a literature reported heat capacity for ITO, we estimated the heat capacity of ITO using the reported heat capacity for $In_2O_3$ at room temperature, which is 99.08 J $mol^{-1}$ $K^{-1}$. We used literature reported ITO lattice parameters (space group of $Ia\bar{3}$, lattice constant of 1.0125 nm), and estimated the molecular weight of ITO to be equal to that of $In_2O_3$, which is 277.64 g/mol. This is a good approximation as In and Sn have similar atomic weights, and the doping concentration of Sn in ITO is usually ≤10%. Combining these values the mass density and heat capacity of ITO are determined to be 7122 kg kg $m^{-3}$ and 2.54×10$^6$ J $m^{-3}$ $K^{-1}$, respectively. The temperature rise was subsequently calculated by considering the experimental excitation energy density of electrons in mJ/$cm^3$ discussed above. FIG. 1M shows the estimated maximal lattice temperature rise due to intraband pump excitation. Notably, heat transfer from the lattice to the environment is ignored in the calculation as lattice cooling has a time scale of tens to hundreds of ps, which is orders of magnitude longer than the electron cooling rate.

Effects of the Underlying ITO Film on the Transmission Spectra of ITO-NRA

Figure 7A:
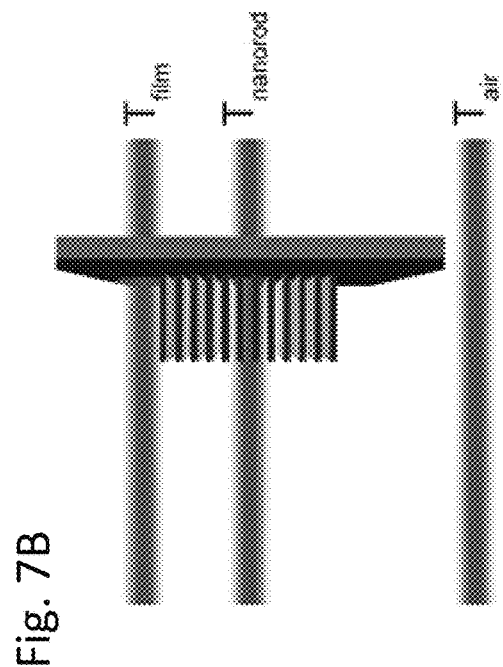
FIG. 7A shows a cross sectional transmission electron microscopy image of epitaxial ITO film sputtered on YSZ before the nanorod growth.

An epitaxial ITO film of about 10 nm was pre-sputtered before the ITO-NRA growth to facilitate electron beam lithography and immobilize the gold seeds during the nanorod growth. The cross-sectional transmission electron microscopy (TEM) image in FIG. 7A shows the epitaxial ITO/YSZ interface (viewed along [001] direction) before the nanorod growth. Directly patterning gold seeds on YSZ substrate results in planar instead of vertical nanorod growth.

Figure 1O:
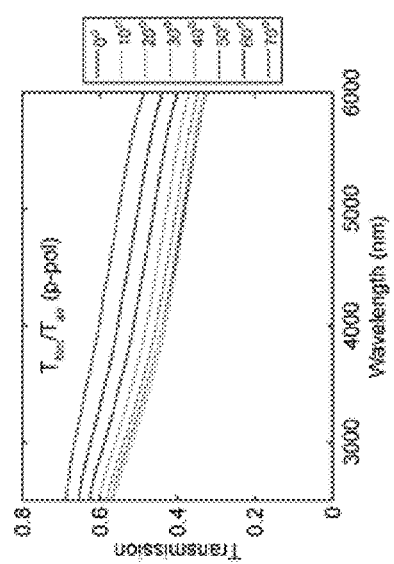
FIG. 1O shows a static transmission spectra of ITO film (after the nanorod growth) under s-polarization.
Figure 7B:
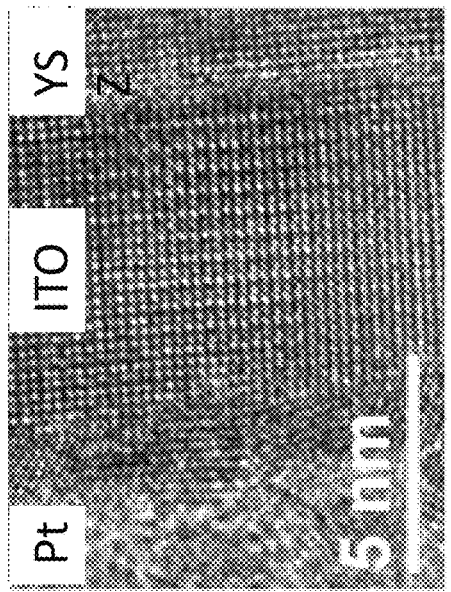
FIG. 7B shows a schematic diagrams of the static transmission measurements.

The ITO film thickness slightly increased after the vapor-liquid-solid nanorod growth, possibly due to a much slower but finite vapor-solid growth. This thin ITO film becomes less transparent and more reflecting at longer wavelengths in the MIR. To investigate further the effect of the underlying ITO film on the static transmission property of the ITO-NRA we performed static transmission measurements on both the ITO film and the ITO-NRA. FIG. 7B depicts various intensities measured from FTIR, with $T_{air}$ indicating intensity of beam transmitting through air, $T_{film}$ indicating intensity of beam transmitting through ITO-film/YSZ-substrate, and $T_{nanorod}$ indicating intensity of beam transmitting through ITO-NRA/ITO-film/YSZ-substrate. FIGS. 1N-1O show experimental transmission spectra of the ITO-film/YSZ-substrate under both p-polarization and s-polarization referenced to air (or simply $T_{film}/T_{air}$) at various incidence angles. While increasing the incidence angle yields an overall higher transmission in the entire measured spectral range for p-polarization, an opposite trend is observed for s-polarization. The diminished ITO film transmission at longer wavelengths results in the drop of transmission intensities at longer wavelengths for the ITO-NRA shown in FIG. 1E.

Scattering of Electrons at Elevated Temperatures

The electron-electron and electron-phonon scattering rates, which determine the damping term γ, depend on the electron and lattice temperature as well as the availability of states involved in the scattering processes. This is simplified in our analysis by the use of a constant damping rate γ in the finite element simulations performed for FIG. 3d. Here we qualitatively comment on the scattering of electrons at elevated temperatures by comparing the velocities of electron in parabolic and nonparabolic bands. In parabolic bands the velocity $$v = \frac{1}{\hbar} \frac{\partial E}{\partial k} = \frac{\hbar k}{m}$$

shows a linear dependence of v on k, which in a classical picture suggests a larger damping rate γ due to more collisions when pumping the electrons to higher k states. In a nonparabolic band, however, the velocity becomes $$v = \frac{1}{\hbar} \frac{\partial E}{\partial k} = \frac{\hbar k}{m(1 + 2E/E_g)} = \sqrt{\frac{2}{m}} \frac{(E + E^2/E_g)^{\frac{1}{2}}}{(1 + 2E/E_g)}.$$

This form suggests that rising of v due to the increasing $$(E + E^2/E_g)^{\frac{1}{2}}$$

term is compensated by the increase of the denominator term $(1+2E/E_g)$. This is consistent with the absence of spectralbroadenings of NIR and MIR LSPRs in both the NIR-probe and MIR-probe TA experiments that would otherwise lead to more pronounced induced-absorptions. Notably, in the limiting case of $1/E_g \to \infty$ eV, the electron velocity $$v \to \sqrt{\frac{E_g}{2m}}$$

and becomes independent of k.

Discussion on Electron Thermalization

We note that comparison of FIG. 3D with FIG. 2E is based on the implicit assumption that the electron gas is thermalized, characterized by temperature T. Though an initial step-like athermal electron distribution was proposed for describing electron dynamics in noble metals, this model does not fully apply in our study, as the energy change for the electron gas in ITO-NRA undergoing a step-like distribution change must be less than $1.32 \times 10^{21}$ eV/cm$^3$ (obtained by 0.83 eV per pump photon times n=$1.59 \times 10^{21}$ cm$^{-3}$. This is an overestimate as n is integrated for energy from 0 eV to 1.24 eV referenced to the CBM, but only electrons from 1.24−0.83=0.41 eV to 1.24 eV can actually participate the step-like change). However, no pump absorption saturation is observed at such pump levels (FIG. 2E). We do note, however, that the kinetics shown in FIG. 2F reveal a slightly lower electron-gas-energy-loss-rate during the initial ~100 fs after $t_0$, which is likely a signature of an athermal electron contribution, as athermal electrons exhibit a much lower electron-energy-loss-rate to the lattice than thermalized electrons[12].

Sample Fabrication.

The ITO-NRAs were fabricated with a modified version of the procedure described earlier. Briefly, a 10 nm thick epitaxial ITO film was sputtered on YSZ (001) substrate at 600° C. under a 5 mTorr 20 sccm Ar gas flow. After spin-coating 70 nm GL-2000 electron beam resist (Gluon Labs), a large area (0.6 cm by 1 cm) array of 150 nm dots with a chosen periodicity was patterned with electron beam lithography (JEOL 9300). The substrate was then developed in Xylene at room temperature for 1 min, rinsed with IPA, followed by the deposition of 2 nm Cr and 15 nm Au, which were subsequently lifted off by immersing in Anisole at 75° C. for 1 hour. The ITO-NRAs were then grown in a three-zone furnace, in which the source (100 mg mixture of In and SnO with a molar ratio of 9:1) and substrate were kept at 900° C. and 840° C., respectively. The gas flow was a mixture of 6 sccm 5% $O_2$ (balanced by $N_2$) and 80 sccm pure Ar under a pressure of 130 mTorr.

Optical Measurement

Near to mid-infrared transmission spectra were measured with FTIR (Thermo Nicolet 6700). A ZnSe lens was used to focus the light to a 1 mm diameter spot. Transient absorption measurements were performed using a 35 fs amplified titanium: sapphire laser operating at 800 nm with a repetition rate of 2 kHz. Near-infrared pump pulses at 1500 nm were generated via a white light seeded optical parametric amplifier and were reduced in repetition rate to 1 kHz. Near-infrared probe pulses were generated by focusing a portion of the amplifier output into a 12 mm thick sapphire window. Mid-infrared probe pulses were produced from difference frequency mixing of the signal and idler beams produced from a second white-light seeded optical parametric amplifier. Pump-probe time delays were produced via a variable path delay stage and retroreflector. In MIR-probe-TA, p-polarization is achieved by rotating the sample around a rotation axis perpendicular to the propagation direction and polarization direction of the beam (as shown in FIG. 2A), whereas s-polarization is achieved by rotating the sample around a rotation axis parallel to the beam polarization (not shown in FIG. 2A). The high spatial uniformity of the sample and a smaller nanorod distance of 1 μm (compared to the NIR and MIR wavelengths of study) ensure that only specular transmission and reflection are present in our TA experiments. Discrimination of pump and probe pulses was further aided by an aperture downstream of the sample that spatially filtered weak pump scatter.

Simulations and Calculations.

FEM simulations of the periodic ITO-NRA were performed with the RF module of COMSOL Multiphysics. Codes for numerical calculations of the integrals were implemented with Matlab R2015a.

Example 2

Sub-Picosecond all-Optical Modulation of the Full-Visible Spectrum

Here we demonstrate large optical nonlinearity of indium tin oxide nanorod arrays (ITO-NRAs) in the dielectric range from 360 nm to 710 nm (denoted as the visible range) when pumped at the localized surface plasmon resonance (LSPR) in the NIR. A number of transmission minima in the visible range, arising from collective light diffraction by the periodic dielectric nanorod array, give rise to a pump-induced transmission modulation with absolute amplitude up to ±20%. These transmission minima also act as sensitive "probes" for the quantification of permittivity change and thereby the optical nonlinearity of ITO. We show that a positive change of the real part of the permittivity is achieved throughout the visible range, which is attributed to a modification of the interband transitions in ITO. Moreover, the large scattering cross-section of the dielectric ITO-NRAs (as opposed to the large absorption cross-section of noble metal nanostructures) allows for a dynamic redistribution of light intensities among different diffraction orders, and the spectral response of the ITO-NRAs can be tuned by simply adjusting the incidence angle or tailoring the length of the nanorods. In the temporal domain, we found both a sub-picosecond response stemming from the electron-phonon coupling and a microsecond response arising from the lattice cooling in ITO.

Static Spectral Features of the ITO-NRA

Figure 8N:
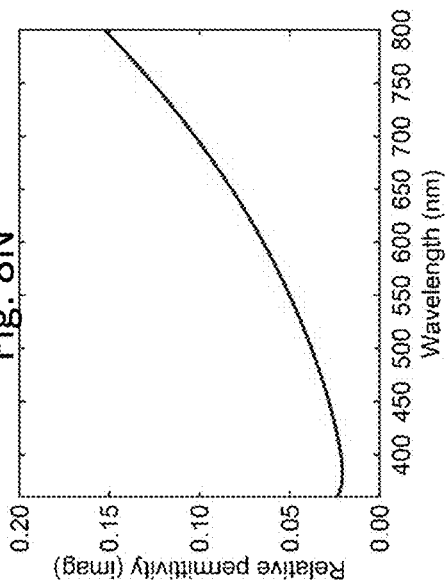
FIG. 8N shows the imaginary part of the relative permittivity in the visible range (using the Drude-Lorentz model).
Figure 8P:
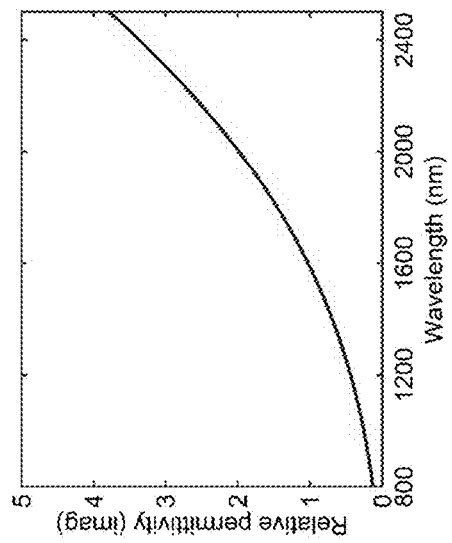
FIG. 8P shows the imaginary part of the relative permittivity in the near-infrared range (using the Drude-Lorentz model).
Figure 8M:
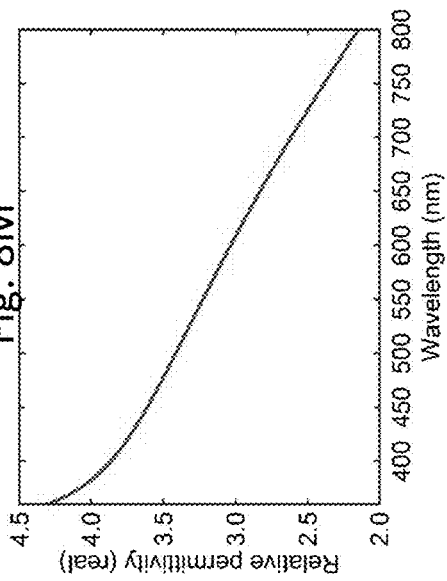
FIG. 8M shows the real part of the relative permittivity in the visible range (using the Drude-Lorentz model).
Figure 8O:
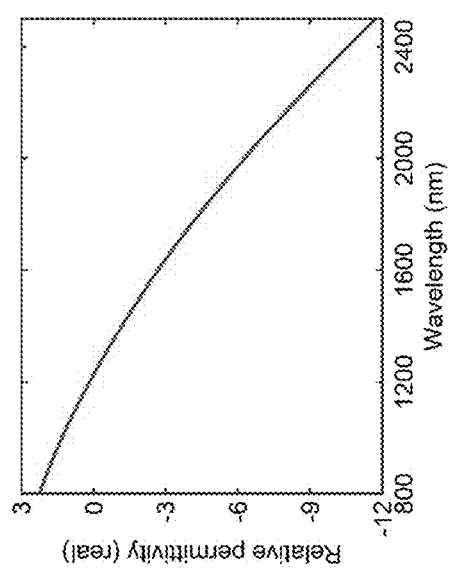
FIG. 8O shows the real part of the relative permittivity in the near-infrared range (using the Drude-Lorentz model).
Figure 8T:
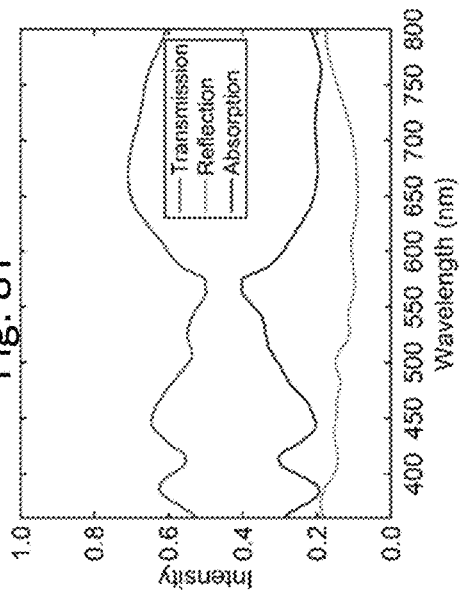
FIG. 8T shows total transmission, total reflection and deduced absorption spectra for the ITO-NRA with 800 nm periodicity and 1.4 μm height.
Figure 8V:
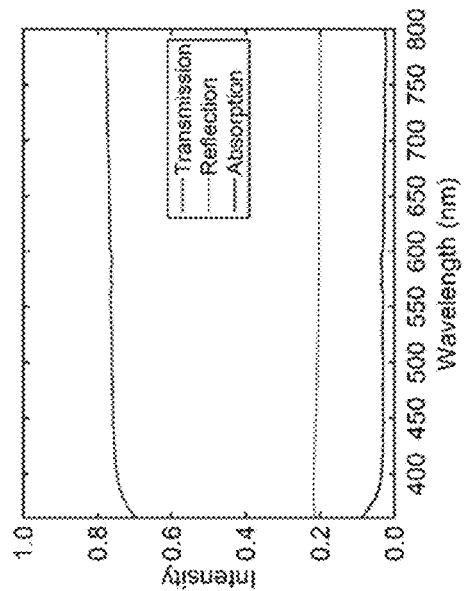
FIG. 8V shows the total transmission, total reflection and deduced absorption spectra for a bare YSZ substrate (0.5 mm thick).
Figure 8S:
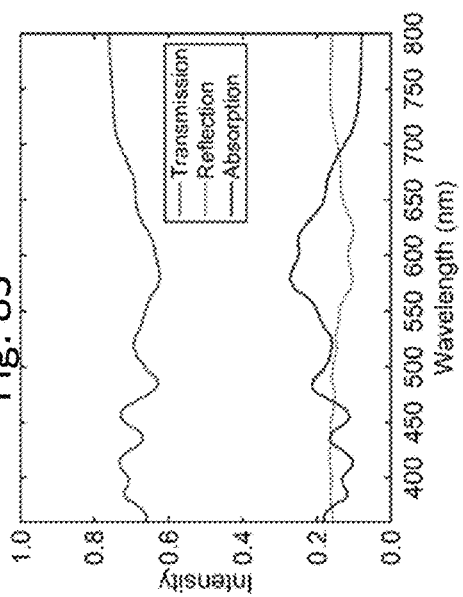
FIG. 8S shows total transmission, total reflection and deduced absorption spectra for the ITO-NRA with 1 μm periodicity and 2.6 μm height.
Figure 8U:
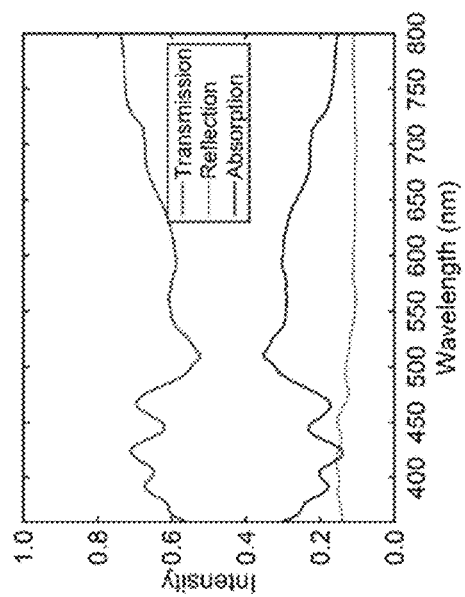
FIG. 8U shows total transmission, total reflection and deduced absorption spectra for the ITO-NRA with 1 μm periodicity and 2.9 μm height.

FIG. 8A shows a scanning electron microscopy image of the highly uniform ITO-NRA achieved by the vapour-liquid-solid (VLS) growth process (described below). Static transmission spectra of the array in the visible and NIR range, both measured at normal incidence, are shown in FIGS. 8B and 8C, respectively. The transmission suppression centred at 1500 nm shown in FIG. 8C is due to strong light absorption of the ITO-NRA at its transverse LSPR with electrons oscillating along the short axis. The visible spectrum shown in FIG. 8B exhibits five pronounced transmission minima centred at 589 nm, 486 nm, 434 nm, 396 nm and 369 nm (denoted as $\lambda_1$, $\lambda_2$, $\lambda_3$, $\lambda_4$, and $\lambda_5$), respectively. The transmission minima in the visible regime are not due to resonant absorption but are simply standing wave resonances based on the $HE_{11}$ waveguide mode. As illustrated by the near-field plots shown in FIG. 8D obtained from optical simulations, at each transmission minimum wavelength the waves reach an out-of-phase condition at the interface of the nanorod and substrate (which is at the bottom boundary of the nanorod). The out-of-phase condition is mathematically represented as a phase difference equal to $(2m-1)\pi$, with m=1, 2, 3, 4 and 5 corresponding to transmission minimum at $\lambda_1$, $\lambda_2$, $\lambda_3$, $\lambda_4$, and $\lambda_5$, respectively. By treating each nanorod as a dielectric waveguide supporting the fundamental nanorod $HE_{11}$ mode (See FIGS. 8G-8L), the spectral locations of the transmission minima can be related to the effective mode index (denoted as $n_{eff}$) of the waveguide by the equation $2\pi(h \cdot n_{eff}/\lambda_m - h \cdot 1/\lambda_m) = (2m-1)\pi$, or equivalently, $\lambda_m = 2h(n_{eff}-1)/(2m-1)$, here denoted as equation (1), where $\lambda_m$ is the wavelength of a transmission minimum and h is the height of the nanorod. FIG. 1E depicts the wavelength dependence of $n_{eff}$ predicted by the waveguide simulations, which matches well with $n_{eff}$ calculated from equation (1) using the experimentally observed wavelengths of the transmission minima. The permittivity of ITO used in both the optical and waveguide simulations in the visible range is based on a Drude-Lorentz model with parameters obtained from matching the experimentally measured transmission spectrum by the simulated analogue (See FIGS. 8M-8R).

While the NIR LSPR is a localized phenomenon, the transmission minima in the visible range are due to coherent light diffraction by the ITO-NRA and therefore is attributed to an array effect. Effectively, the ITO-NRA acts as a two-dimensional diffraction grating that supports not only the forward propagating (0, 0) order, but also the (1, 0) and (1, 1) grating orders propagating in oblique directions (See FIGS. 8G-8L). The dielectric nature of ITO in the visible range dictates that intensities of the (1, 0) and (1, 1) grating orders should be complementary to that of the (0, 0) order. This is supported by the transmission and reflection intensities of the ITO-NRA measured using an integrating sphere (FIGS. 8S-8v), and is further confirmed by the transmission spectra of the higher diffraction orders plotted in FIG. 8F obtained from optical simulations; the transmission maxima of the (1, 0) and (1, 1) orders are found to spectrally match the transmission minima of the (0, 0) order.

Transient Absorption Experiments on the ITO-NRA

The transient spectral response of the ITO-NRA was investigated by pump-probe transient absorption (TA) experiments. To fully characterize the dynamics, we performed both nanosecond TA experiments (denoted as short-delay-TA experiments) and microseconds TA experiments (denoted as long-delay-TA experiments). In both experiments the center wavelength of the pump was tuned to the LSPR wavelength of 1500 nm, which permits large on-resonance absorption in the metallic region of the ITO-NRA. Pumping the sample at 800 nm (off-resonance) was found to give significantly weaker response in comparison to the on-resonance pumping (See FIG. 8V). Note that the 1500 nm pump photon has energy far below the 3.8 eV to 4.0 eV band gap of ITO and hence produces an intraband excitation of the conduction band electrons. A white-light probe covering the range of 360 nm to 750 nm was employed and focused on the sample to a diameter of 396 μm in the short-delay-TA experiments and 220 μm in the long-delay-TA experiments. We observed a sub-picosecond transient response of $\Delta T(t)/T(0)$ in the short-delay-TA experiments, and a microsecond transient response in the long-delay-TA experiments. Here $\Delta T(t)$ is defined as $T(t)-T(0)$ with $T(t)$ being the transmission at delay time t and $T(0)$ being the static transmission (both referenced to air). In what follows we denote the sub-picosecond $\Delta T(t)/T(0)$ component as the fast component, which we will attribute to a hot-electron-induced change of permittivity with a time scale determined by electron-phonon coupling. In contrast, the microsecond component, designated as the slow component, is assigned to a permittivity change due to thermal and elastic effects of the lattice. Note that besides being a broadband spectral response, the fast and slow components have characteristic relaxation times differing by six orders of magnitude, far longer than the decay time contrast observed in the noble metal counterparts; in the latter case the fast, electron-dominated component is a few picoseconds and the slow, lattice-dominated component is hundreds of picoseconds. In the next two sections we discuss the fast and slow components separately.

The Sub-Picosecond Component

The results of short-delay-TA experiments are summarized in FIGS. 9A-9D. FIG. 9A shows a color-coded $\Delta T(t)/T(0)$ spectral map for wavelength from 360 nm to 750 nm and delay times up to 1.5 ps. FIGS. 9B-9D show the $\Delta T(t)/T(0)$, $T(t)$, and $\Delta T(t)$ transient spectra, which are the differential change in transmission, the transmission, and the absolute change in transmission, respectively; here the chosen delay time (denoted as $t_{e,0}$ in FIG. 9A) is that when $\Delta T(t)/T(0)$ goes through a maximum. Note that the $\Delta T(t)/T(0)$ spectra exhibit a spectrally oscillating line-shape, which, as is evident from the $T(t)$ spectra, arises from a pump-induced redshift of the transmission spectrum. Qualitatively, a zero-crossing wavelength of the $\Delta T(t)/T(0)$ spectrum corresponds to a maximum or minimum in the $T(t)$ spectra. We note that the redshift of the transmission spectrum, that has large slopes due to the coexistence of multiple transmission minima, yields a broadband and remarkable absolute transmission change (FIGS. 9A-9D) that reaches a maximal positive (negative) value beyond 25% (−20%). We attribute the redshift of the transmission spectrum to a positive change of the real part of the relative permittivity, $\Delta\varepsilon'(\omega)$, as a stronger dielectric contrast between the nanorod and free space can lead to a stronger phase difference accumulation, which subsequently yields the out-of-phase conditions at longer wavelengths and thereby a redshift of the transmission spectrum.

To estimate the fluence and wavelength dependent $\Delta\varepsilon'(\omega)$ observed in our TA experiments, we carried out waveguide simulations, in which we arbitrarily introduced $\Delta\varepsilon'(\omega)$ ranging from 0 to 1 on top of the static permittivity, and calculate the wavelength dependent mode index $n_{eff}(\omega)$ as a function of $\Delta\varepsilon'(\omega)$. This allows for the calculation of the spectral locations of the five transmission minima associated with these values of $\Delta\varepsilon'(\omega)$ using equation (1). The dependence of $n_{eff}(\omega)$ on $\Delta\varepsilon'(\omega)$ and wavelength is color-coded in FIG. 10A, in which we also present the $\Delta\varepsilon'(\omega)$ dependent spectral locations of the transmission minima. We further confirmed by optical simulations that changing the imaginary part of the refractive index, $\Delta n''$ (or effectively the imaginary part of the permittivity), does not shift the transmission minima, as presented in FIG. 10B. As a result, by correlating the experimentally observed redshifts of the transmission minima shown in FIG. 9C with the $\Delta\varepsilon'(\omega)$ dependent shifts of transmission minima shown in FIG. 10A, we can deduce the experimental $\Delta\varepsilon'(\omega)$ at the transmission minima wavelengths $\lambda_1$ to $\lambda_5$; these are plotted in FIG. 10C for the fast component. This approach of combining the experimentally observed redshifts of transmission minima ($\Delta\lambda_m$) and the waveguide simulation predicted relation of $\Delta\varepsilon'$ versus $\lambda_m$ to deduce the $\Delta\varepsilon'(\omega)$ in our TA experiments is denoted as the experimental approach; note that this approach does not provide quantitative information about $\Delta\varepsilon'(\omega)$.

Figure 10D:
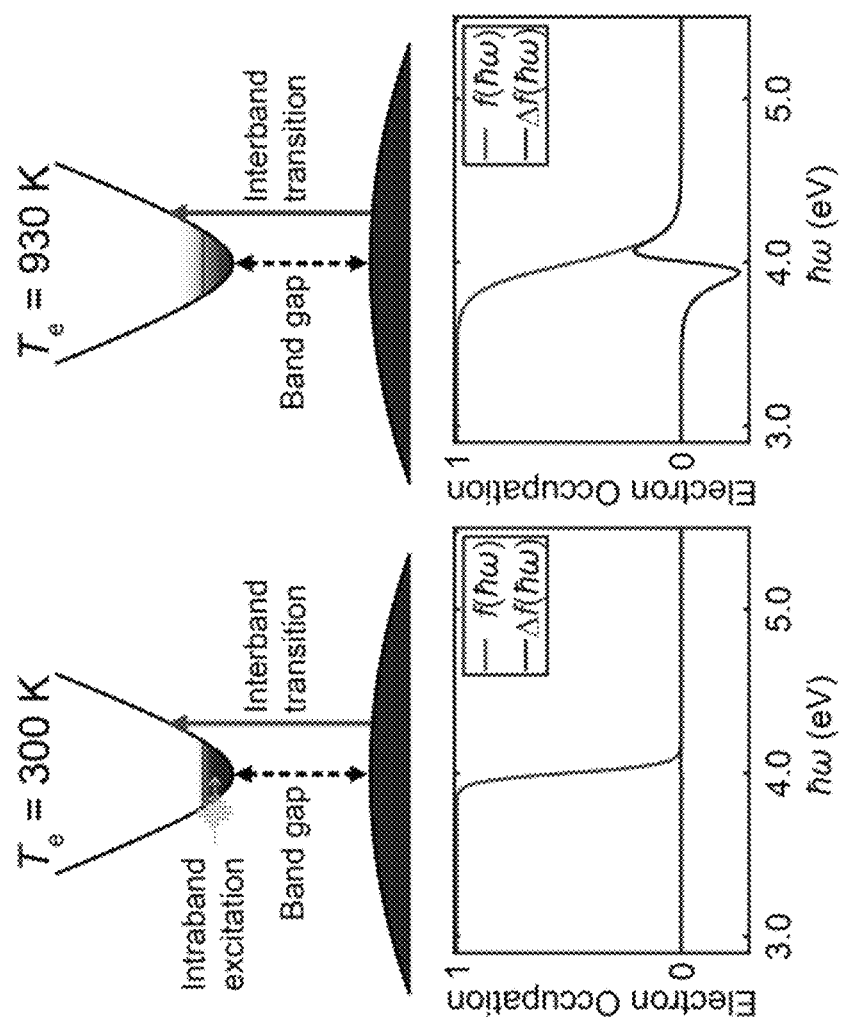
Figure 10F:
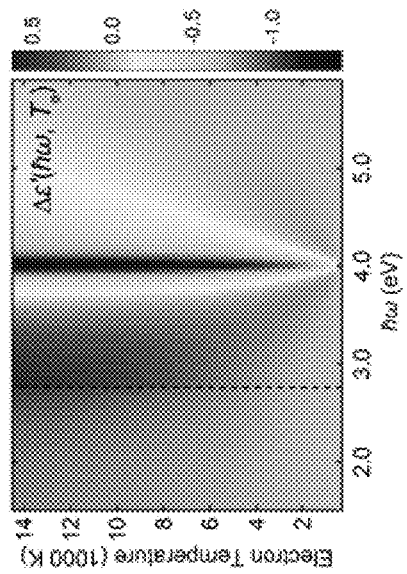
Figure 10E:
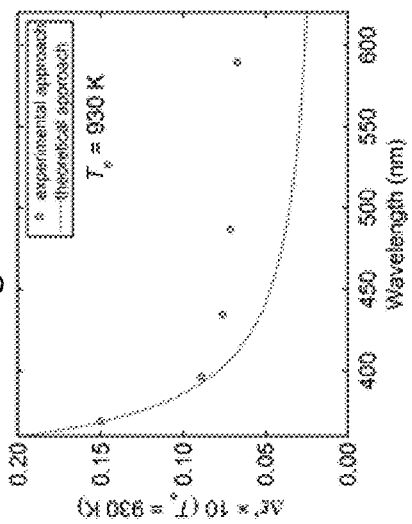
Figure 10G:
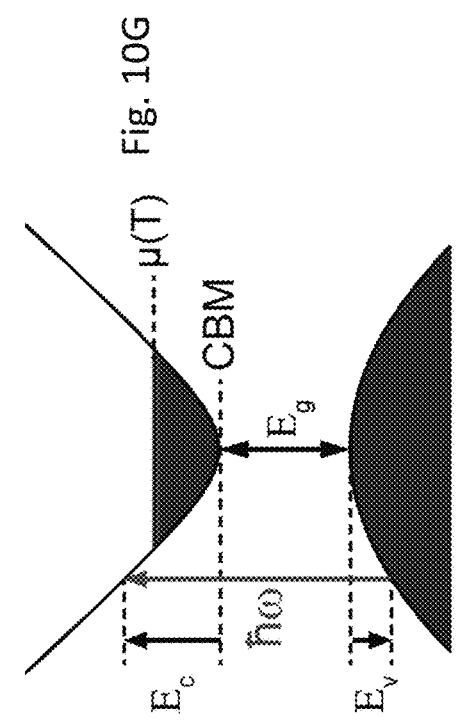
Figure 10M:
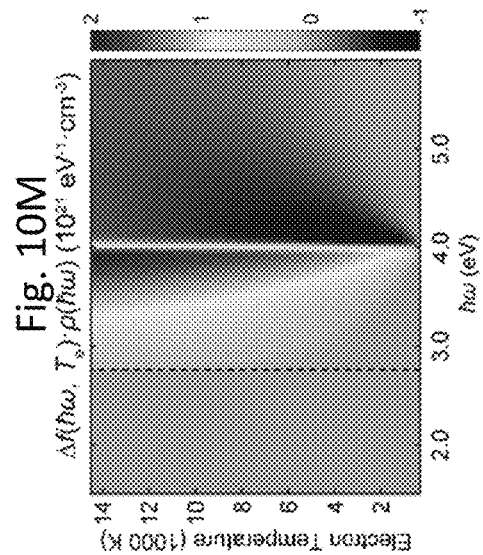
Figure 10L:
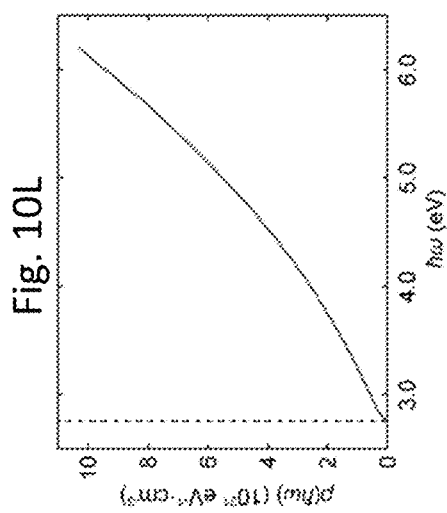

Examination of FIG. 10C reveals that at low pump fluences, $\Delta\varepsilon'(\omega)$ peaks at $\lambda_5$, which is close to ITO's band gap, and stays approximately constant at longer wavelengths. At high pump fluences, however, $\Delta\varepsilon'(\omega)$ peaks at $\lambda_4$, and falls off quickly at shorter wavelengths. Here we theoretically calculate $\Delta\in'(\omega)$ by considering the modification of interband transitions of ITO through intraband excitation, as schematically illustrated in FIG. 10D. The heating of the conduction band electrons results in a change of its distribution, which can be modelled in details using the procedure described earlier. A change in the Fermi distribution function of the electron gas gives rise to a change of the imaginary part of the permittivity, $\Delta\in''(\omega)$, through the change of interband transitions from the filled valence band to the partially occupied conduction band, which in turn produces a change of the real part of the permittivity, $\Delta\in'(\omega)$, dictated by the Kramers-Kronig relation. This is in essence consistent with the results reported for noble metal nanoparticles under intraband optical excitation. This approach, which gives quantitative information about both $\Delta\in'(\omega)$ and $\Delta\in''(\omega)$, is denoted as the theoretical approach; details of this approach are discussed below, as well as FIGS. 10G-10Q. In FIG. 10E we plot the theoretical approach predicted $\Delta\in'(\omega)$ under the constant electric-dipole matrix element approximation, as well as the $\Delta\in'(\omega)$ obtained from the experimental approach (as shown in FIG. 10C), both associated with the lowest experimental pump fluence of 73 µJ·cm$^{-2}$ (in the weak perturbative regime) in our short-delay-TA experiments. A value for the matrix element squared of 2.8×10$^{-49}$ J·kg was chosen to match the two data sets in FIG. 10E at $\lambda_5$; a larger experimental $\Delta\in'(\omega)$ in comparison to the theoretical $\Delta\in'(\omega)$ at longer wavelengths results from a permittivity change contributed by a reduction of the intrinsic plasma frequency of ITO due to an increase of the electron temperature, which has minimal effect at short wavelengths and is not captured by the interband absorption model. Using this same constant matrix element to calculate $\Delta\in'(\omega)$ for the entire electron temperature range (up to ~14,000 K) associated with our TA experiments yields FIG. 10F; the fluence dependent electron temperature is shown in FIGS. 10R-10U. The one order of magnitude higher electron temperature reached in ITO-NRA, compared to the gold nanorod counterpart pumped at a similar fluence, is due to a much smaller electron heat capacity, which further results from ITO's low electron concentration in comparison to gold. We note that the magnitude of the theoretical $\Delta\in'(\omega)$ is within a factor of ~1.5 of the experimental $\Delta\in'(\omega)$ shown in FIG. 10C. In addition, FIG. 10F shows that at high pump fluences, $\Delta\in'(\omega)$ peaks at the photon energy that corresponds to optical transition with an electron excited to the conduction band minimum; this $\Delta\in'(\omega)$ line-shape is qualitatively consistent with behaviour of the experimental $\Delta\in'(\omega)$ shown in FIG. 10C. Furthermore, Supplementary FIG. 10N shows that for optical transitions associated with excited electrons lying between the Fermi energy and the conduction band minimum, $\Delta\in''(\omega)$ has positive values, indicating that rising of the electron temperature will cause a stronger optical absorption; this is in concert with FIG. 9C which shows diminished amplitudes of transmission minima $\lambda_5$, $\lambda_4$, and $\lambda_3$ on the high energy side (FIG. 9D shows positive $\Delta\in''(\omega)$ leads to less pronounced transmission minima). Below the absorption threshold energy (which is the energy difference between the conduction band minimum and the valence band maximum), $\Delta\in''(\omega)$ stays zero due to the existence of the band gap, and hence the optical absorption should be unchanged; this is consistent with the nearly unchanged amplitudes of the transmission minima $\lambda_1$ and $\lambda_2$ on the low energy side. We note that the disagreement between the experimental $\Delta\in'(\omega)$ shown in FIG. 10C and the theoretical $\Delta\in'(\omega)$ shown in FIG. 10F at high electron temperatures may arise from: 1) the implicit assumption that the entire ITO nanorod volume has a uniform electron temperature (as $\Delta\in'(\omega)$ was considered as a constant within the nanorod); 2) the non-ideality (and smearing) of the absorption around the absorption onset energy in comparison to the theoretical model (evident from FIG. 10O), possibly arising from broadening of states and defect states; and 3) a breakdown of the constant matrix element approximation arising from the wide energy range considered in the theoretical model. However, further modelling was not attempted because the possible occupation of higher energy bands (above the considered conduction band) or other regions of the momentum space by the hot electrons at very high temperatures. In fact, the modelling difficulty originates from the complicated doping dependent dispersion diagram, and more importantly, a far lower electron concentration in ITO-NRA, which leads to a much wider range of energies that are being accessed; this is in sharp contrast to the noble metal case, where the assumption of a constant matrix element is more valid due to the lower electron temperatures reached.

The Microsecond Component

Figures 11A, 11B, 11C, 11D:
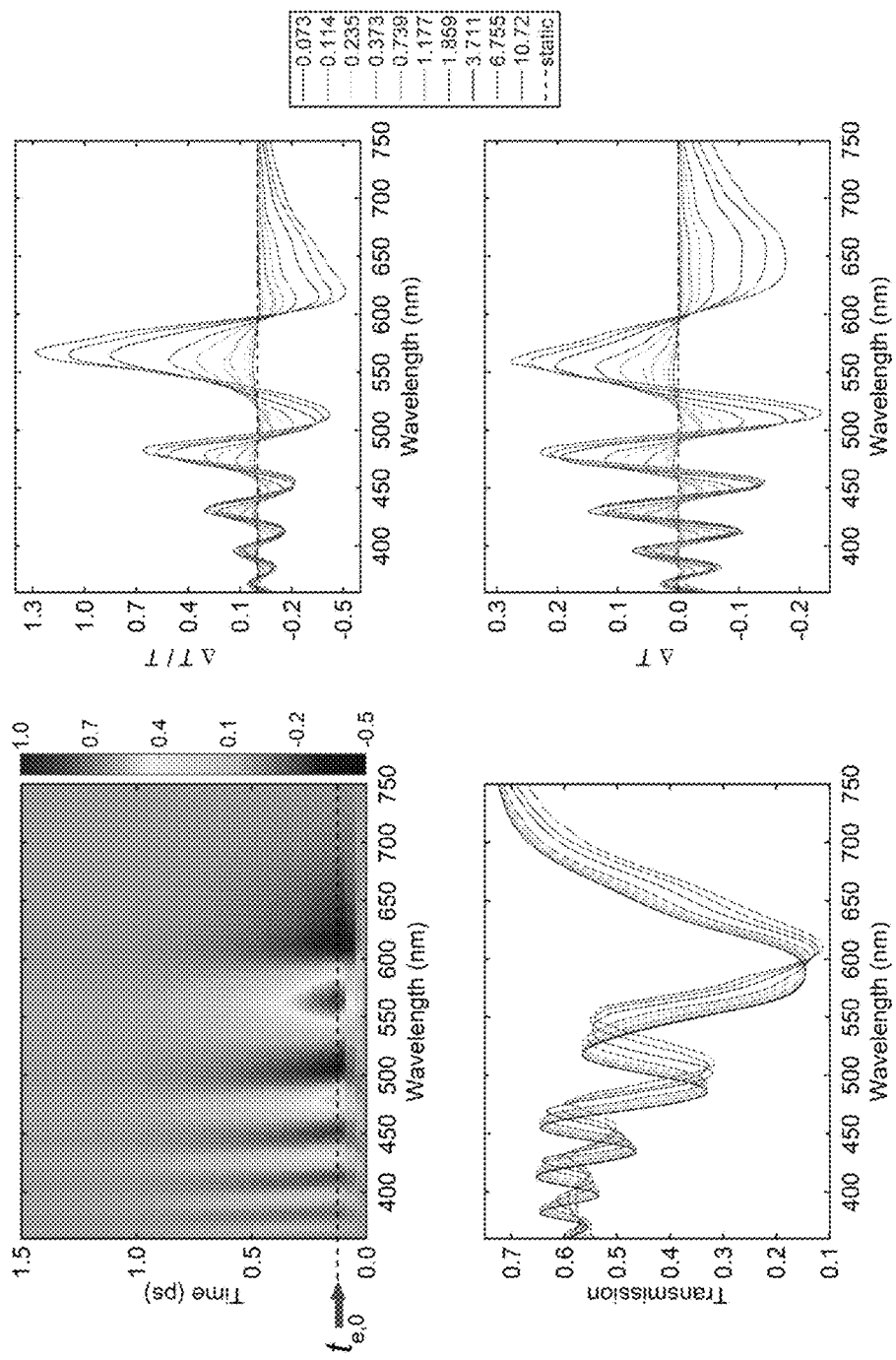
FIG. 11A shows a $\Delta T(t)/T(0)$ spectral map for the first 3 $\mu$s under a pump fluence of 26.3 mJ/cm$^{-2}$. Purple arrow & black dashed line indicate $t_{1,0}$, which is the beginning of the slow component (corresponding to 850 ps delay time).
FIG. 11B shows fluence dependent $\Delta T(t)/T(0)$ spectra at $t_{1,0}$. Legend has a unit of mJ/cm$^{-2}$ and applies to panel FIGS. 11B-11D.
FIG. 11C shows fluence dependent $T(t)$ spectra at $t_{1,0}$.
FIG. 11D shows fluence dependent $\Delta T(t)$ spectra at $t_{1,0}$.
Figure 11E:
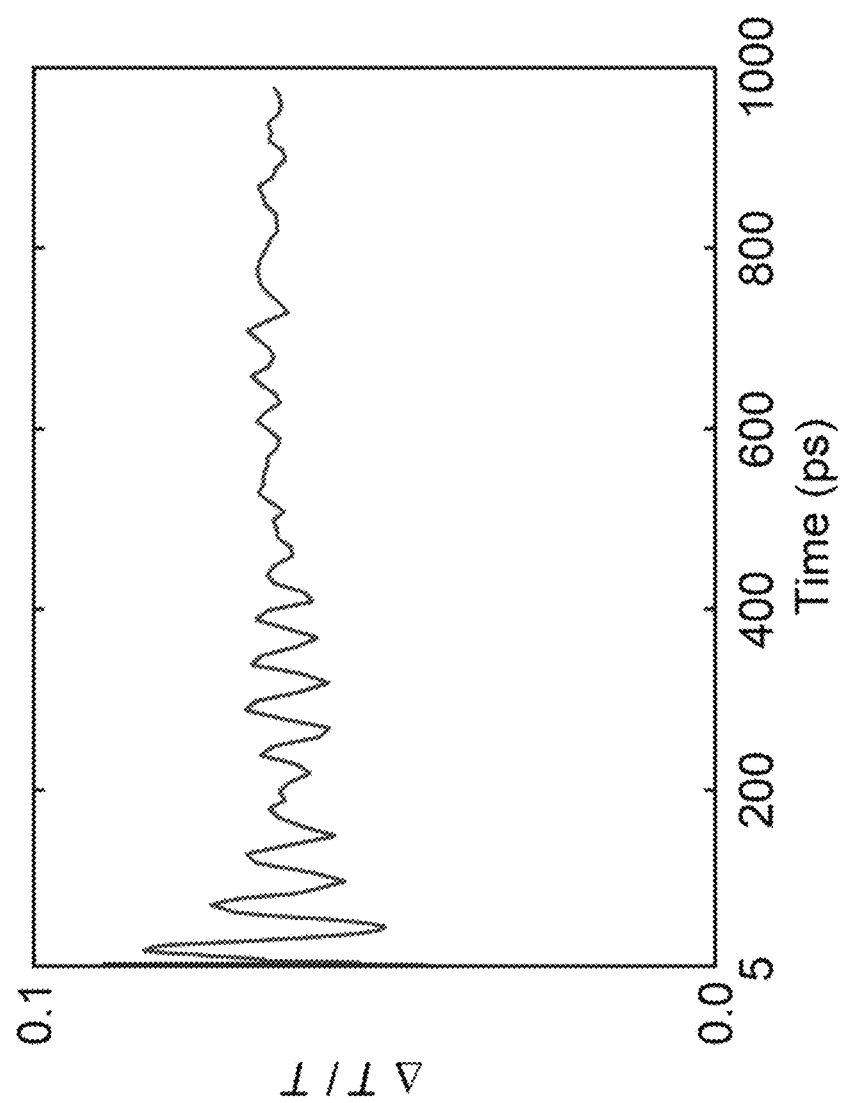
FIG. 11E shows a $\Delta T(t)/T(0)$ spectrum of the ITO-NRA at 475 nm due to the excitation of acoustic vibrations.
Figure 12A:
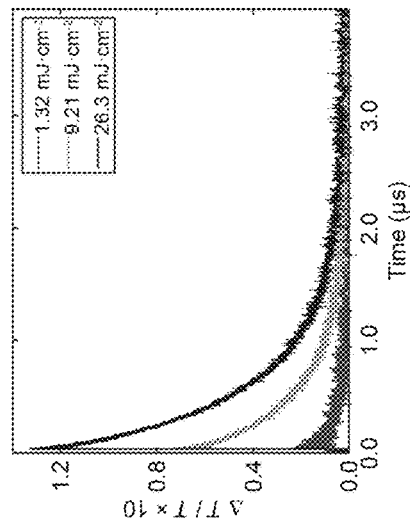
FIG. 12A shows $\Delta\epsilon'(\omega)$ at $t_{1,0}$ (beginning of the slow component) deduced from experimental data. Legend has a unit of mJ/cm$^{-2}$.

We now discuss the slow component of $\Delta T(t)/T(0)$. FIG. 11A shows a $\Delta T(t)/T(0)$ spectral map acquired from the long-delay-TA experiments; note that now the delay time is up to 3 µs. The $\Delta T(t)/T(0)$, T(t) and $\Delta T(t)$ spectra at $t_{1,0}$ (defined as 850 ps delay time) acquired from the short-delay-TA experiments are shown in FIG. 11B-11D, respectively. This 850-ps delay time can be taken as the beginning of the microsecond decay, when all the absorbed pump energy still resides in the lattice. The reason for presenting the transient spectra at 850 ps rather than earlier delay times after the fast component fully decays (in about a picosecond), is due to the excitation of coherent acoustic vibrations that give an additional contribution to the $\Delta T(t)/T(0)$ spectra during the first ~800 ps (which is approximately equal to the dephasing time of the coherent vibrations), as shown in FIG. 11E. Also, note that the transient spectra at 850 ps were acquired from the short-delay-TA experiments, as the long-delay-TA experiments have poorer temporal resolution (~100 ps) and lower signal to noise ratio than the short-delay-TA experiments. The amplitude of $\Delta T(t)/T(0)$ for the slow component analogue shown in FIG. 11B is about one order of magnitude smaller than the fast component presented in FIG. 9B. This is correlated with a much smaller shift of the transmission spectra and absolute change of transmission which are shown in FIGS. 11C-11D, respectively. The fluence dependent $\Delta\in'(\omega)$ at $t_{1,0}$ shown in FIG. 12A, which is obtained using the experimental approach (as was used for estimating $\Delta\in'(\omega)$ for the fast component shown in FIG. 9C), is found to peak at the shortest wavelength and fall off quickly at longer wavelengths for all pump fluences. The fall-off of $\Delta\in'(\omega)$ at long wavelength arises because at $t_{1,0}$ the electron gas is in thermal equilibrium with the lattice; hence the reduction of the plasma frequency caused by the hot electron gas is negligible (as is evident from the small lattice temperature rise in comparison to the large electron temperature rise shown in FIGS. 10R-10U). In fact comparison of FIG. 9B and FIG. 11B reveals that the amplitude of $\Delta T(t)/T(0)$ at $t_{e,0}$ has a larger spectral weight at longer wavelengths compared to that at $t_{1,0}$ (this is also observed in measurements on other ITO-NRA samples, as shown in FIGS. 15A-15F). The peak-at-shortest-wavelength at $t_{1,0}$ is likely due to a low electron temperature rise, therefore electron occupation far from the Fermi energy is largely unchanged and $\Delta\in''(\omega)$ is expected to be confined to a narrow spectral range around the Fermi energy is expected (as shown in FIG. 8c at the low electron temperature range); correspondingly, $\Delta\varepsilon'(\omega)$ peaks at higher energy, similar to the behaviour of $\Delta\varepsilon'(\omega)$ observed at lower pump fluences for the fast component. We note that various thermal effects, including a possible decrease of band gap with an increased lattice temperature, together with elastic response (such as thermal expansion) of ITO can contribute to $\Delta\varepsilon'(\omega)$ of the slow component; therefore further theoretical modelling was not attempted due to the poorly understood temperature dependent band structure and strain dependence of the permittivity that is outside the scope of the current study.

Figure 12B:
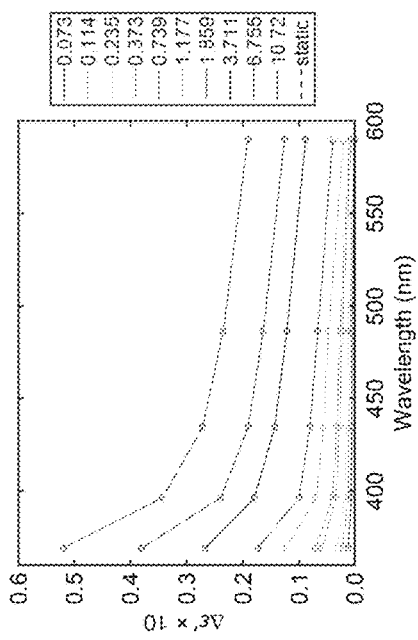
FIG. 12B shows fluence dependent decay of $\Delta T(t)/T(0)$ at 560 nm plotted for delay times up to 4 $\mu$s measured in long-delay-TA experiments.
Figure 12C:
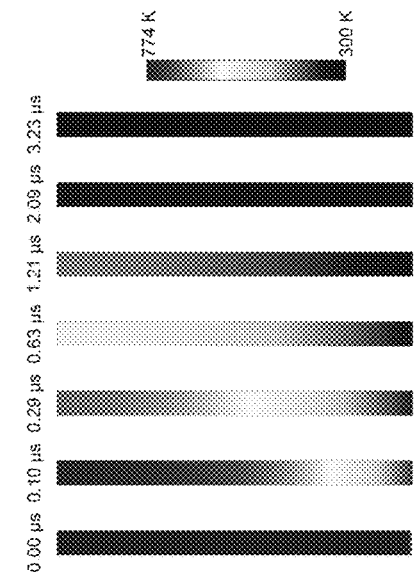
FIG. 12C shows simulated decay of lattice temperature averaged over the entire nanorod volume corresponding to the experimental pump fluences.
Figure 12D:
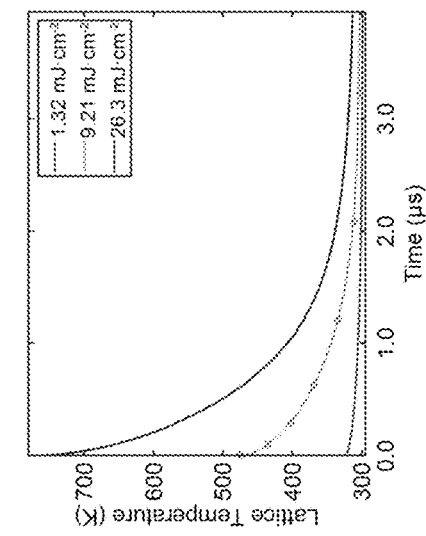
FIG. 12D shows snapshots of the temperature profiles (at the plane cutting through the center of the nanorod) at different delay times indicated by the green circles in FIG. 12C under a pump fluence of 9.21 mJ/cm$^{-2}$.
Figure 12F:
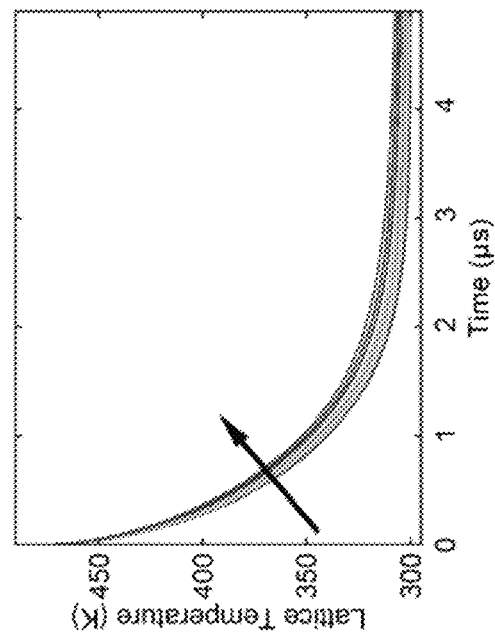
FIG. 12F shows temporal decay of $(\int T_L dV)/V$ (lattice temperature averaged over the nanorod volume) with a uniform initial temperature of 474° C. Height is fixed at 2600 nm. Arrow indicates increasing the edge length from 120 nm to 260 nm with a step size of 20 nm.
Figure 12E:
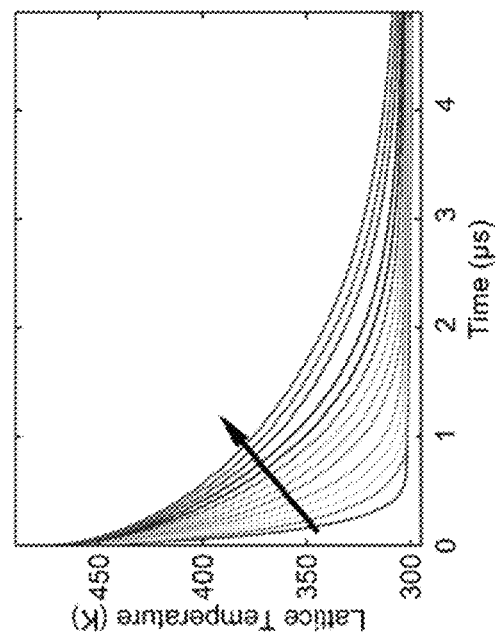
FIG. 12E shows temporal decay of $(\int T_L dV)/V$ (lattice temperature averaged over the nanorod volume) with a uniform initial temperature of 474° C. Edge length is fixed at 180 nm. Arrow indicates increasing the nanorod height from 1 $\mu$m to 3.6 $\mu$m with a step size of 200 nm.

The microsecond decay time of the slow component (best illustrated by FIG. 12B that shows the $\Delta T(t)/T(0)$ kinetics at 560 nm) is far slower than the few-hundred-picosecond decay time observed in solution-based or substrate-supported plasmonic structures of noble metals. This unusually long decay time can be attributed to a lower thermal conductivity of ITO in comparison to noble metals (FIG. 10R-10U), and a small contact area with the surrounding medium (YSZ substrate in the present study) for heat dissipation (owing to the large aspect-ratio). To get a quantitative understanding of the slow decay we performed heat-transfer simulations, in which we assumed a uniform, initial lattice temperature rise of the ITO nanorod. This assumption is valid because the Fermi velocity of the electron gas in ITO is initially greater than its room temperature value on the order of $\sim 1\times10^6$ m·s$^{-1}$ (estimated from $[\mu(300\ K)/m]^{1/2}$ with m=0.263 $m_e$ and $\mu(300\ K)\cong 1.2$ eV where $m_e$ is the free electron mass); therefore during the first 1 ps (fast component) the electron gas can travel a distance on the order of the length of the nanorods. Details of the lattice temperature rise calculation and heat-transfer simulation can be found below (also see FIGS. 12E-12F). FIG. 12C presents the simulated average lattice temperature versus the decay time; note that the temporal characteristics are in good quantitative agreement with the experimental $\Delta T(t)/T(0)$ decay shown in FIG. 12B. In FIG. 12D we further present the simulated temperature profiles of the nanorod at different delay times. We note that soon after the initial response, the temperature appears to be monotonically decreasing from the top to the bottom of the nanorod, indicating that the length of the nanorod acts as a bottleneck for heat dissipation. It is expected that the kinetics of the lattice temperature induced changes in $\Delta T(t)/T(0)$ can potentially be used to indirectly deduce the thermal conductivity of other uniform one-dimensional nanostructures.

Spectral Tunability and Beam-Steering Capability

Figures 13E, 13F:
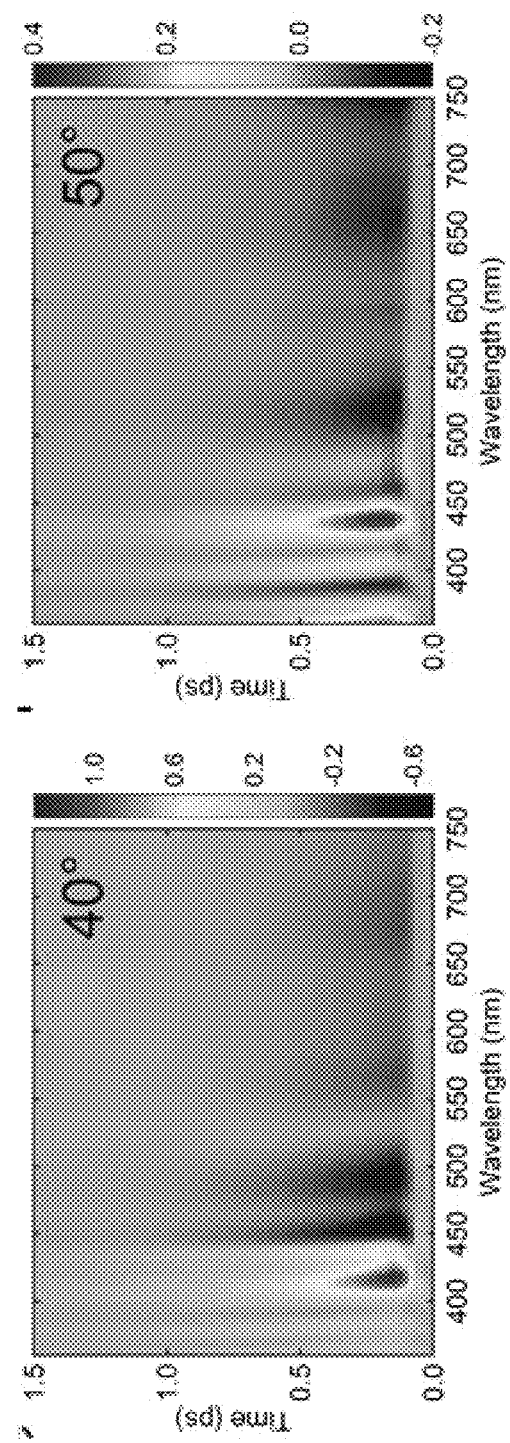
FIG. 13E shows $\Delta T(t)/T(0)$ spectral maps measured at 40° plotted for delay times up to 1.5 ps. Measurement was performed for the (0, 0) order, and the pump fluence was 3.71$\times\cos\theta_{inc}$ mJ·cm$^{-2}$, where $\theta_{inc}$ is the incidence angle.
FIG. 13F shows $\Delta T(t)/T(0)$ spectral maps measured at 50° plotted for delay times up to 1.5 ps. Measurement was performed for the (0, 0) order, and the pump fluence was 3.71$\times\cos\theta_{inc}$ mJ·cm$^{-2}$, where $\theta_{inc}$ is the incidence angle.

FIG. 13A-13F summarizes the static and transient spectral response of the ITO-NRA under different incidence angles. Notably, FIG. 13A shows that increasing the incidence angle leads to a redshift of the static transmission spectrum, and at high angles the transmission minima become less pronounced. This angular dependent spectral feature can be qualitatively explained by a modified version of equation (1), $\lambda_m \cdot \cos\theta_{inc}=2h(n_{eff}-1)/(2m-1)$ where $\theta_{inc}$ is the incidence angle. Here the effective wavelength of light along the length of the nanorod is altered by a factor of $\cos\theta_{inc}$, hence the transmission minima at oblique incidence angles are expected to occur at longer wavelengths compared to the normal incidence case. This static trend is consistent with the angular dependent $\Delta T(t)/T(0)$ spectral maps (shown in FIGS. 13B-13F); specifically, under a given incidence angle the spectral line-shape and amplitude of each $\Delta T(t)/T(0)$ spectral map are dictated by the redshift of the corresponding static transmission spectrum.

In addition to the measurements on the (0, 0) order, we performed additional short-delay-TA experiments to analyse one of the four equivalent (1, 0) and (1, 1) diffraction spots. Examination of the spectral maps for the higher diffraction orders (FIGS. 14B and 14C) and that of the zero order (FIG. 14A) reveals that the higher-order $\Delta T(t)/T(0)$ signals have opposite signs in comparison to the zero order. This indicates that the ITO-NRA dynamically redistributes the light intensity among different grating orders following the pump excitation, and further suggests that ITO (and possibly other TCO materials) can be utilized in the design of active optical components, such as a dielectric metasurface, to realize the control of intensity, phase and polarization, and with it the holographic response of light in the visible range.

Figure 15A:
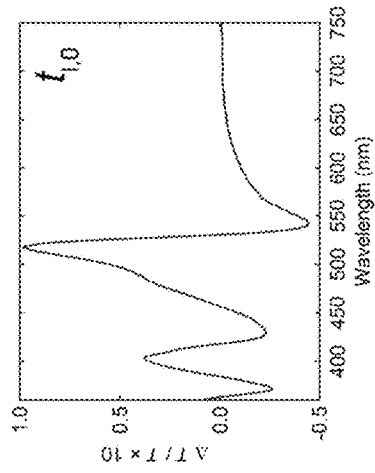
Figure 15B:
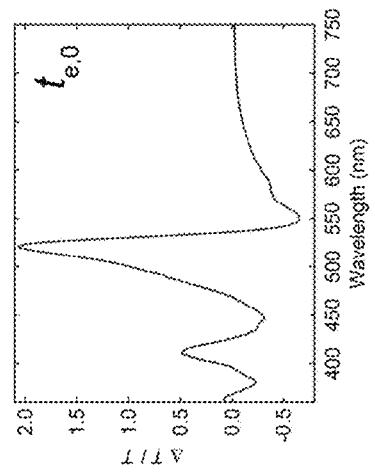
Figure 15C:
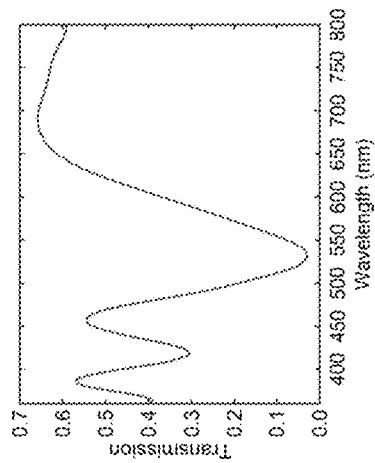
Figure 15D:
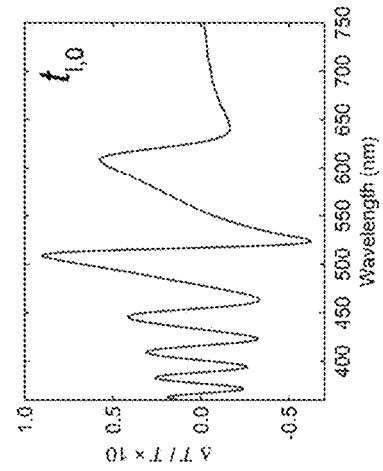
Figure 15E:
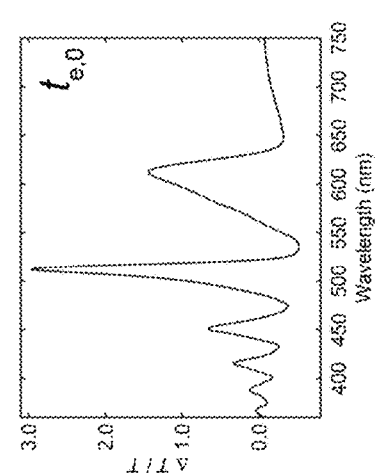
Figure 15F:
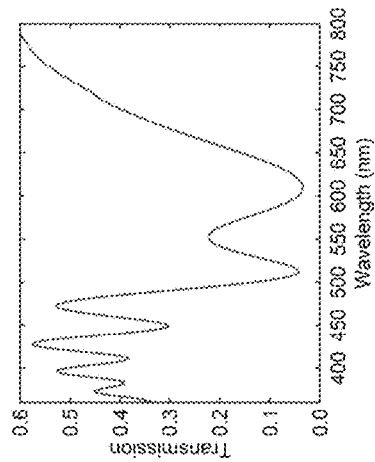
Figure 15J:
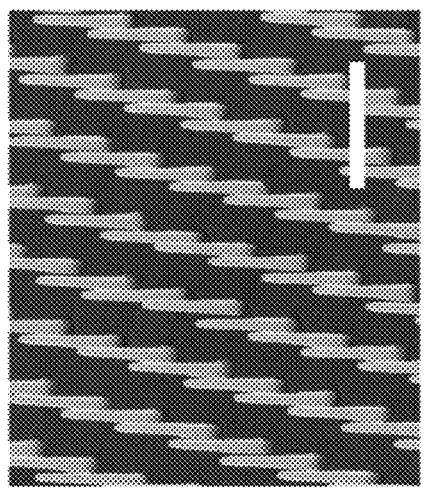
Figure 15K:
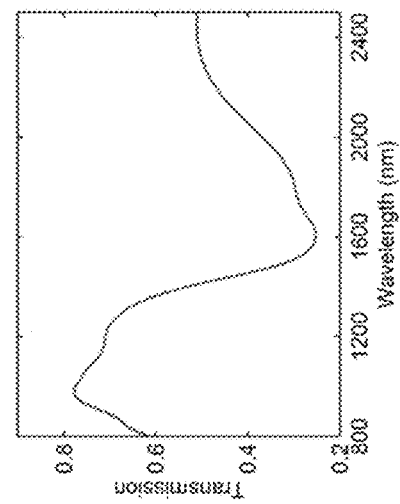
Figure 15G:
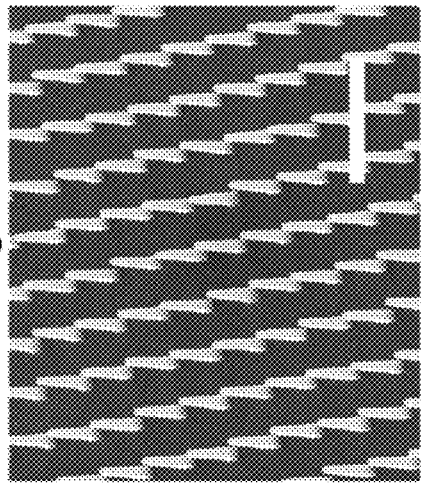
Figure 15H:
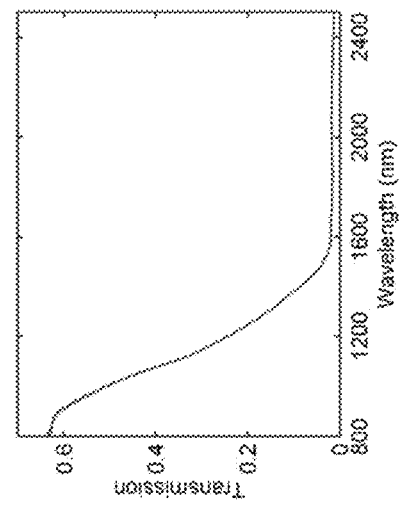

To further demonstrate the spectral tunability achievable by adjusting the geometric parameters, we performed static and short-delay-TA experiments on two additional ITO-NRAs with nanorod heights of 1.4 µm and 2.9 µm, respectively (the SEM images, NIR transmission spectra and visible $\Delta T(t)/T(0)$ spectral maps for these two ITO-NRA samples are presented in FIGS. 15A-15B). The static transmission spectra of these two samples, depicted in FIGS. 15A and 15D, show that increasing the nanorod height can produce a larger number of transmission minima and redshift the first transmission minimum wavelength ($\lambda_1$); these are consistent with equation (1) that relates the transmission minima wavelengths to the height of the nanorod. The transient spectra at $t_{e,0}$ (shown in FIGS. 15B and 15E) and $t_{1,0}$ (shown in FIGS. 15C and 15F) for these two samples again arise from redshifts of the corresponding static transmission spectrum, consistent with the earlier discussions.

Sample Fabrication

Briefly, an epitaxial ITO film of 10 nm thickness was deposited on YSZ (001) substrate using magnetron sputtering at 600° C., 5 mTorr under 20 sccm Ar gas flow. A 70 nm thick GL-2000 electron beam resist (Gluon Labs) was then spin coated on the substrate, followed by exposure of an array of 150 nm dots with designed pitch sizes (JEOL JBX-9300FS electron beam lithography system). The exposed sample was developed in Xylenes at room temperature for 60 seconds, and then rinsed by IPA. 2 nm Cr and 15 nm Au was thermally evaporated on the sample, which was subsequently lifted off in Anisole at 75° C. for 1 hour. The nanorod growth was performed at a customized tube furnace system.

Steady State Measurements

Transmission spectra in the near-infrared range were measured with FTIR (Thermo Nicolet 6700). A pair of ZnSe lenses were used to focus the light down to a 1-mm-diameter spot. Transmission spectra in the visible range were measured with an UV/Vis/NIR spectrophotometer (Perkin Elmer Lambda 1050).

Transient Absorption Measurements

Transient absorption experiments with delay times up to 1000 ps were performed using a 35 fs amplified titanium:sapphire laser operating at 800 nm at a 2 kHz repetition rate. Pump pulses at 1500 nm were generated via a white light seeded optical parametric amplifier and were reduced in repetition rate to 1 kHz. Broadband probe pulses were generated by focusing a portion of the amplifier output into a $CaF_2$ window (2 mm thick). The probe pulses were mechanically time-delayed using a translation stage and retroreflector. The pump spot diameter on the sample was 396 µm. Full spectral maps for the (0,0) order appear in FIG. 16A-16I. Representative $\Delta OD(t)$ and $T(t)$ spectral maps appear in FIGS. 16J-16K. An optical fiber was used for measurements of the (1, 0) and (1, 1) diffraction orders. Due to the large spatial footprints, only narrow spectral windows, shown in FIGS. 14B-14C, were collected for these higher orders.

Longer time-delay transient absorption measurements were performed with ~100 ps time resolution using a 100 fs pump pulse and an electronically delayed white light probe pulse. The probe pulse is generated via self-phase modulation of a Nd:YAG laser in a photonic crystal fiber. Instabilities in the probe pulse were compensated by monitoring a beam-split portion of the pulse in a separate detector. Signal to noise ratios achieved with this system are notably lower than that those obtained for the higher time-resolution transient absorption system, primarily owing to the lower probe pulse-to-pulse stability. The pump spot diameter on the sample is 220 μm. Full spectral maps for the (0,0) order appear in FIGS. 16L-16M.

Finite-Element Simulations

The optical simulation and waveguide simulation were performed with the Wave Optics module of COMSOL Multiphysics. The optical simulation was full three-dimensional simulation in which periodic boundary conditions were applied along the in-plane directions; transmission and reflection of the ITO-NRA can be obtained. The waveguide simulation was a two-dimensional simulation, in which a eigenmode analysis was performed on the cross section of ITO nanorod for calculating the effective mode index. The heat-transfer simulation was enabled by the heat-transfer module of COMSOL Multiphysics. More details about optical, waveguide and heat-transfer simulations appear below.

Calculation of the Grating Order Intensities

The electromagnetic waves scattered by a periodic phased array can be decomposed into orthogonal eigenmodes, which are essentially the grating orders including both propagating and evanescent ones. Since the nanorod spacing of 1 μm is comparable to the wavelength in the visible range, higher order propagating modes (besides the zero order mode) can be produced. To extract intensities of these higher order modes from optical simulations, we decomposed the transmitted electric fields according to the procedures shown by J. Jin et al. Briefly, a two dimensional Fourier transform was performed on the electric field at the bottom boundary of the YSZ interface (the array being in the x-y plane and the bottom boundary is at $z=z_0$), $$E(x, y, z_0) = \sum_{n=-\infty}^{+\infty} \sum_{m=-\infty}^{+\infty} E_{nm}(z_0)\exp(-i(k_{xn}x + k_{ym}y)),$$

where the coefficients $$E_{nm}(z_0) = \frac{1}{S}\int\int E(x, y, z_0)\exp(i(k_{xn}x + k_{ym}y))$$

are the electric field intensities for the (n, m) order. $S=a^2$ is the cross-sectional area of a unit cell, $k_{xn}=k_{x0}-2\pi n/a$ and $k_{ym}=k_{y0}-2\pi m/a$. Here $k_{x0}=k_0\cdot\sin\theta\cdot\cos\varphi$, $k_{y0}=k_0\cdot\sin\theta\cdot\sin\varphi$, $k_0=2\pi/\lambda$ is the incident wave vector, $\theta=0$ is the incident angle and $\varphi=0$ is the azimuthal angle (the incident wave vector is normal to the substrate). The wave vector in the z direction is $k_{znm}=(k_0^2-k_{xn}^2-k_{ym}^2)^{1/2}$; a mode is propagating when $k_{znm}$ is real and evanescent when $k_{znm}$ is imaginary. Transmission of the (n, m) grating order is calculated as $$T_{nm} = \frac{|E_{nm}(z_0)|^2}{|E_{inc}|^2},$$

where $E_{inc}$ is the electric field of the incident wave. The (1, 0) and (1, 1) orders are illustrated in the photograph of FIG. 8G.

To further verify that the wave propagating along the nanorod follows the fundamental $HE_{11}$ mode, we plot in FIGS. 8B-8F the distributions of the electric field intensity averaged along the length of the nanorod at the wavelengths of the five transmission minima, which are similar to those reported for the $HE_{11}$ mode elsewhere, thereby justifying our use of the effective mode index for the estimation of the spectral locations of the transmission minima.

Permittivity of ITO

The static transmission spectrum of the ITO-NRA from 360 nm to 710 nm was fitted using the Drude-Lorentz model, $\epsilon(\omega)=\epsilon_\infty+A_L/(\omega_L^2-\omega^2-i\gamma_L\omega)-\omega_p^2/(\omega^2+i\gamma_p\omega)$. Parameters that yield a good match between the simulated and the experimental transmission spectra are $\epsilon_\infty=3.95$, $A_L=(1.4\text{ eV})^2$, $\omega_L=3.8$ eV, $\gamma_L=0.01$ eV, $\omega_p=2.18$ eV, and $\gamma_p=0.12$ eV. The Drude-Lorentz model was adopted simply to provide reasonable wavelength dependent permittivity for the subsequent waveguide simulations, from which the effective mode index $n_{eff}(\omega)$ can be obtained. The single Lorentz pole is not expected to accurately describe the permittivity of ITO in the ultraviolet range (below 360 nm). In addition, the value of $\omega_p=2.18$ eV obtained by fitting the visible spectrum is slightly larger than $\omega_p=2.02$ eV obtained by fitting the NIR spectrum using a pure Drude model described previously; in this work $\omega_p=2.02$ eV was used for the calculation of the fluence dependent electron distribution. The relative permittivity of ITO in the visible (with the Drude-Lorentz model) and near-infrared range (with the Drude model) are plotted in FIGS. 8M-8P.

The transmission spectrum of a bare YSZ substrate shown in FIG. 8Q reveals that although the substrate becomes slightly absorptive at wavelengths below 400 nm, its transmission is almost constant from 360 nm to 710 nm. As a result, in the optical simulations we treated the substrate as a lossless dielectric with a constant refractive index of 2.2. In FIG. 8R we plot the simulated transmission spectrum of the array, which compares well with the experimental counterpart. The edge length, height and periodicity are 180 nm, 2.6 μm and 1 μm, respectively.

Transmission and Reflection of the ITO-NRAs Measured Using an Integrating Sphere FIGS. 8S-8V shows the total transmission and reflection spectra in the visible range for the three ITO-NRA samples investigated in this work measured using an integrating sphere to capture the intensities of the higher diffraction orders. Absorption was deduced by subtracting the total transmission and reflection from unity. In this case the transmission minima are significantly diminished, confirming that the spectral features in the visible range are not due to enhanced absorption, as observed for semiconducting nanowires.

Theoretical Modelling of the Permittivity Change of the ITO-NRAs

We first generalize the calculation of the imaginary part of the relative permittivity to cover the case of direct interband optical transition in a semiconductor with a non-parabolic conduction band (CB) and a parabolic valence band (VB). The dispersion relations are $\hbar^2k^2/2m_v=E_v$ for holes in the VB, and $\hbar^2k^2/2m_c=E_c+CE_c^2$ for electrons in the CB; here $E_v$ is the hole energy referenced to the valence band maximum (VBM), $E_c$ is the electron energy referenced to the conduction band minimum (CBM), $m_v$ is the hole effective mass, $m_c$ is the electron effective mass (at CBM), and c is the non-parabolicity of the CB. Both $E_c$ and $E_v$ are taken as positive.

Figure 8W:
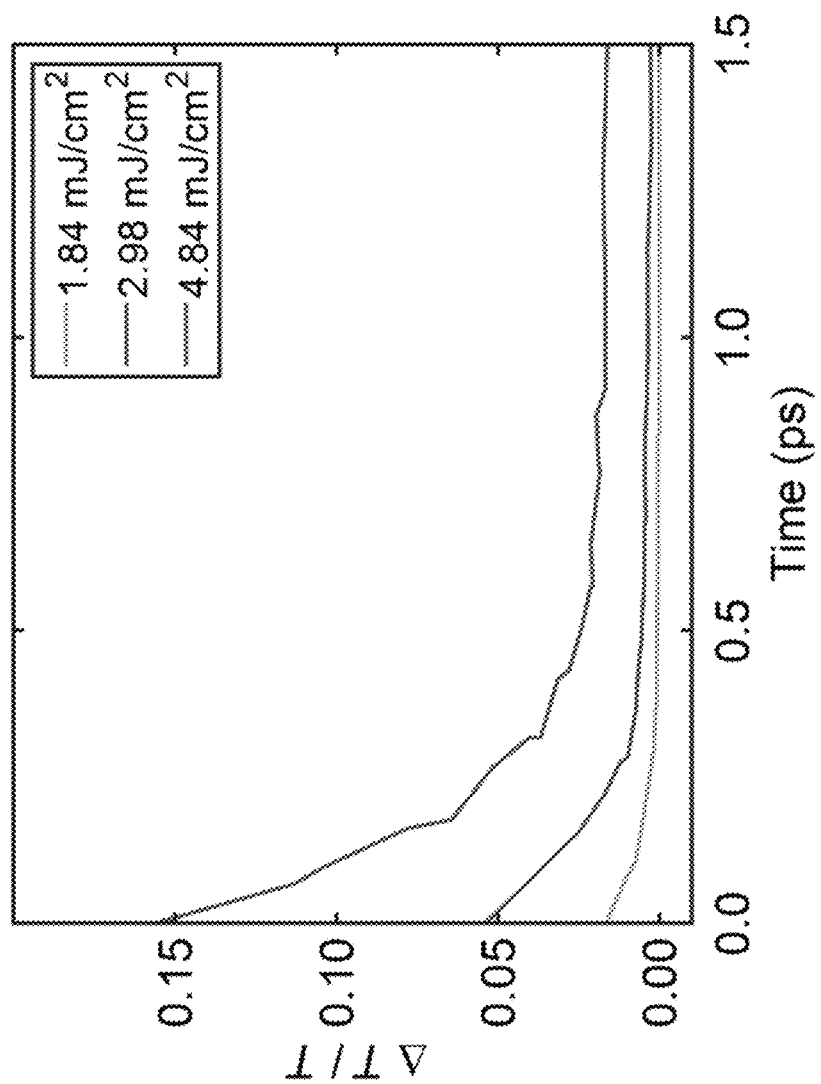
FIG. 8W shows $\Delta T(t)/T(0)$ kinetics of the ITO-NRA at 568 nm. The sample is pumped at 800 nm.

FIG. 8W shows the schematic diagram of the considered optical transition and various quantities defined. We denote $R=m_c/m_v$, and $1/m_r=1/m_v+1/m_c$, where $m_r$ is the reduced effective mass. When an incident photon with energy $\hbar\omega$ is absorbed in a direct, interband optical transition, energy conservation dictates that $$\hbar\omega = E_g + E_c + E_v \qquad (1).$$

If we let $k^2=2m_c(E_c+CE_c^2)/\hbar^2$, equation (1) becomes $\hbar\omega=E_g+E_c+R(E_c+CE_c^2)$. This is a quadratic equation in $E_c$ and can be rewritten as $RCE_c^2+(R+1)E_c+(E_g-\hbar\omega)=0$, with the solution $$E_c = \frac{-(R+1) + \sqrt{(R+1)^2 - 4RC(E_g - \hbar\omega)}}{2RC}. \qquad (2)$$

The derivative of $E_c$ with respective to the photon energy $\hbar\omega$ is given by $$\frac{d(E_c)}{d(\hbar\omega)} = \frac{1}{\sqrt{(R+1)^2 - 4RC(E_g - \hbar\omega)}}. \qquad (3)$$

The density-of-states (DOS) for electrons at $E_c$ is $$\rho(E_c) = \frac{\sqrt{2m_c(E_c + CE_c^2)}}{\pi^2\hbar^3} m_c(1+2CE_c),$$

or equivalently, $$\rho(E_c) = \frac{1}{2\pi^2}\left(\frac{2m_c}{\hbar^2}\right)^{\frac{3}{2}} (E_c)^{\frac{1}{2}} (1+CE_c)^{\frac{1}{2}} (1+2CE_c). \qquad (4)$$

Using $\rho(\hbar\omega)d(\hbar\omega)=\rho(E_c)d(E_c)$, where $\rho(\hbar\omega)$ is the joint-density-of-states (JDOS) for optical transition with photon energy $\hbar\omega$, we get $\rho(\hbar\omega)=[d(E_c)/d(\hbar\omega)]\cdot\rho(E_c)$, which can be calculated numerically using equation (3) and (4). The absorption coefficient $\alpha(\omega)$ arising from the considered transition can be written as $$\alpha(\omega) = \frac{\pi e^2 \hbar}{n'(\omega)\varepsilon_0 c m_0^2} \frac{1}{\hbar\omega} M^2 \rho(\hbar\omega)[f(E_v) - f(E_c)],$$

where n'($\omega$) is the real part of the refractive index and M is the electric dipole matrix element[10].

For the highly doped materials considered here, $f(E_v)=1$, hence $$\alpha(\omega) = \frac{\pi e^2 \hbar}{n'(\omega)\varepsilon_0 c m_0^2} \frac{1}{\hbar\omega} M^2 \rho(\hbar\omega)[1 - f(E_c)]. \qquad (5)$$

Since $\alpha(\omega)=2\omega n''(\omega)/c$, we can write $$\varepsilon''(\omega) = 2n'(\omega)n''(\omega) = \frac{cn'(\omega)\alpha(\omega)}{\omega}, \qquad (6)$$

where n''($\omega$) is the imaginary part of the refractive index. Combining equation (5) and (6) gives $$\varepsilon''(\omega) = \frac{\pi e^2}{\varepsilon_0 m_0^2 \omega^2} M^2 \rho(\hbar\omega)[1 - f(E_c)], \qquad (7)$$

which is a dimensionless quantity. Now the intraband optical pumping in our study gives rise to a redistribution of the electrons in the conduction band, whose temperature T can be calculated based on our earlier study. As the Fermi function term $f(E_c)$ in equation (7) is electron temperature dependent, a temperature dependent $\varepsilon''(\omega)$ can be calculated from $$\Delta\varepsilon''(\omega, T) = -\frac{\pi e^2}{\varepsilon_0 m_0^2 \omega^2} M^2 \rho(\hbar\omega)\Delta f(E_c, T),$$

where $\Delta\varepsilon''(\omega,T)=\varepsilon''(\omega,T)-\varepsilon''(\omega,T_0)$ and $\Delta f(E_c,T)=f(E_c,T)-f(E_c,T_0)$ with $T_0=300K$ corresponding to the static case. Knowing $\Delta\varepsilon''(\omega, T)$ we can further obtain $\Delta\varepsilon'(\omega, T)$ using the Kramers-Kronig relation, $$\Delta\varepsilon'(\omega, T) = \frac{2}{\pi} P \int_0^\infty d\omega_0 \frac{\omega_0 \Delta\varepsilon''(\omega_0, T)}{\omega_0^2 - \omega^2}.$$

The procedure described above was used as a model to theoretically calculate the change of real part of the relative permittivity (shown in FIG. 10F) due to the modification of the interband transition under intraband optical pumping, which is the case of the fast component in our TA experiments. FIG. 10H-10K presents the calculated $f(E_c, T)$, $\Delta f(E_c, T)$, $E_c(\hbar\omega)$, and $\Delta f(\hbar\omega, T)$ for electron temperature ranging from 300 K to 14,500 K. The $\Delta f(\hbar\omega, T)$ was introduced in FIG. 10K to better illustrate the connection between $\Delta f(E_c, T)$ and $\Delta\varepsilon''(\omega, T)$. Note that at high electron temperatures (>10,500 K), the electron chemical potential μ falls below the CBM, which is a result of conservation of the electron density.

Figure 10O:
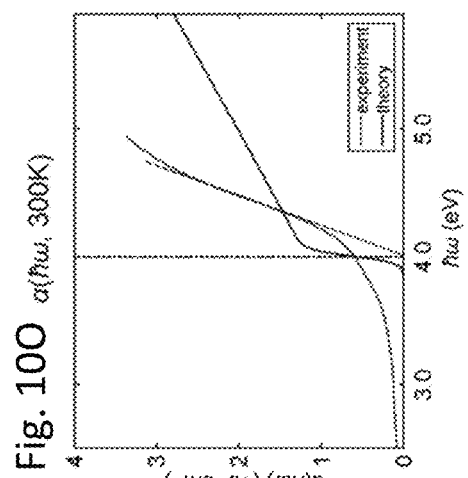
Figure 10N:
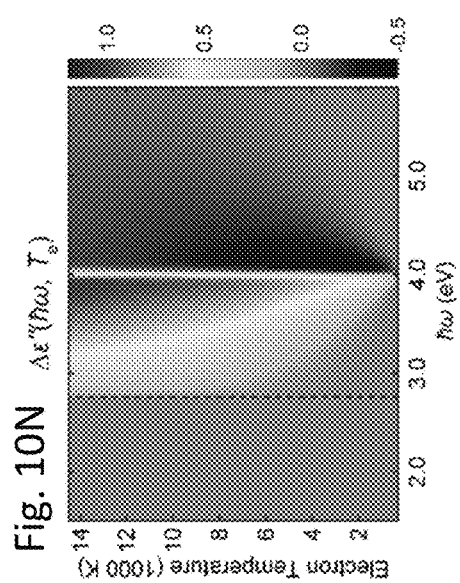
Figure 10Q:
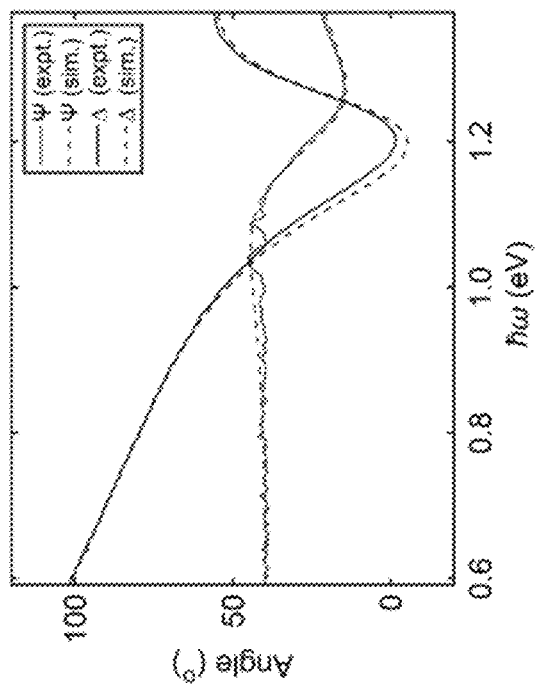
FIG. 10Q shows experimental and simulated $\Psi$ and $\Delta$ angles for the ITO film in the NIR range; the data fitting assumed a Drude permittivity with $\epsilon_\infty=3.90$, $\omega_p=2.10$ eV, and $\gamma_p=0.065$ eV.
Figure 10P:
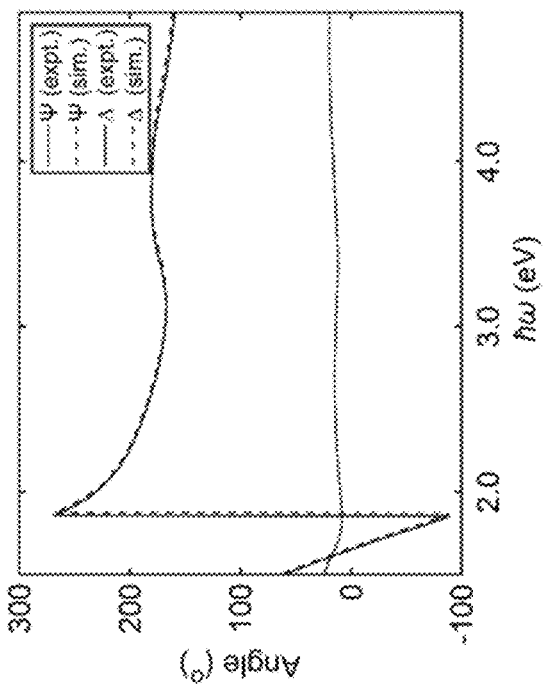

FIG. 10L-10O shows the results for $\rho(\hbar\omega)$, $\rho(\hbar\omega)\cdot\Delta f(\hbar\omega)$, $\Delta\varepsilon''(\omega, T)$, as well as the experimentally determined $\alpha(\omega)$ and theoretically calculated $\alpha(\omega)$ on the basis of a constant matrix element of $(2.8\times10^{-49}$ J·kg$)^{1/2}$. Note that various assumptions and simplifications were made for the theoretical calculations: 1) an experimental value of the effective mass for holes has not been reported. Density-functional-theory results all predict a much flatter VB compared to the CB, hence we assumed a flat VB; 2) the dispersion of the non-parabolic CB is governed by $m_c=0.263$ $m_0$ and $C=0.4191$ eV$^{-1}$; 3) the band gap is determined by subtracting the theoretically calculated electron Fermi energy referenced to CBM (~1.24 eV) from the experimentally measured absorption onset energy for an epitaxial ITO film sputtered on YSZ (~4.0 eV as shown in FIG. 10O). As it was not possible to get reliable absorption versus wavelength data for the ITO-NRA (arising from the scattering as well as absorption due to the substrate, which is evident from FIGS. 8S-8V), we performed ellipsometry measurements (in both the ultraviolet to visible, and near-infrared ranges) on an epitaxial ITO film (135 nm thick) sputtered on YSZ, with the results shown in FIG. 10P-10Q. The experimental $\alpha(\omega)$ curve (FIG. 10N) was calculated using the refractive index obtained from the ellipsometric data fitting. The film plasma frequency was determined to be 2.1 eV based on the ellipsometry data in the NIR (FIG. 10Q); this value is close to the deduced plasma frequency of 2.02 eV for the ITO-NRAs.

Estimating the Electron and Lattice Temperatures

Measurements of the pump power showed that nearly 50% is transmitted and about 5% is reflected (reflection was referenced to a 200 nm thick gold film) by the ITO-NRA for all fluences used in the short-delay-TA experiments (up to 10.72 mJ·cm$^{-2}$). We therefore conclude that 45% of the pump energy is absorbed by the ITO-NRA. Assuming a spatially uniform excitation profile, the energy (in mJ) deposited per unit volume of ITO nanorod (in cm$^3$) per pump pulse can be calculated as $$\frac{0.45 \times p}{L^2 H / a^2},$$

where p is the pump fluence in mJ·cm$^{-2}$, L is the edge length in cm, H is the height in cm, and a is the periodicity in cm of the ITO-NRA. Note that in numerical calculations p was treated as a continuous variable.

The electron temperature at $t_{e,0}$ is denoted as $T_{e,0}$. This was estimated using the procedure described earlier. To assess the lattice temperature (denoted as $T_{1,0}$) achieved at $t_{1,0}$, we used the heat capacity data from E. H. P. Cordfunke et al. for $In_2O_3$ measured for the range from 0 to 1000 K. To convert this data into the required units we used the $In_2O_3$ molecular weight of 277.64 g·mol$^{-1}$ and a mass density of 7.16×10$^3$ kg·m$^{-3}$ (calculated from the lattice constant of cubic ITO, 1.01 nm). For comparison purposes, Cordfunke's heat capacity is equivalent to 2.567×10$^6$ J·m$^{-3}$·K$^{-1}$ at 298 K, which is to be compared with a value of 2.58×10$^6$ J·m$^{-3}$·K$^{-1}$ adopted in the independent work by T. Yagi et al.

Figure 10S:
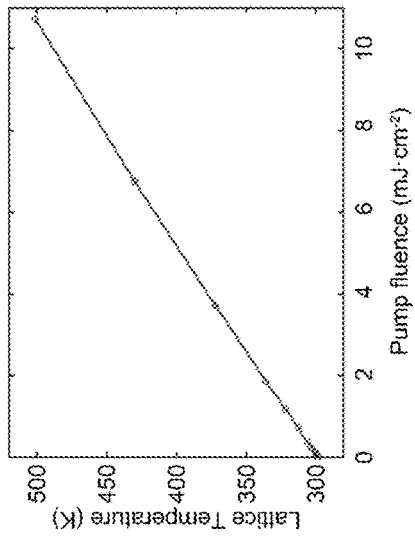
FIG. 10S shows lattice temperature $T_{1,0}$ as a function of pump fluence. The curves are numerically calculated results, whereas the circles are associated with actual pump fluences used in the short-delay-TA experiments.
Figure 10U:
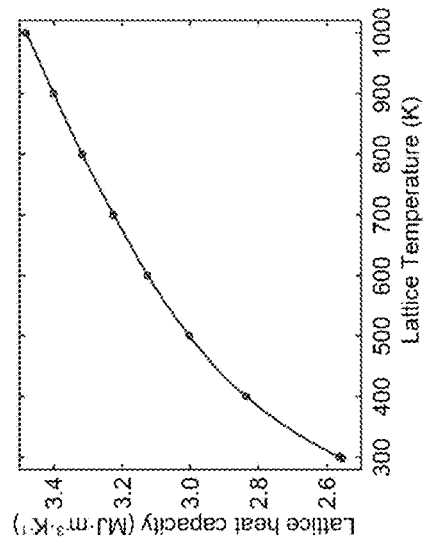
FIG. 10U shows temperature dependent heat capacity of the lattice (circles: measured data points; curve: interpolated dependence).
Figure 10R:
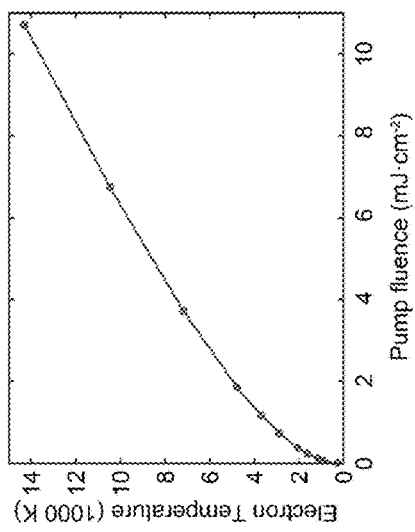
FIG. 10R shows electron temperature $T_{e,0}$ as a function of pump fluence. The curves are numerically calculated results, whereas the circles are associated with actual pump fluences used in the short-delay-TA experiments.
Figure 10T:
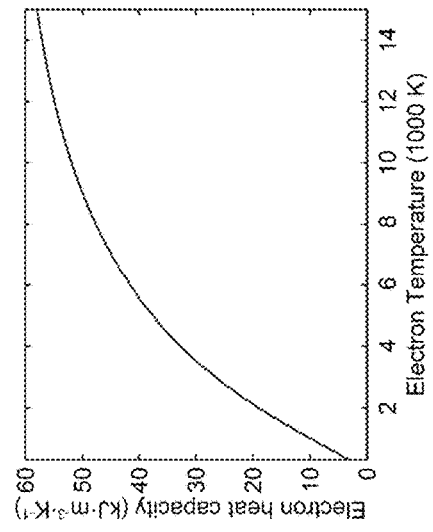
FIG. 10T shows temperature dependent heat capacity of the electron gas.

FIGS. 10R-10S show the calculated dependences of $T_{e,0}$ and $T_{1,0}$ on the pump fluence (shown as curves). Based on the experimental fluences we can estimate temperatures reached in the TA experiments (shown as circles). Notably, the initial temperature of electrons (maximum is ~14,000 K) is about two orders of magnitude higher than that of the lattice (maximum is ~500 K), which stems from their very different heat capacities, as shown in FIGS. 10T-10U.

Details of the Heat-Transfer Simulations

The heat transfer equation is given by $\rho C_p (\partial T_L / \partial t) + \nabla \cdot (-\kappa \nabla T_L) = 0$ where the temperature $T_L$ is a function of both time and position, and $\kappa$ is the thermal conductivity. This equation was solved using COMSOL Multiphysics in the time domain. A uniform temperature profile in the nanorod was used as the initial condition (with temperatures obtained from FIG. 10S). Periodic boundary conditions were used along the in-plane directions. As no perfectly matched layer (which is an absorbing boundary) is available in the time domain study, we truncated the YSZ substrate in the out-of-plane direction at 10 μm below the interface of YSZ and ITO. A constant temperature (300 K) was imposed on the bottom YSZ boundary; this is valid since the total volume of YSZ is more than two orders of magnitude larger than the nanorod in the heat-transfer simulations, therefore temperature rise at the bottom boundary is at most a few degrees.

The thermal conductivity $\kappa$ of ITO was calculated from the equation $\kappa = \kappa_{el} + \kappa_{ph}$, where $\kappa_{el}$ and $\kappa_{ph}$ are thermal conductivities contributed by mobile electrons and phonons, respectively. According to T. Ashida et al, $\kappa_{ph}$ is almost constant (3.95 W·m$^{-1}$·K$^{-1}$ for ITO films with different electron concentrations), whereas $\kappa_{el}$ is well described by the Wiedemann-Franz law of $\kappa_{el} = LT\sigma$, where L is the Lorentz number (2.45×10$^{-8}$ WΩ·K$^{-2}$) and σ is the electrical conductivity. In our heat-transfer simulations we considered $\kappa_{el} = LT\sigma$ as a temperature dependent quantity, as opposed to $\kappa_{ph}$ which was assumed to be temperature independent. To get a reasonable estimate for σ, we performed Hall measurement (Van der Pauw method, Ecopia HMS-5000) on an epitaxial ITO film grown on YSZ substrate, whose electron concentration and mobility were found to be ~1.3×10$^{21}$ cm$^{-3}$ and 47 cm$^2$·V$^{-1}$·s$^{-1}$, respectively, yielding a value of 9.4881×10$^5$ S·m$^{-1}$ for σ. The thermal conductivity of ITO at 300 K is determined to be 10.9 W·m$^{-1}$·K$^{-1}$, which is more than an order of magnitude smaller than that of gold (314 W·m$^{-1}$·K$^{-1}$). The thermal conductivity and heat capacity of YSZ were taken to be 2.5 W·m$^{-1}$·K$^{-1}$ (from K. W. Schlichting et al[17]) and 60.4 J·mol$^{-1}$·K$^{-1}$ (from T. Tojo et al[18]), respectively. Both quantities were assumed to be temperature independent, since the temperature rise in the YSZ substrate is negligible in comparison to that of ITO. YSZ's molecular weight and mass density were 123.218 g·mol$^{-1}$ and 6.0 g·cm$^{-3}$, respectively[17]. To further explore the geometrical dependence of the lattice heat dissipation rate, we performed extra heat-transfer simulations for ITO nanorods with different heights and edge lengths; the results are summarized in FIG. 12E-12F. Interestingly, by adjusting the nanorod height the decay rate can be tuned over an order of magnitude. In contrast, changing the nanorod edge length has a negligible influence on the heat dissipation rate.

Full $\Delta T(t)/T(0)$ Spectral Maps

FIG. 16A-16I shows the $\Delta T(t)/T(0)$ spectral maps of the fast component acquired from short-delay TA experiments. The transient spectra of $\Delta T(t)/T(0)$ plotted in FIG. 9B are line-cuts from these maps at time delay time $t_{e,0}$. FIG. 16J-16K presents the $\Delta T(t)/T(0)$ spectral maps of the slow component obtained from the long-delay TA experiments; the kinetics shown in FIG. 12B are line-cuts from these maps at 560 nm. A low signal-to-noise ratio below 400 nm arises from a relatively weak probe intensity.

Spectral Maps of $\Delta OD(t)$ and T(t)

In TA experiments $$\frac{\Delta T(t)}{T(0)} = \frac{T(t) - T(0)}{T(0)} = \frac{I(t)/I_0 - I(0)/I_0}{I(0)/I_0},$$

where $I_0$ is the intensity of the beam transmitting through air (taken as the background in all measurements), and I(0) and I(t) are beam intensities transmitting through the sample before and at delay time t after the pump, respectively. Another commonly used quantity, $\Delta OD(t)$, is related to $\Delta T(t)/T(0)$ as, $\Delta OD(t) = -\log_{10}[1 + \Delta T(t)/T(0)]$. The $\Delta OD(t)$ spectral map is plotted in FIG. 16J for comparison with the corresponding $\Delta T(t)/T(0)$ spectral map (FIG. 9A). In addition, from T(0) and $\Delta T(t)/T(0)$ we can calculate T(t), which is a direct way to present the dynamic transmission property of the array. In FIG. 16K we plot T(t) to demonstrate that the visible transmission spectrum first redshifts and then recovers rapidly in sub-picosecond time scales.

Example 3

Optical Modulation with Gigahertz Bandwidth

We combine the unique optical and mechanical properties of ITO to achieve strong modulation and steering of light via coherent acoustic vibrations in periodic indium-tin-oxide nanorod arrays (ITO-NRAs). Due to the low carrier concentration compared to noble metals, ITO-NRAs exhibit an LSPR in the near-infrared (NIR), as well as a number of transmission minima in the visible resulting from the collective light diffraction by the periodic array. By resonantly pumping the ITO-NRA in the NIR, we demonstrate coherent acoustic vibrations which modulate, and steer the probe signals in the visible range at ~20 GHz frequency with a maximal differential transmission modulation amplitude up to ~10%. In addition, two complementary transient absorption (TA) measurement techniques were employed to probe the delay time windows of 0-1 ns and 0-50 ns; together they permit a detailed investigation of both the breathing and extensional modes of the ITO-NRAs with a large aspect-ratio. By comparing the experimental vibrational frequencies with the finite-element simulation yielded counterparts, we for the first time report the anisotropic elastic tensor for single-crystalline ITO, which can shed light on the design and integration of mechanically robust, ITO-based electronic and optical devices, especially when their critical dimensions approach the tens of nanometer scale.

The ITO-NRA shown in FIG. 17A was fabricated via a vapor-liquid-solid nanorod growth technique, starting from a periodic array of gold nanoparticle catalysts where the latter were produced by electron beam lithography. The array studied has a periodicity of 1 μm; the nanorods have an average edge length of 180 (±5) nm and height of 2561 (±68) nm, respectively (See FIGS. 17E-17H). As indicated in FIG. 17A, the edges of each nanorod are along [1 0 0] and [0 1 0] directions, whereas the growth axis is along the [0 0 1] direction. The ITO-NRA grown epitaxially on a lattice-matched yttria-stabilized zirconia (YSZ) (100) substrate exhibits high size uniformity and alignment over a large area of 0.6 cm by 0.9 cm (See FIG. 17I). FIG. 17B and FIG. 17J depict the static transmission spectra in the visible and the NIR ranges, respectively. The strong dip in the transmission spectrum at 1500 nm shown in FIG. 17J arises from the transverse-LSPR of the ITO-NRA with electrons oscillating perpendicular to the length of the nanorods.[31] The five transmission minima observed in the visible range (where ITO is "transparent") from 360 nm to 700 nm at normal incidence arise from destructive interferences of electromagnetic waves propagating in the nanorod and free space. The periodic ITO-NRA acts as a two-dimensional dielectric diffraction grating; that is illustrated by a schematic drawing of the optical diffraction (FIG. 17C) and the photograph of a white-light probe diffracted by the ITO-NRA (FIG. 17D). The transmission minima of the forward scattered (0, 0) order measured at normal incidence (FIG. 17B) are not due to light absorption. Instead, the transmission minima arise because light propagates in the nanorod and the surrounding free space at different velocities, and become out of phase (that is, a phase difference equal to an odd number times 7) at certain wavelengths; the interference between these two portions of light produces intensity minima of the (0, 0) order and at the same time intensity maxima of the (1, 0) and (1, 1) orders.

Having determined the static spectral response, we then studied the transient behaviors using pump-probe TA experiments. To efficiently excite the coherent acoustic vibrations, we tuned the center wavelength of the pump to the transverse-LSPR of the ITO-NRA at 1500 nm. A white light probe covering the visible range was used to study the vibration-induced intensity modulation. To ensure sampling the array instead of an individual nanorod, the pump beam was adjusted to have a diameter of 190 μm. Both the pump and probe beams were normal to the substrate (as indicated in FIG. 17C).

We first ran TA experiments with delay times ranging from 0 to 1 ns using probe pulses generated via a translational delay stage. FIG. 18A shows the measured ΔT/T spectral map for the (0, 0) order under a pump fluence of 8.46 mJ·cm$^{-2}$. Notably, we found the ΔT/T spectral map composed of two pronounced transient features. The first transient feature is associated with a ΔT/T signal exhibiting spectrally alternating line-shapes and persisting throughout the entire delay time window of 1 ns with negligible decay of intensity. The second transient feature is an oscillation of ΔT/T signal, which is superimposed on the first transient feature and is mostly pronounced during the first 600 ps. Close inspection of the first transient feature reveals that each ΔT/T zero-crossing-wavelength from a blue, positive ΔT/T region to its red, adjacent negative ΔT/T region matching a static transmission minimum (in FIG. 17B), manifesting a pump-induced redshift of the entire visible transmission spectrum. From a Drude description of ITO's permittivity, $\in(\omega)=\in_\infty(\omega)-\omega_p^2/(\omega^2+i\gamma_p\omega)$, the probe lies in the dielectric range of ITO, which is spectrally isolated from the NIR range that is dominated by the free-electron-like behavior. The pump-induced redshift is expected to originate from a positive change of the background permittivity, $\in_\infty(\omega)$, due to thermal and elastic effects of the lattice (as during the nanosecond delay time window the electron and lattice are in thermal equilibrium so hot electron effect is suppressed). A detailed study of the $\in_\infty(\omega)$ change of ITO under intraband pumping is outside the scope of the paper. The second transient feature, the periodic oscillation of ΔT/T signal, is attributed to the excitation of coherent acoustic vibrations of the ITO-NRA, which introduces strain (and a concomitant refractive index change) and geometrical deformation and thereby modifying the optical transmission, will be the focus of the following discussion.

The coherent acoustic vibrations of the ITO-NRA are manifested by the temporal oscillations of the ΔT/T signals with a period of 50 ps shown in FIG. 18A. Notably, the transmission modulation covers the 360 nm to 700 nm spectral range, with a maximal ΔT/T approaching 10% at 564 nm under the highest experimental pump fluence of 24.4 mJ·cm$^{-2}$ (See FIGS. 18E-18G). We note that this broadband modulation is a unique spectral feature that arises from the uniform, large aspect-ratio, dielectric ITO-NRA structure that supports multiple visible transmission minima due to a sufficient phase difference accumulation, and is an array-effect. In addition, the high-temperature durable, epitaxially anchored ITO-NRA is stable under high pump fluences (beyond 20 mJ·cm$^{-2}$), thereby allowing efficient phonon excitation; this is in sharp contrast to the noble metal counterparts that may change shape, melt, or peel off from substrates under a few mJ·cm$^{-2}$ fluence.

Due to the dielectric nature of the ITO-NRA, the vibration-induced intensity modulation of the (0, 0) order is expected to be associated with complementary modulation of the (1, 0) and (1, 1) orders. This was investigated in extra TA experiments by collecting the (1, 0) and (1, 1) diffracted spots of the probe beam using an optical fiber. Only narrow spectral windows were measured due to the large spatial dispersion of the higher grating modes (FIG. 1d). The measured ΔT/T spectral maps for the (1, 0) and (1, 1) orders, shown in FIG. 18C-18D, reveal that at a given wavelength, the vibration-induced ΔT/T for the (1, 0) and (1, 1) orders are opposite in sign to that of the (0, 0) order shown in FIG. 18B, which indicates that instead of being absorptive, the ITO-NRA periodically redistributes intensity between the centered (0, 0) order and the oblique higher orders. This high frequency beam-steering capability, which permits control of both the intensity and direction of light, is a unique feature of ITO-NRA that cannot be easily achieved by metallic nanostructures due to weaker diffraction efficiencies arising from their optical loss in similar spectral ranges.

The frequency signatures of the ΔT/T spectral map for the (0, 0) mode (FIG. 18A), which appear in the Fourier transform shown in FIG. 19A, exhibit two prominent features centered at around 20 GHz. FIG. 3a further shows that the negative ΔT/T maxima centered at around 507 nm and 613 nm primarily oscillate at a single frequency, whereas all other positive and negative ΔT/T maxima, such as that at 475 nm, contain two frequencies. This is further supported by FIG. 19B, which shows the time evolution of ΔT/T and their Fourier transform at 475 nm and 507 nm. We find the 475-nm response involves a peak at 18.5 GHz with a full-width-half-maximum (FWHM) of 1.23 GHz, and a second peak at 22.1 GHz with a FWHM of 1.21 GHz. As indicated in FIG. 19B, the beating of the two vibration modes at 475 nm leads to a cancellation of the vibration-induced ΔT/T signal. In contrast, the 507-nm response exhibits a single peak of 18.9 GHz with a FWHM of 1.49 GHz. Since the frequency difference of 0.4 GHz between 18.5 GHz and 18.9 GHz is significantly smaller than the FWHMs of each peak, we assign these two frequencies to the same mode, and take their average value of 18.7 GHz as the mode frequency; the 0.4 GHz difference likely arises from the slight tapering of the ITO nanorod, and a different spatial coupling of the electric and displacement fields at these two wavelengths. The time dependence and associated Fourier transform for the (1, 0) and (1, 1) orders at 475 nm and 507 nm are shown in FIGS. 19C-19D, respectively. We note that the (1, 0) order exhibits two frequencies at 475 nm with equal weights, but only one frequency of 18.9 GHz at 507 nm. For the (1, 1) order, however, a single frequency is observed at both wavelengths. Hence the 22.1 GHz oscillation appearing in the (0, 0) order is only related to the (1, 0) order, whereas the 18.7 GHz oscillation in the (0, 0) order is correlated with both the (1, 0) and (1, 1) orders.

Nanorods exhibit three types of vibration modes, namely breathing, extensional and bending modes; the first two correspond to expansion and compression along the radial and longitudinal directions, respectively. The frequencies of the breathing and extensional modes are inversely proportional to the radial and longitudinal dimensions, and are expected to differ by an order of magnitude in the present case (aspect ratio of ITO nanorod is ~14). Since ~100-nm radius nanorods exhibit breathing modes at a few to tens of GHz, we assign the 18.7 GHz and 22.1 GHz frequencies to the 1st and 2nd breathing modes, respectively. These two modes are consistent with observations in pentagonal gold nanowires, in which the displacement fields for the two modes were found to concentrate at the corners and edges of the cross-sectional plane, respectively, due to the break of the cylindrical symmetry.

To determine the elastic properties of ITO based on the vibrational frequencies, we performed finite-element simulations using COMSOL Multiphysics. Since simulations of a long aspect-ratio nanorod with sharp corners are computationally expensive, we first reduced the problem to a two-dimensional (2D) cross-section; this accurately captures the vibrational behaviors of the breathing modes which are dominated by lattice displacements within the cross-sectional plane. Justifications regarding the use of the 2D model appears below and from FIGS. 19E-19I. Full three-dimensional (3D) simulations for a unit cell of the periodic ITO-NRA were also performed and agree well with the 2D simulation results. In all simulations the theoretical density of 7.16 g·cm$^{-3}$ for ITO was assumed.

We first attempted simulations by taking ITO as an isotropic material described by the Young's modulus, E, and Poisson's ratio, υ. As shown in FIGS. 19J-19M, for all possible E and υ values, the simulations cannot reproduce the two experimentally observed breathing mode frequencies of 18.7 and 22.1 GHz. This strongly suggests that the isotropic elastic model of ITO cannot capture the vibrational behaviors of our single-crystalline ITO-NRA, and hence ITO is expected to be elastically anisotropic. To clarify the effects of anisotropy we performed 2D simulations using the three elastic constants, $C_{11}$, $C_{12}$ and $C_{44}$, those are required to characterize the cubic ITO. We varied these constants over a wide range until the two simulated breathing mode frequencies agreed well with the experimental values. FIGS. 20A-20C show the color-coded maps of the frequency dependent integration of the volumetric strain over the square cross-section for varying values of $C_{11}$, $C_{12}$ and $C_{44}$. We find that $C_{11}$ shifts the frequencies of both modes, $C_{12}$ has little effect on the frequencies but tunes the relative strength of the two modes, and $C_{44}$ mainly affects the frequency of the 2nd mode as well as the relative strength of the two modes. Note that in each panel only one elastic constant was swept. The fixed values of $C_{11}$, $C_{12}$ and $C_{44}$ in the sweeps are 277.5 GPa, 107 GPa and 33.8 GPa, respectively, which, as shown below, are our best estimates of the elastic constants for ITO. FIG. 20D shows the displacement fields for the two breathing modes, which are maximized at the corners and faces for the respective 1st and 2nd breathing modes (also see below and FIGS. 20E-20F). Whereas experiment and modeling combine to indicate elastic constant values for $C_{11}$ of 277.5 GPa and $C_{44}$ of 33.8 GPa, $C_{12}$ only adjusts the relative strength of the two modes (as indicated in FIG. 20B) and hence cannot be uniquely determined. The measured ΔT/T oscillations result from a poorly understood strain dependent permittivity, hence correlating the relative strengths of the two modes from simulations with the optical signals measured from TA experiments was not attempted.

In order to determine $C_{12}$, we further examined the extensional mode of the ITO-NRA using a different TA technique, in which a maximal delay time of ~50 ns was realized via electronically delayed white light probe pulses. The measured ΔT/T spectral map and associated Fourier transform are shown in FIGS. 21A-21B, respectively, from which we find an oscillation frequency with a weighted average of 0.524 GHz and a standard deviation of 0.0325 GHz (See below and FIGS. 21E-21F). To understand the extensional mode, we performed 3D simulation for a unit cell composed of a single ITO nanorod anchored on YSZ substrate. As there is no adhesion layer between ITO and YSZ (the growth is epitaxial), no thin elastic layer was used in our 3D simulation. This is in contrast to the gold/titanium/glass structures reported elsewhere, in which the titanium adhesion layer alters the vibrational frequencies of the gold nanoparticles.[9, 16] We treated the single-crystalline, cubic symmetry YSZ substrate using the reported elastic constants $C_{11}$=403.5 GPa, $C_{12}$=102.4 GPa and $C_{44}$=59.9 GPa[55] and a density of 6.0 gcm$^{-3}$, respectively.[56] Keeping $C_{11}$=277.5 GPa and $C_{44}$=33.8 GPa for ITO (determined from the breathing mode frequencies), we varied $C_{12}$ from 40 GPa to 130 GPa in the 3D simulations. FIG. 21C shows the displacements of the center of the nanorod top plane along the long axis as a function of vibration frequency for different $C_{12}$ values. Note that the extensional mode is manifested as a peak in the curves of tip displacement versus frequency, so FIG. 21C suggests that increasing $C_{12}$ yields a lower extensional mode frequency. A $C_{12}$ of 107 GPa provided the closest match between the experiments and simulations. Using the three determined elastic constants, we performed full 3D simulations for the extensional and breathing modes. FIG. 21D shows the color-coded displacement amplitude along the nanorod long axis for the extensional mode, which monotonically increases from the bottom to the top of the nanorod. FIG. 5d also shows the color-coded amplitude of the total displacement for the two breathing modes, which match well with the 2D cross-section analogue shown in FIG. 20D obtained from 2D simulations.

With the three elastic constants in hand, we determine Young's modulus of ITO along any crystalline direction (See below). The Young's modulus of ITO along its three primary directions are determined to be $E_{[100]}$=217.9 GPa, $E_{[110]}$=110.5 GPa and $E_{[111]}$=94.9 GPa, which suggests that ITO is elastically anisotropic, as further presented graphically by the orientation dependent Young's modulus diagram in FIG. 22A. The Young's modulus for crystal directions lying in the three low-index (100), (110) and (111) planes are plotted in FIGS. 22B-22D, respectively. Based on the single-crystalline elasticity, we further estimate the lower and upper bounds on the Young's modulus for polycrystalline ITO, which are determined to be 122.6 GPa and 146.9 GPa, respectively.

Static Optical Measurements.

The near-infrared transmission spectrum was measured using FTIR (Thermo Nicolet 6700). A ZnSe lens was used to focus the light into a 1 mm diameter spot. The visible transmission spectrum was measured with an UV/Vis/NIR spectrophotometer (Perkin Elmer Lambda 1050).

Transient Absorption Measurement.

Transient absorption measurements with 1 ns delay time were performed using a 35 fs amplified titanium:sapphire laser operating at 800 nm with a repetition rate of 2 kHz. The broadband probe pulses were generated by focusing a portion of the amplifier output into a 2 mm thick CaF$_2$ window. The 1500 nm pump pulses were generated via a white light seeded optical parametric amplifier and were reduced in repetition rate to 1 kHz. The probe pulses were time-delayed using a mechanical translation stage and retroreflector. The pump spot diameter on the sample was 190 μm. Transient absorption measurements with 50 nm delay time were performed using a 100 fs pump pulse and an electronically delayed white light probe pulse with about 100 ps time resolution. The probe pulse is generated via self-phase modulation of a Nd:YAG laser in a photonic crystal fiber. Instabilities in the probe pulse were compensated by monitoring a beam-split portion of the pulse in a separate detector. The pump spot diameter on the sample for the latter measurements was 220 μm. The differential transmission change, $\Delta T/T$, is defined as $[T(t)-T_0]/T_0$, with $T_0$ and $T(t)$ denoting the static transmission and transmission at delay time t, respectively, both normalized to air.

Finite-Element Simulations.

Acoustic simulations were performed with the Structural Mechanics module of COMSOL Multiphysics in the frequency domain. A uniform strain in the entire simulation domain was applied and the vibrational response of the nanorod was subsequently analyzed.

Dependence of Vibration-Induced Oscillations on Wavelength and Fluence

FIG. 18E shows the $\Delta T/T$ map for the ITO-NRA under a fluence of 24.4 mJ·cm$^{-2}$, and FIG. 18F shows the $\Delta T/T$ kinetics at wavelengths where $\Delta T/T$ is maximized (at 564 nm, 477 nm, 431 nm, 394 nm and 369 nm), or minimized (at 616 nm, 504 nm, 448 nm, 410 nm and 380 nm). The maximal $\Delta T/T$ oscillation amplitude due to the nanorod vibrations reaches 0.1 at 564 nm. The dependence of the $\Delta T/T$ kinetics on the pump fluence at 564 nm is plotted in FIG. 18G.

Verification of the Two-Dimensional Cross-Sectional Simulations for the Breathing Modes In linear elasticity theory the general form of Hooke's law can be written as $\vec{\sigma} = \vec{C} \vec{\epsilon}$ (where $\vec{C}$ is the elasticity tensor), or alternatively $\vec{\epsilon} = \vec{S} \vec{\sigma}$ (where $\vec{S}$ is the compliance tensor that is related to the elasticity tensor by $\vec{S} = \vec{C}^{-1}$. Owing to its cubic symmetry, only three independent elastic constants, $C_{11}$, $C_{12}$ and $C_{44}$, are required for ITO. The elasticity tensor can then be written as $$\vec{C} = \begin{bmatrix} C_{11} & C_{12} & C_{12} & 0 & 0 & 0 \\ C_{12} & C_{11} & C_{12} & 0 & 0 & 0 \\ C_{12} & C_{12} & C_{11} & 0 & 0 & 0 \\ 0 & 0 & 0 & C_{44} & 0 & 0 \\ 0 & 0 & 0 & 0 & C_{44} & 0 \\ 0 & 0 & 0 & 0 & 0 & C_{44} \end{bmatrix}.$$

In contrast, for isotropic materials only two independent elastic constants, $C_{11}$ and $C_{12}$, are required, with $C_{44}$ given by $C_{44}=(C_{11}-C_{12})/2$. Under small deformations where linear elasticity applies, the volumetric change is $\Delta V/V = \epsilon_{xx} + \epsilon_{yy} + \epsilon_{zz}$, where $\Delta V$ is the change in volume and $\epsilon_{ii}$ (ii=xx, yy or zz) are the principal strains.

In our simulations a uniform initial strain is applied to the entire volume and the mechanical response of the nanorod is calculated in the frequency domain. The volumetric strain is integrated over the entire nanorod volume and the vibrational modes are identified as the frequencies that give a peak in the total volumetric change. A full three-dimensional (3D) simulation of a sharp-cornered ITO nanorod confined on a substrate with large aspect-ratio is computationally expensive. This prevents varying the elastic constants, $C_{ii}$, $C_{12}$ and $C_{44}$, in fine increments over large ranges; therefore, we performed two-dimensional (2D) simulations of the cross-sectional response, which are computationally inexpensive and permit the sweeping of $C_{11}$, $C_{12}$ and $C_{44}$ independently over large ranges so as to obtain a best match between the simulated breathing mode frequencies and their experimental values. The use of a 2D model is supported by comparing it with full 3D simulations, in which we simulated an ITO nanorod with the experimental edge length of 180 nm (as used in 2D simulations) and heights varying from 600 nm to 2600 nm. Two limiting cases are considered: a free-standing nanorod (which represents no mechanical coupling between the ITO nanorod and the substrate) and a nanorod with its bottom boundary rigidly fixed (with zero displacements, as the substrate fully restricts the ITO nanorod bottom boundary). The 3D simulation results are presented in FIG. 19E for the free-standing nanorod and in FIG. 19D for the bottom-boundary-fixed nanorod, which show that the breathing mode frequencies are aspect-ratio and boundary-confinement independent, for nanorod heights ranging from 600 nm to 2600 nm. In addition, the 3D simulation predicted breathing mode frequencies in both cases agree well with the 2D simulations. Realizing that the actual mechanical coupling between the nanorod and substrate lies between the two limiting cases, we conclude that the 2D cross-sectional model can fully capture the behavior of the breathing modes.

We note that the bottom boundary does not influence the breathing mode frequencies when the nanorod height is greater than 600 nm as shown in FIGS. 19E-19F (aspect-ratio larger than 600/180=3.33). However, as demonstrated in FIGS. 19G-19H, when the nanorod gets shorter (aspect-ratio below 3) the frequencies of the breathing modes become strongly dependent on the aspect-ratio, and additional vibrational modes can emerge. Note that the ITO nanorod in simulations associated with FIGS. 19G-19H was assumed to be cylindrical with a diameter of 203 nm (so the cross-sectional area is equal to a square with edge length of 180 nm). In addition, the material was taken to be elastically isotropic and has a Young's modulus of 170 GPa and Poisson's ratio of 0.35 (the choice of these two values are discussed below). The reason to constrain the nanorod to be cylindrical and elastically isotropic to reduce 3D simulations to 2D simulations (using the axial symmetry), which permits the sweep of the aspect-ratio over large range.

To study the impact of the nanorod sharpness on the breathing mode frequencies, we performed 2D cross-sectional simulations in which the cross-section is evolving from a perfect square to a square with 90°-arc corners. FIG. 19I plots the arc radius and frequency dependent integrated volumetric change of the cross-section. As a minimal impact of the sharpness of the square cross-section on the breathing mode frequencies is observed, in our analysis we treat the cross-section as squares with sharp corners.

Estimating the Mass Density of ITO

Based on the literature reported ITO lattice constant of 1.01 nm with space group of Ia$\bar{3}$, and assuming the molecular weight of ITO is equal to that of $In_2O_3$, which is 277.64 g $mol^{-1}$ (which is a good approximation as In and Sn have similar atomic weights, and the doping concentration of Sn in ITO is usually ≤10%), the mass density of ITO was determined to be $7.16 \times 10^3$ kg $m^{-3}$. This estimate, which was used in all finite-element simulations, compares well with the literature reported values.

Finite-Element Simulations of an Elastically Isotropic ITO Nanorod

We performed 2D cross-sectional simulations by considering ITO as an elastically isotropic material with two independent elastic constants, Young's modulus E and Poisson's ratio υ. FIGS. 19J-19M shows the simulation results with various E and υ values. We note that, the minimal frequency gap between the 2nd and 1st breathing modes, which occurs at υ=0.35 and E=170 GPa, is ~5.2 GHz (shown in FIG. 19N), larger than the experimentally observed frequency gap of ~3.4 GHz, suggesting that an anisotropic elastic model is required.

Displacement Field Distributions for the Breathing Modes

From the Hooke's law for cubic crystals, $$\begin{bmatrix} \sigma_{xx} \\ \sigma_{yy} \\ \sigma_{zz} \\ \sigma_{yz} \\ \sigma_{zx} \\ \sigma_{xy} \end{bmatrix} = \begin{bmatrix} C_{11} & C_{12} & C_{12} & 0 & 0 & 0 \\ C_{12} & C_{11} & C_{12} & 0 & 0 & 0 \\ C_{12} & C_{12} & C_{11} & 0 & 0 & 0 \\ 0 & 0 & 0 & C_{44} & 0 & 0 \\ 0 & 0 & 0 & 0 & C_{44} & 0 \\ 0 & 0 & 0 & 0 & 0 & C_{44} \end{bmatrix} \begin{bmatrix} \varepsilon_{xx} \\ \varepsilon_{yy} \\ \varepsilon_{zz} \\ \varepsilon_{yz} \\ \varepsilon_{zx} \\ \varepsilon_{xy} \end{bmatrix},$$

and considering that in 2D simulations no deformation exists in the z direction (indicating $\varepsilon_{zz}, \varepsilon_{yz}, \varepsilon_{zx}=0$), we obtain $\sigma_{xx}=C_{11}\cdot\varepsilon_{xx}+C_{12}\cdot\varepsilon_{yy}$, $\sigma_{yy}=C_{12}\cdot\varepsilon_{xx}+C_{11}\cdot\varepsilon_{yy}$, $\sigma_{zz}=C_{12}(\varepsilon_{xx}+\varepsilon_{yy})$, $\sigma_{xy}=C_{44}\cdot\varepsilon_{xy}$, and the volumetric strain $\Delta V/V=\varepsilon_{xx}+\varepsilon_{yy}+\varepsilon_{zz}=\varepsilon_{xx}+\varepsilon_{yy}$. Note that $\sigma_{zz}$ reflects the transverse stress in the z direction caused by principle strain in the x-y plane. In FIGS. 20E-20F we plot various strain and stress components for the 1st and 2nd breathing modes, in which $d_x$ denotes the displacement along x direction and $d_{total}$ is the total displacement. Note that to plot all the quantities in the same dimension (N·$m^{-2}$), the displacement fields (in m) are scaled by $C_{11}/a$ (in N·$m^{-3}$), with a=180 nm being the edge length of the ITO nanorod.

Calculation of the Weighted Average and Weighted Standard Deviation of the Extensional Mode Frequency To calculate the weighted average and weighted standard deviation of the extensional mode frequency, we first denote the data shown in FIG. 5b as $x_{i,j}$, where i=1, 2, . . . , n and j=1, 2, . . . , m. Here i and j indicate the $i^{th}$ frequency point ($f_i$) and $i^{th}$ wavelength point ($\lambda_j$). Note that frequency $f_i$ here denotes the vibrational frequency but not frequency of light.

The average frequency at the $j^{th}$ wavelength was calculated as of $af_j=\Sigma_i(x_{i,j}\cdot f_i)/\Sigma_i(x_{i,j})$, which is shown in FIG. 21E. The weight of the average frequency of the $j^{th}$ wavelength was calculated as $w_j=\Sigma_i(x_{i,j})$, which is presented in FIG. 21F; note that a large data weight shown in Figure S13b is observed at wavelength ranges that show strong frequency signatures as presented in FIG. 5b.

The weighted average and the weighted standard deviation of the extensional mode frequency were finally calculated as $A=(\Sigma_j w_j\cdot a\lambda_j)/(\Sigma_j w_j)$ and
std=sqrt $\{\Sigma_j[w_j\cdot(a\lambda_j-A)^2]/[(m-1)\cdot(\Sigma_j w_j)/m]\}$. Similar approach was also used for calculating the average and standard deviation for the breathing mode frequencies.

Calculation of the Orientation Dependent Young's Modulus for ITO

From $\vec{S}=\vec{C}^{-1}$ the components of the compliance are determined to be $S_{11}=4.59$ $TPa^{-1}$, $S_{12}=-1.28$ $TPa^{-1}$, and $S_{44}=29.59$ $TPa^{-1}$. The Young's modulus along any direction [a b c] in a cubic crystal can be calculated using $(E_{[a\ b\ c]})^{-1}=S_{11}-2(S_{11}-S_{12}-0.5\cdot S_{44})(l^2m^2+m^2n^2+n^2l^2)$, or equivalently, $(E_{[a\ b\ c]})^{-1}=(E_{[1\ 0\ 0]})^{-1}-3[(E_{[1\ 0\ 0]})^{-1}-(E_{[1\ 1\ 1]})^{-1}](l^2m^2+m^2n^2+n^2l^2)$ where l, m and n are the direction cosines defined as l=a/|k|, m=b/|k| and n=c/|k|, with k=ax+by+cz. Note that the Young's modulus in the (1 1 1) plane is orientation independent, which is a common result for cubic crystals. This is due to that directions in the (1 1 1) plane must satisfy (1 1 1)·[a b c]=0 and [a b c]·[a b c]=|k|², which yields a constant $l^2m^2+m^2n^2+n^2l^2=1/4$, and subsequently a constant Young's modulus for any directions lying on the (1 1 1) plane.

The Zener ratio, defined as $Z=2C_{44}/(C_{11}-C_{12})$, is a measure of the elastic anisotropy of a cubic crystal. In our case Z is determined to be 0.396, which is close to that of single-crystalline YSZ used as the underlying substrate.

Bounds of the Young's Modulus for Polycrystalline ITO

The Voigt (assuming uniform strain) and Reuss (assuming uniform stress) moduli provide upper and lower bounds on the true Young's modulus for polycrystalline materials based on their single crystal elastic constants.

In the Voigt limit, it follows that $9K_V=(C_{11}+C_{22}+C_{33})+2(C_{12}+C_{23}+C_{31})$, and $15G_V=(C_{11}+C_{22}+C_{33})-(C_{12}+C_{23}+C_{31})+3(C_{44}+C_{55}+C_{66})$. Whereas in the Reuss limit, we have $1/K_R=(S_{11}+S_{22}+S_{33})+2(S_{12}+S_{23}+S_{31})$, and $15/G_R=4(S_{11}+S_{22}+S_{33})-4(S_{12}+S_{23}+S_{31})+3(S_{44}+S_{55}+S_{66})$, $K_V$, $G_V$, $K_R$ and $G_R$ are the Voigt bulk modulus, Voigt shear modulus, Reuss bulk modulus and Reuss shear modulus, respectively. Note that for cubic ITO $C_{22}=C_{33}=C_{11}$, $C_{23}=C_{31}=C_{12}$ and $C_{55}=C_{66}=C_{44}$ (similar expressions hold for the compliance components). In polycrystalline materials, the Poisson's ratio and Young's modulus are related to the shear and bulk modulus as: $\upsilon=\frac{1}{2}\cdot[1-3G/(3K+G)]$ and $1/E=1/(3G)+1/(9K)$.

Using $C_{11}=277.5$ GPa, $C_{12}=107$ GPa and $C_{44}=33.8$ GPa, the bounds for the shear modulus, bulk modulus and Young's modulus for polycrystalline ITO are determined to be $G_R=44.6$ GPa, $G_V=54.4$ GPa, $K_R=K_V=163.8$ GPa, $E_R=122.6$ GPa, $E_V=146.9$ GPa. Note that $K_R=K_V$ holds for all crystals with cubic symmetry. In addition, the Voigt and Reuss Poisson's ratios are calculated to be $\upsilon_V=0.35$ and $\upsilon_R=0.38$, respectively.

The Voigt and Reuss theorems predict that the Young's modulus for polycrystalline ITO (denoted as $E_{pc}$) lies in the range of 122.6 GPa to 146.9 GPa. We note that literature-reported values of $E_{pc}$ (based on polycrystalline ITO films) are lack of consistency. For example, a 116 GPa was a deduced from X-ray diffraction measurements, whereas both a 190 GPa and a 100 GPa were obtained by nano-indentation analysis.

We claim:

1. A method of optical modulation, the method comprising:
    irradiating an optical switch with a control beam at a first control time and irradiating the optical switch with a signal beam at a signal time,
    wherein a transmitted intensity of the signal beam in a direction depends on a delay time between the first control time and the signal time and wherein the transmitted intensity of the signal beam in the direction is detectably different than a static signal,
    wherein the optical switch comprises a nanorod array,
    wherein the nanorod array comprises a plurality of nanorods extending outwardly from a substrate.

2. The method of claim 1, wherein the nanorod array is arranged in a regular periodic pattern.

3. The method of claim 2, wherein the nanorod array has a periodicity of about 30nm to about 5000 nm.

4. The method of claim 1, wherein the plurality of nanorods comprise a transparent conducting oxide, a transparent conducting nitride, a transparent conducting carbide, or a transparent conducting silicide.

5. The method of claim 1, wherein the plurality of nanorods comprise indium tin oxide.

6. The method of claim 1, wherein the plurality of nanorods comprise a plurality of film coated nanorods.

7. The method of claim 1 further comprising irradiating the optical switch with a second control beam at a second control time,
    wherein the transmitted intensity of the signal beam in the direction depends on the delay time between the second control time and the signal time and wherein the transmitted intensity of the signal beam in the direction is detectably different than a static signal.

8. The method claim 7, wherein the first control time and the second control time are in controlled displacement.

9. The method of claim 1 further comprising detecting the transmitted intensity of the signal beam in the direction.

10. The method of claim 1, wherein the center wavelength of the control beam is in the visible spectrum, the near infrared spectrum, mid infrared spectrum, or a combination thereof.

11. The method of claim 1, wherein the control beam and/or the signal beam irradiate the nanorod array from an angle of incidence of 0° to 70°.

12. The method of claim 1, wherein the control beam has a fluence less than 10 mJ/cm$^2$.

13. The method of claim 1, wherein the signal beam is a broad band signal beam.

14. The method of claim 1, wherein the signal beam probe comprises wavelengths from the visible spectrum, near-infrared spectrum, mid-infrared spectrum, or a combination thereof.

15. The method of claim 1, wherein the signal beam has a fluence of less than about 10 mJ/cm2.

16. The method of claim 1, wherein the direction is substantially parallel with a forward propagation direction of the signal beam.

17. The method of claim 1, wherein the direction is oblique with a forward propagation direction of the signal beam.

18. The method of claim 1, wherein the nanorod array comprises a plurality of nanorods having an average height of about 30 nm to about 5000 nm.

19. The method of claim 1, wherein the nanorod array comprises a plurality of nanorods having an average edge length of about 10 nm to about 500 nm.

20. The method of claim 1, wherein the substrate comprises indium tin oxide, yittria stabilized oxide, and/or aluminum oxide.

21. The method of claim 1,
    wherein control beam excites a vibrational mode of the plurality of nanorod arrays and wherein the transmitted intensity of the signal beam in the direction is modulated by the frequency of the vibrational mode.

22. The method of claim 21, wherein the vibrational mode is an extensional mode or a breathing mode.

* * * * *